United States Patent
Henke et al.

(10) Patent No.: US 12,179,795 B2
(45) Date of Patent: Dec. 31, 2024

(54) USING ARRIVAL TIMES AND SAFETY PROCEDURES IN MOTION PLANNING TRAJECTORIES FOR AUTONOMOUS VEHICLES

(71) Applicant: NVIDIA Corporation, Santa Clara, CA (US)

(72) Inventors: Birgit Henke, Seattle, WA (US); David Nister, Bellevue, WA (US); Julia Ng, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 212 days.

(21) Appl. No.: 17/328,052

(22) Filed: May 24, 2021

(65) Prior Publication Data

US 2022/0379917 A1 Dec. 1, 2022

(51) Int. Cl.
*B60W 60/00* (2020.01)

(52) U.S. Cl.
CPC .... *B60W 60/0011* (2020.02); *B60W 60/0015* (2020.02); *B60W 60/0027* (2020.02);
(Continued)

(58) Field of Classification Search
CPC ......... B60W 60/0011; B60W 60/0015; B60W 60/0027; B60W 2520/06; B60W 2554/4041; B60W 2554/80
See application file for complete search history.

(56) References Cited

U.S. PATENT DOCUMENTS

| 7,409,295 B2 | 8/2008 | Paradie |
| 8,204,642 B2 | 6/2012 | Tanaka et al. |

(Continued)

FOREIGN PATENT DOCUMENTS

| DE | 10 2015 221 920 A1 | 5/2017 |
| DE | 10 2015 226 762 A1 | 6/2017 |
| WO | 2018/002910 A1 | 1/2018 |

OTHER PUBLICATIONS

Nister, D., et al., "An Introduction to the Safety Force Field", NVIDIA, pp. 1-27 (Mar. 2019) (Year: 2019).*

(Continued)

*Primary Examiner* — Anne Marie Antonucci
*Assistant Examiner* — Jordan T Smith
(74) *Attorney, Agent, or Firm* — Taylor English Duma L.L.P.

(57) ABSTRACT

A trajectory for an autonomous machine may be evaluated for safety based at least on determining whether the autonomous machine would be capable of occupying points of the trajectory in space-time while still being able to avoid a potential future collision with one or more objects in the environment through use of one or more safety procedures. To do so, a point of the trajectory may be evaluated for conflict based at least on a comparison between points in space-time that correspond to the autonomous machine executing the safety procedure(s) from the point and arrival times of the one or more objects to corresponding position(s) in the environment. A trajectory may be sampled and evaluated for conflicts at various points throughout the trajectory. Based on results of one or more evaluations, the trajectory may be scored, eliminated from consideration, or otherwise considered for control of the autonomous machine.

20 Claims, 19 Drawing Sheets

(52) U.S. Cl.
CPC . *B60W 2520/06* (2013.01); *B60W 2554/4041* (2020.02); *B60W 2554/80* (2020.02)

(56) References Cited

U.S. PATENT DOCUMENTS

| | | | |
|---|---|---|---|
| 9,555,781 | B2 | 1/2017 | Breuer et al. |
| 9,701,307 | B1 | 7/2017 | Newman et al. |
| 10,007,269 | B1 | 6/2018 | Gray |
| 10,133,274 | B2 | 11/2018 | Shashua et al. |
| 10,134,278 | B1 | 11/2018 | Konrardy et al. |
| 10,289,469 | B2 | 5/2019 | Fortino et al. |
| 10,372,136 | B2 | 8/2019 | Yang et al. |
| 10,489,972 | B2 | 11/2019 | Atsmon |
| 10,625,748 | B1 | 4/2020 | Dong et al. |
| 10,635,110 | B2 | 4/2020 | Shashua et al. |
| 10,730,517 | B2 | 8/2020 | Park et al. |
| 10,885,698 | B2 | 1/2021 | Muthler et al. |
| 10,942,030 | B2 | 3/2021 | Haque et al. |
| 10,949,885 | B2 * | 3/2021 | Xiao ................. A61B 5/08 |
| 2009/0093960 | A1 | 4/2009 | Puhalla et al. |
| 2009/0125177 | A1 | 5/2009 | Tanaka et al. |
| 2010/0324771 | A1 | 12/2010 | Yabushita et al. |
| 2011/0246156 | A1 | 10/2011 | Zecha et al. |
| 2016/0321074 | A1 | 11/2016 | Hung et al. |
| 2017/0010108 | A1 | 1/2017 | Shashua |
| 2017/0090478 | A1 | 3/2017 | Blayvas et al. |
| 2017/0259801 | A1 | 9/2017 | Abou-Nasr et al. |
| 2017/0364083 | A1 | 12/2017 | Yang et al. |
| 2018/0032082 | A1 | 2/2018 | Shalev-Shwartz et al. |
| 2018/0121273 | A1 | 5/2018 | Fortino et al. |
| 2018/0253103 | A1 | 9/2018 | Winkler et al. |
| 2019/0016285 | A1 | 1/2019 | Freienstein et al. |
| 2019/0071101 | A1 | 3/2019 | Emura et al. |
| 2019/0146515 | A1 | 5/2019 | De Salvo et al. |
| 2019/0212749 | A1 | 7/2019 | Chen et al. |
| 2019/0258251 | A1 | 8/2019 | Pitty et al. |
| 2020/0398833 | A1 * | 12/2020 | Hudecek ............ B60W 60/001 |
| 2021/0031760 | A1 * | 2/2021 | Ostafew ............ B60W 60/0017 |
| 2021/0048817 | A1 * | 2/2021 | Olson ............ B60W 60/0015 |
| 2021/0107517 | A1 * | 4/2021 | Watanabe ........... B60W 30/095 |
| 2021/0122373 | A1 * | 4/2021 | Dax ................ B60W 30/0956 |
| 2021/0300413 | A1 * | 9/2021 | Turlej ................. B60W 30/09 |
| 2022/0135029 | A1 * | 5/2022 | Poubel Orenstein ....................... B60W 30/0956 701/301 |
| 2022/0176995 | A1 * | 6/2022 | Subramanian ........ B60W 30/08 |
| 2023/0081921 | A1 * | 3/2023 | Hawasly ............. G05D 1/0217 701/26 |

OTHER PUBLICATIONS

S. Magdici and M. Althoff, "Fail-safe motion planning of autonomous vehicles," 2016 IEEE 19th International Conference on Intelligent Transportation Systems (ITSC), Rio de Janeiro, Brazil, 2016, pp. 452-458, doi: 10.1109/ITSC.2016.7795594. (Year: 2016).*

C. Pek and M. Althoff, "Computationally Efficient Fail-safe Trajectory Planning for Self-driving Vehicles Using Convex Optimization," 2018 21st International Conference on Intelligent Transportation Systems (ITSC), Maui, HI, USA, 2018, pp. 1447-1454, doi: 10.1109/ITSC.2018.8569425. (Year: 2018).*

International Search Report and Written Opinion mailed Jul. 18, 2019 in International Patent Application No. PCT/US2019/017072, 16 pages.

Phillips, M., & Likhachev, M. (May 2011). Sipp: Safe interval path planning for dynamic environments. In 2011 IEEE International Conference on Robotics and Automation (pp. 5628-5635). IEEE.

Final Office Action dated Oct. 14, 2021 in U.S. Appl. No. 16/269,921, 17 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

Bojarski, M., et al., "End to End Learning for Self-Driving Cars", arXiv: 1604.07316v1, pp. 1-9 (Apr. 25, 2016).

Jayaraman, A., et al., "Creating 3D Virtual Driving Environments for Simulation-Aided Development of Autonomous Driving and Active Safety", SAE Technical Paper, pp. 1-6 (2017).

Nister, D., et al., "An Introduction to the Safety Force Field", NVIDIA, pp. 1-27 (Mar. 2019).

Notice of Allowance dated Jun. 8, 2021 in U.S. Appl. No. 16/265,780, 2 pages.

Non Final Office Action dated Feb. 10, 2022 in U.S. Appl. No. 16/269,921, 16 pages.

Ching Y. Hung et al. "Programmable Vision Accelerator", U.S. Appl. No. 62/156,167, filed May 1, 2015.

"Programmable Vision Accelerator", U.S. Appl. No. 15/141,703, filed Apr. 28, 2016.

"Reliability Enhancement Systems and Methods" U.S. Appl. No. 15/338,247, filed Oct. 28, 2016.

Mohammed Abdulla Yousuf et al. "Methodology of Using a Single Controller (ECU) For a Fault-Tolerant/Fail-Operational Self-Driving System", U.S. Appl. No. 62/524,283, filed Jun. 23, 2017.

"Systems and Methods for Safe and Reliable Autonomous Vehicles" U.S. Appl. No. 62/584,549, filed Nov. 10, 2017.

"System and Method for Controlling Autonomous Vehicles" U.S. Appl. No. 62/614,466, filed Jan. 7, 2018.

"System and Method for Safe Operation of Autonomous Vehicles", U.S. Appl. No. 62/625,351, filed Feb. 2, 2018.

"Safety Procedures in Autonomous Vehicles," U.S. Appl. No. 62/768,064, filed Nov. 11, 2018.

"Safety Procedures in Autonomous Vehicles," U.S. Appl. No. 62/760,916, filed Nov. 13, 2018.

* cited by examiner

USING ARRIVAL TIMES AND SAFETY PROCEDURES IN MOTION PLANNING TRAJECTORIES FOR AUTONOMOUS VEHICLES

CROSS-REFERENCE TO RELATED APPLICATIONS

This application is related to U.S. Non-Provisional application Ser. No. 16/265,780, filed on Feb. 1, 2019, U.S. Non-Provisional application Ser. No. 16/269,921, filed on Feb. 7, 2019, and U.S. Non-Provisional application Ser. No. 16/877,127, filed on May 18, 2020, each of which is hereby incorporated by reference in its entirety.

BACKGROUND

Designing a system to drive a vehicle autonomously and safely without supervision is tremendously difficult. An autonomous vehicle should at least be capable of performing as a functional equivalent of an attentive driver—who draws upon a perception and action system that has an incredible ability to identify and react to moving and static obstacles in a complex environment—to avoid colliding with other objects or structures when operating the vehicle. Behavior planning for autonomous vehicles may involve using a driving perception system to determine a trajectory for a vehicle to travel, which is a challenging yet critical task, particularly for complex urban scenarios. For example, for an autonomous vehicle to understand its surroundings in order to make safe and effective behavior decisions, the autonomous vehicles must process various environmental inputs along with the current vehicle trajectory and route information to calculate a continuing or future trajectory for the vehicle.

Conventional systems for behavior planning often rely on inflexible decisions that do not account for the constantly changing variables in the environment. For example, conventional methods may select a route with the lowest travel time and then pick a lane plan that follows the route. However, this rigid planning does not allow a planning system to optimally adjust a trajectory based on new or future environmental conditions. For example, by determining behaviors for the vehicle separately from other determinations—such as collision avoidance—adjustments to a current plan may be reactive, rather than proactive. As such, in the example of collision avoidance, a control decision may be determined using the outputs from a behavior planner and, upon determining a collision is possible, collision avoidance functionality may generate an updated control decision. As a result, the trajectory of the vehicle is not determined using collision avoidance as a factor, but rather is overwritten by the collision avoidance functionality of the vehicle. Thus behaviors for the vehicle may be sub-optimal, as they do not take into account dynamic inputs—such as collision avoidance.

SUMMARY

Embodiments of the disclosure relate to using predicted arrival times and safety procedures in motion planning of trajectories for autonomous vehicles. More specifically, the disclosure relates to techniques and approaches for evaluating a planned trajectory of an autonomous machine for use in controlling the autonomous machine on the basis of whether the autonomous machine is capable of occupying points of the trajectory in space-time while still being able to avoid a potential future collision.

In contrast to conventional systems, disclosed approaches may evaluate a trajectory proposal for an autonomous machine for safety based at least on determining whether the autonomous machine would be capable of occupying points of the proposed trajectory in space-time while still being able to avoid a potential future collision with one or more objects in the environment when executing one or more safety procedures. To do so, a point of the trajectory may be evaluated for conflict based at least on a comparison between points in space-time (e.g., of a claimed set) that correspond to the autonomous machine implementing the safety procedure(s) from the point and arrival times of the one or more objects to corresponding position(s) in the environment. A trajectory may be sampled and evaluated for conflicts at various points throughout the trajectory. Based on results of one or more evaluations, the trajectory may be scored (e.g., for ranking against other potential trajectories), eliminated from consideration, or otherwise considered for controlling the autonomous machine.

BRIEF DESCRIPTION OF THE DRAWINGS

The present systems and methods for using arrival times and safety procedures in motion planning of trajectories for autonomous vehicles is described in detail below with reference to the attached drawing figures, wherein.

DETAILED DESCRIPTION

Figure 1:
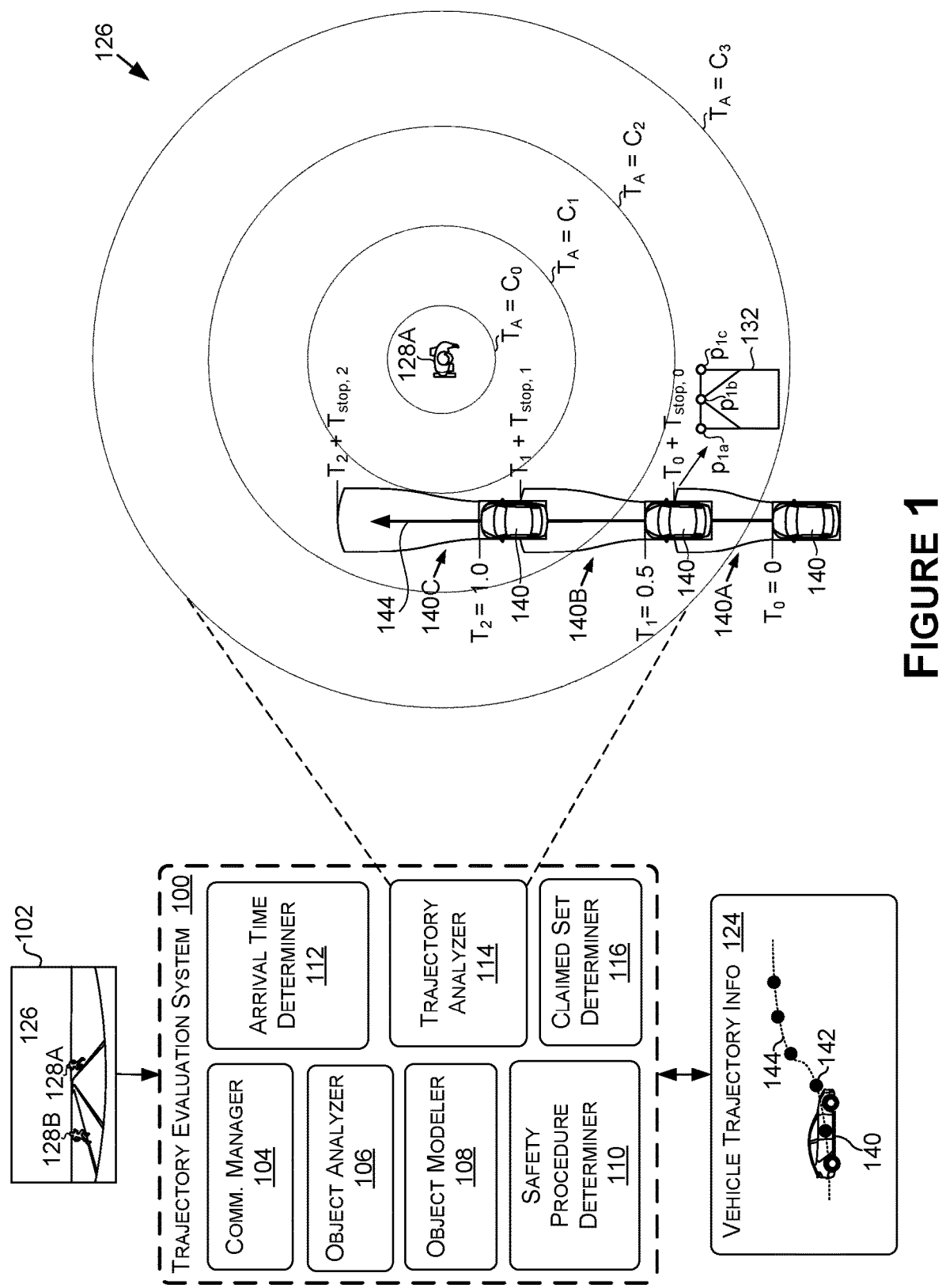
FIG. 1 is an illustration including an example trajectory evaluation system, in accordance with some embodiments of the present disclosure.

Systems and methods are disclosed related to using arrival times and safety procedures in motion planning of trajectories for autonomous vehicles. More specifically, the disclosure relates to techniques and approaches for evaluating a trajectory for use in controlling an autonomous machine on the basis of whether the autonomous machine is capable of occupying points of the trajectory in space-time while still being able to avoid a potential future collision.

The present disclosure may be described with respect to an example autonomous vehicle 140 (alternatively referred to herein as "vehicle 140" or "autonomous vehicle 140"), an example of which is described in more detail herein with respect to FIGS. 13A-13D. Although the present disclosure primarily provides examples using autonomous vehicles, other types of objects or machines may be controlled using disclosed approaches.

Disclosed approaches may evaluate a trajectory for an autonomous machine for safety based at least on determining whether the autonomous machine would be capable of occupying points of the trajectory in space-time while still being able to avoid a potential future collision with one or more objects in the environment through use of one or more safety procedures. For a sample point(s) in space-time within a trajectory, the system may determine one or more points in space-time that the autonomous machine would occupy, were the autonomous machine to execute one or more safety procedures from the sample point(s). The system may also determine a potential arrival time(s) of one or more objects to a location(s) of the one or more points in space-time, and compare the arrival time(s) to a time(s) of the one or more points in space-time that the autonomous machine would occupy. The objects may comprise pedestrians, animals, bikes, cars, and/or static obstacles with an assumed small acceleration to account for uncertainty in perception. In some embodiments the objects may be limited to one or more of those class types.

The comparison may be used to identify whether there is a conflict between when the autonomous machine would occupy a position(s) of the trajectory and when the one or more objects would occupy a proximate position(s) in the environment. For example, if the comparison indicates that were a safety procedure to be implemented from the position in the trajectory, the autonomous machine would occupy one or more positions prior to the corresponding arrival time(s), no conflict may be determined (e.g., the vehicle could stop prior to a collision). However, if the comparison indicates that the autonomous machine would occupy one or more positions after the corresponding arrival time(s), a conflict may be determined (e.g., the vehicle could not stop prior to a collision).

In at least one embodiment, the arrival times for the one or more objects may be computed based at least on modeling trajectories of the one or more objects (e.g., from a start of the trajectory) to the one or more positions in the environment. For example, each trajectory may model a scenario in which an object heads directly toward a given position from the starting position(s) of the object. Object parameters, such as the pose, acceleration/deceleration, and velocity may be used to generate the trajectory. In one or more embodiments, a worst-case scenario may be modeled in which each object heads directly toward a given position as quickly as possible (e.g., according to capabilities of the object in the model). This provides a conservative approach where if the autonomous machine is capable of avoiding a collision in a worst-case or highly restrictive scenario, the autonomous machine should be capable of avoiding a collision in less restrictive scenarios. Where multiple objects are modeled, the minimum or earliest arrival time to the given position may be used for the comparison to the points corresponding to the autonomous machine.

In one or more embodiments, a claimed set of the machine corresponds to the one or more points in space-time that the autonomous machine is predicted to occupy upon execution of one or more safety procedures at the sample point(s). The claimed set for the autonomous machine may include an occupied trajectory (e.g., at least an estimate of each of the points in space that the machine would occupy when following a trajectory) of the autonomous machine when the autonomous machine applies a safety procedure(s). A safety procedure may refer to a procedure for controlling the autonomous machine which defines one or more trajectories (such as, without limitation, veering, turning, pulling into a side lane or shoulder, etc.) or actions (such as, without limitation, accelerating, braking, slowing, switching at least partial control to an alternate component, returning control to a driver or other operator, etc.) of the autonomous machine in space-time that would reduce the likelihood of or avoids a collision and/or the impact thereof if executed at a corresponding time and position. A safety procedure may be triggered based at least in part on the autonomous machine determining that a collision is likely and/or imminent, and/or that a failure of one or more components of the autonomous machine is likely, imminent, and/or has occurred.

A trajectory may be sampled and evaluated for conflicts at various points throughout the trajectory, for example, at different time steps. Multiple points may be evaluated for a sample corresponding to the start of a trajectory to avoid gaps in coverage. However, for subsequent time steps, only points at the tips of the safety procedures (e.g., where an actor state objective is met) may be evaluated. Sampling only the tips may be sufficient in some embodiments as the tips may correspond to the most restrictive points of the safety procedures. Thus, checking for conflicts with respect to safety procedures may be computationally efficient, as the number of comparisons may be linear with the number of safety procedures that are evaluated.

Based on results of one or more evaluations, the trajectory may be scored (e.g., for ranking against other potential trajectories), eliminated from consideration, or otherwise considered for control of the autonomous machine. For example, a conflict may be used as a hard or soft constraint when evaluating a trajectory for selection in control of the autonomous machine. A constraint may be based on various potential factors, such as a distance and/or elapsed time to a detected conflict (e.g., to the start of the sample or to a point compared with an arrival time) along the trajectory (e.g., the conflict that is at the greatest distance and/or elapsed time from the start of the trajectory).

Now referring to FIG. 1, FIG. 1 shows an illustration including an example trajectory evaluation system 100, in accordance with some embodiments of the present disclosure. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

The trajectory evaluation system 100 may receive sensor data 102, representative of an environment 126, and use the sensor data 102 to compute at least one arrival time for an object to at least one position in the environment 126. The at least one arrival time may be used to analyze vehicle trajectory information 124 representative of at least one proposed trajectory or path 144 for the vehicle 140. In one or more embodiments, the at least one arrival time may be captured in an image or other form of data that is processed to analyze the proposed trajectory or path 144. The image may comprise, by way of example and not limitation, a 2D grid, a matrix, a one-channel rasterized image, etc.

The trajectory evaluation system 100 may include, for example, a communications manager 104, an object analyzer 106, an object modeler 108, a safety procedure determiner 110, an arrival time determiner 112, a trajectory analyzer 114, and a claimed set determiner 116.

As an overview, the communications manager 104 may be configured to manage communications received by the trajectory evaluation system 100 (e.g., comprising the sensor data 102 and/or the vehicle trajectory information 124) and/or provided by the trajectory evaluation system 100 (e.g., comprising data corresponding to results of analyzing the vehicle trajectory information 124). The object analyzer 106 may be configured to analyze objects in the environment using the sensor data 102. The object modeler 108 may be configured to model objects, such as trajectories of the objects in the environment 126 based at least on the analysis performed by the object analyzer 106. The arrival time determiner 112 may be configured to analyze trajectories of objects, such as trajectories modeled by the object modeler 108 to compute arrival times for the objects to positions within the environment.

The trajectory analyzer 114 may be configured to evaluate one or more trajectories 144 for the vehicle 140 based at least on the arrival times. To do so, the trajectory analyzer 114 may employ the safety procedure determiner 110 and the claimed set determiner 116. The safety procedure determiner 110 may determine a safety procedure for the vehicle 140. The claimed set determiner 116 may determine at least a portion of a claimed set(s) of the vehicle 140 were the vehicle 140 to execute the safety procedure at one or more points within a trajectory 144. The trajectory analyzer 114 may compare one or more of the arrival times to the portion of a claimed set(s). Based on a result of the comparison, the trajectory 144 may be scored (e.g., for ranking against other potential trajectories), eliminated from consideration, or otherwise considered for control of the vehicle 140.

As described herein, the communications manager 104 may be configured to manage communications received by the trajectory evaluation system 100 (e.g., comprising the sensor data 102 and/or the vehicle trajectory information 124) and/or provided by the trajectory evaluation system 100 (e.g., comprising data corresponding to results of analyzing the vehicle trajectory information 124).

Where a communication is received and/or provided as a network communication, the communications manager 104 may comprise a network interface which may use one or more wireless antenna(s) 1326 and/or modem(s) to communicate over one or more networks. For example, the network interface may be capable of communication over Long-Term Evolution (LTE), Wideband Code-Division Multiple Access (WCDMA), Universal Mobile Telecommunications Service (UMTS), Global System for Mobile communications (GSM), CDMA2000, etc. The network interface may also enable communication between objects in the environment (e.g., vehicles, mobile devices, etc.), using local area network(s), such as Bluetooth, Bluetooth Low Energy (LE), Z-Wave, ZigBee, etc., and/or Low Power Wide-Area Network(s) (LPWANs), such as Long Range Wide-Area Network (LoRaWAN), SigFox, etc. However, the communications manager 104 need not include a network interface, such as where the trajectory evaluation system 100 implemented completely on an autonomous vehicle (e.g., the vehicle 140). In some examples, one or more of the communications described herein may be between components of a computing device 1400 over a bus 1402 of FIG. 14.

Figure 12:
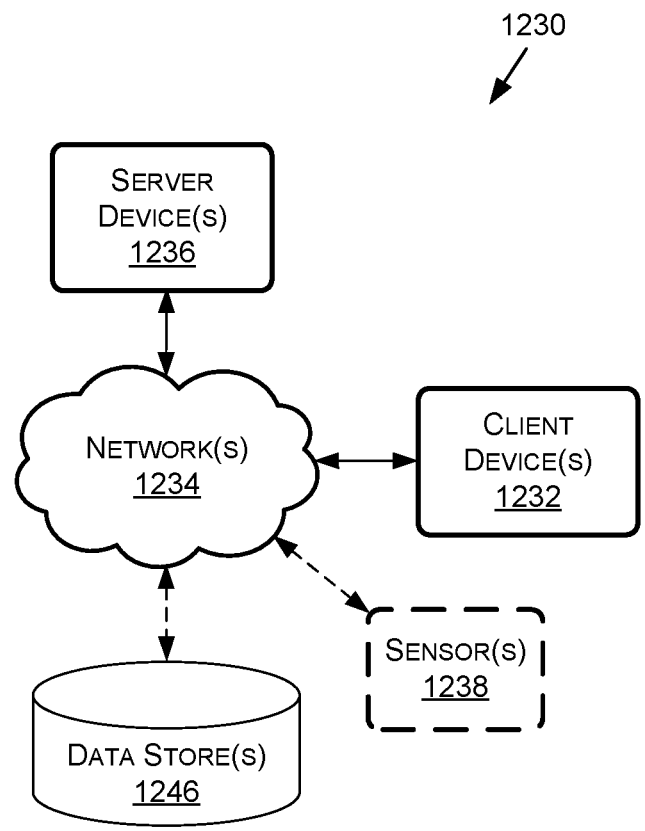
FIG. 12 is an illustration of an example operating environment, in accordance with some embodiments of the present disclosure.

The sensor data 102 may be generated using any combination of sensors, such as the sensor(s) 1238 of FIG. 12. For example, the sensor data 102 may include image data representing an image(s), image data representing a video (e.g., snapshots of video), and/or sensor data representing fields of view of sensors (e.g., LIDAR sensor(s) 1364, RADAR sensor(s) 1360, a camera(s) of FIG. 13B, etc.). In the example shown, the sensor data 102 includes image data representative of fields of view of respective cameras of the vehicle 140, which may include one or more images. The image(s) may depict regions of the environment 126, where the regions may include any number of objects, examples of which include objects 128A and 128B. The objects may include any combination of vehicles, people (e.g., pedestrians), motorcycles, bicyclists, trees, animals, buildings, signs, or other structures, objects or obstacles the vehicle 140 may be capable of colliding with in the environment 126.

The sensor data 102 may be provided to the object analyzer 106 and used by the object analyzer 106 to analyze objects in the environment 126. For example, the object analyzer 106 may detect one or more of the objects 128A or 128B, identify one or more of the objects, and/or determine parameters of one or more of the objects using the sensor data 102. To do so, the object analyzer 106 may employ one or more machine learning models. For example, and without limitation, the machine learning model(s) may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

Examples of parameters of an object that the object analyzer 106 may determine using the sensor data 102 includes one or more of a location (e.g., in the environment 126, such as location coordinates), a pose, a current and/or observed velocity, a maximum velocity, a predicted velocity, at least one dimension (e.g., physical dimensions such as length, width, footprint, height, etc.), a current and/or observed acceleration or deceleration, a maximum acceleration or deceleration, a predicted acceleration or deceleration, a mass, a reaction time, and/or other parameters, such as, but not limited to, those described herein. One or more of the parameters may represent an observed characteristic of the object (e.g., a location/position) and one or more of the parameters may represent an inferred characteristic of the object (e.g., maximum acceleration).

In some examples, a parameter(s) of an object may be an output(s) of a machine learning model(s), such as a convolutional neural network that receives at least some of the sensor data 102 as an input(s). In further examples, the object analyzer 106 may use at least one machine learning model(s) to classify one or more of the objects captured by the sensor data 102. Examples of classifications include stationary, moving, vehicle, car, truck, pedestrian, bicyclist, motorcycle, etc.

The object analyzer 106 may use the classifications to determine one or more of the parameters. For example, a classification may be provided as an input to a machine learning model(s) used to determine one or more of the parameters. As another example, one or more classifications and/or other object information (e.g., other parameters) may be applied to a lookup table(s) or otherwise used to lookup, determine, and/or calculate one or more of the parameters. As an example, a classification may include a vehicle model or type (e.g., sedan, truck, motorcycle, SUV), which has one or more predetermined shapes and/or dimensions, braking capabilities, handling capabilities, acceleration capabilities, maximum velocity, maximum acceleration, etc., that may be used to define one or more parameters. In some examples, a machine learning model(s), such as a convolutional neural network, may be trained to concurrently output a classification of an object and one or more of the parameters of the object.

As examples, the object analyzer 106 may implement object perception using machine learning model(s) (e.g., a neural network(s)) that may be specifically configured (e.g., trained) to recognize certain objects and/or features of the objects. One or more trained machine learning models (e.g., trained and deployed for use by the trajectory evaluation system 100) used by the object analyzer 106 may determine the presence and/or location of an object (e.g., X and Y coordinates), the object's pose ($\varphi$), the obstacle's dimensions (e.g., width and length), and/or a classification for the object. Further, a trained machine learning model (e.g., a neural network(s)) may be used to determine the objects maximum acceleration ($A_{MAX+}$) and maximum deceleration ($A_{MAX-}$).

As further examples, an object's reaction time ($T_{REACT}$) may be determined using a trained machine learning model (e.g., a neural network(s)) that identifies or outputs the type of object (e.g., an object classification) and/or assigns a corresponding reaction time. The reaction time of an object may represent a future time when or a time until the object's motion will begin to be affected by a presence of another object, such as the vehicle 140, in the environment 126. This may correspond to the object perceiving, noticing, and/or determining that a collision may occur with the other object at a position in the environment. For example, a pedestrian staring at his or her smartphone may have a long reaction time $T_{REACT}$. Likewise, a bicyclist or motorcyclist looking away from the position may be deemed to have a longer reaction time $T_{REACT}$, than, for example, an attentive driver. In contrast, an object that is an autonomous vehicle (such as a robo-taxi) may have a short reaction time $T_{REACT}$, because an autonomous vehicle may be less susceptible to distraction and may be assumed to be monitoring objects in its path and reacting to the objects more quickly than a human driver.

As examples, the object analyzer may detect one or more of the objects 128A and 128B, identify one or more of the objects 128A and 128B, and/or determine parameters and/or classifications of one or more of the objects 128A and 128B (e.g., on the vehicle 140 and/or the server(s) 1378) using the sensor data 102 and/or other information received from one or more of the objects 128A and 128B, the sensor(s) 138, and/or the client device(s) 1232 in the operating environment 130. For example, the communications manager 104 may receive corresponding data over the network(s) 1234 of FIG. 12. Furthermore, one or more of the objects the object analyzer 106 may detect, identify, and/or determine parameters and/or classifications that may not be directly represented by the sensor data 102, but may be inferred, predicted, or otherwise determined to be present or potentially be present by the object analyzer 106 (e.g., based at least on the sensor data 102). This may be used to account for blind corners or spots in perception by the trajectory evaluation system 100.

The object modeler 108 may be configured to model one or more objects, such as the object 128A and/or 128B in the environment 126 based at least on the analysis performed by the object analyzer 106 (e.g., based at least on the one or more parameters associated with the object(s)). Additionally or alternatively, the object modeler 108 may filter out one or more objects from modeling (e.g., trajectory modeling). For example, the object modeler 108 may filter out an object based at least on a classification of the object (e.g., as stationary) and/or based at least on a type of the object. Additionally or alternatively, the object modeler 108 may filter out one or more objects based at least on one or more parameters of the object(s), such as any of the parameters determined by the object analyzer 106 (e.g., by filtering out objects based at least on locations of the filtered objects being beyond a threshold distance from the vehicle 140). This filtering may reduce the processing power used to determine arrival times and may further be used to improve trajectory evaluation in lane driving scenarios with vehicles driving parallel to the vehicle of interest in adjacent lanes or with respect to oncoming traffic.

The object modeler 108 may use any suitable approach for modeling the objects in the environment 126, such as by representing each object, for example, as a radial distance function (and/or other one or more other functions), or a list of known positions of the object in the environment 126 (e.g., represented as a plane). The representation of an object may, for example, be defined using at least one dimension parameter (e.g., width, length), location parameter (e.g., X, Y in the environment 126), and/or pose of the object determined using the object analyzer 106. Optionally a safety buffer may be included in the representation of an object (e.g., by expanding its dimensions). A model for an object may further include one or more motion vectors of the object, such as current and/or instantaneous motion vectors (e.g., observed motion vectors derived from the sensor data 102). For example, each object may have a motion vector and an acceleration vector defined using at least one parameter determined for the object using the object analyzer 106 (e.g., using the object's pose, acceleration/deceleration, and velocity). The object modeler 108 may further model an object using its maximum acceleration and/or deceleration parameters, maximum velocity parameter, and/or mass parameter.

The object modeler 108 may model one or more trajectories of an object using a representation or model of the object. To do so, the object modeler 108 may apply one or more motion profiles to the representation of the object to define the velocity and acceleration of the object at particular times and locations along a trajectory for the object in the environment 126, examples of which are described with respect to FIG. 2.

Figure 2:
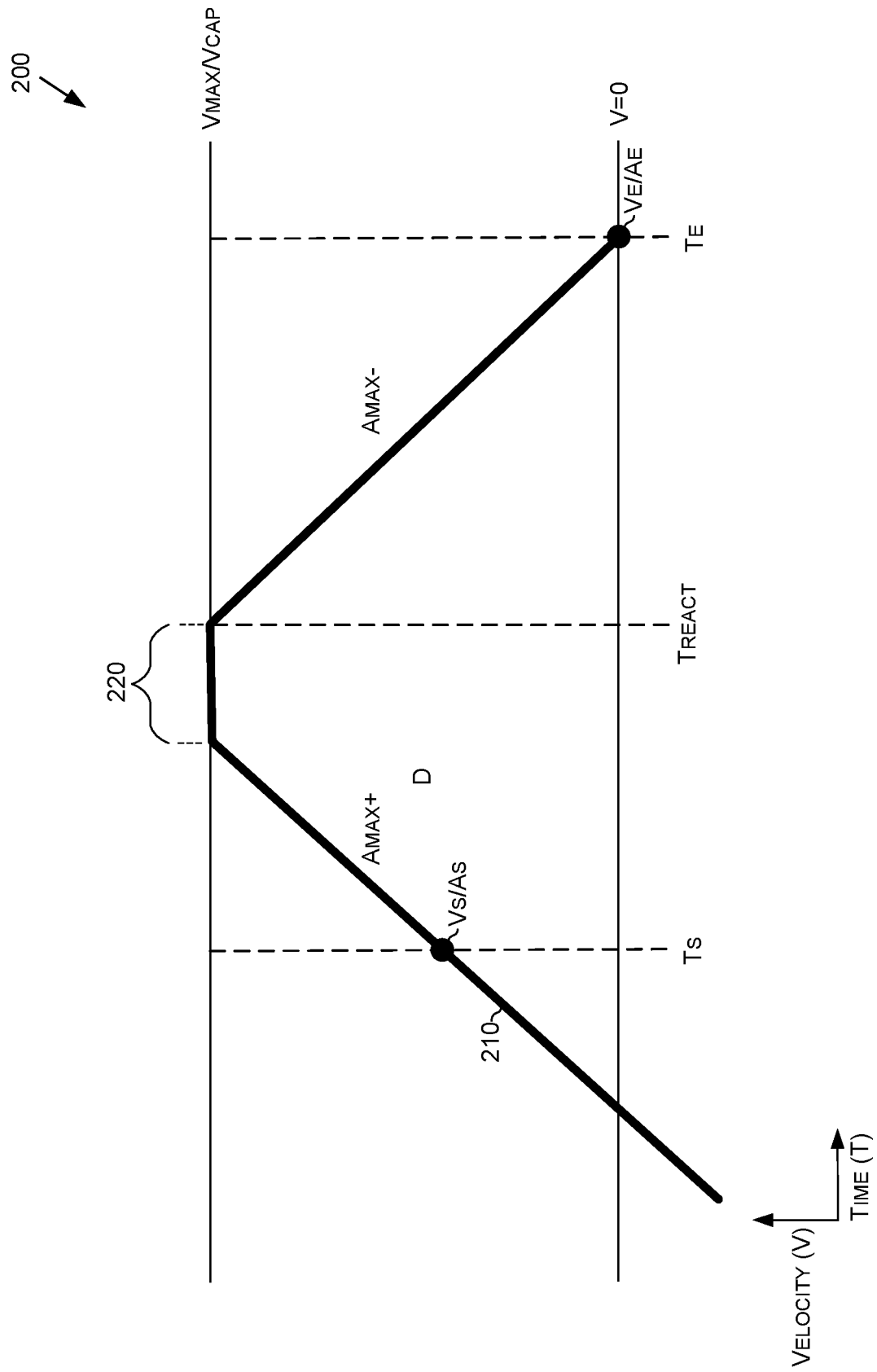
FIG. 2 includes a chart used to describe examples of motion profiles, in accordance with some embodiments of the present disclosure.

Referring now to FIG. 2, FIG. 2 includes a chart 200 used to describe examples of motion profiles that may be used to define modeled trajectories of objects. The chart 200 includes a plot 210 that may correspond to a motion profile that defines motion of an object over time according to a trajectory. The object modeler 108 may represent a motion profile, for example, using one or more functions (e.g., a continuous function) and/or rules, which are used to define the plot 210 for an object.

The motion profile defining the plot 210 may include a number of stages such as a stage where the object follows a trajectory directed to a position in the environment 126 at maximum acceleration $A_{MAX+}$ (e.g., even if the object is currently moving away from the object), optionally restricted by the maximum velocity $V_{MAX}$, or a velocity cap $V_{CAP}$, a stage where the object begins to decelerate at the maximum deceleration $A_{MAX-}$ (which may optionally be the same as $A_{MAX+}$) until the object comes to a complete stop, and/or a stage where the object remains stopped. A motion profile may include a parameter the object modeler 108 uses to set the time the object begins to decelerate in the motion profile, such as the reaction time $T_{REACT}$ (e.g., as described herein). An observed acceleration $A_{OBS}$ may be used in place of the maximum acceleration $A_{MAX+}$ or maximum deceleration $A_{MAX-}$ and may be adjusted by a safety factor, to allow for the possibility that the observed acceleration is inaccurate, and/or to allow for the possibility that the acceleration may increase.

The motion profile corresponding to FIG. 2 may be used to represent worst case scenarios for the safety of a vehicle, computed as if the vehicle 140 was located at a position at one or more points in time. The reaction time $T_{REACT}$ in these scenarios may represent the time it takes an operator (e.g., a driver) of an object (e.g., another vehicle) to notice the vehicle at the position and attempt to avoid a collision at the position. However, other motion profiles may be used by the object modeler 108 to model one or more trajectories of any of the various objects, which may include any number of stages. Also, one or more of the motion profiles may be more complex than the motion profile described, including conditions or rules on entering stages or used during stages that vary motion of an object based at least on the object modeler 108 analyzing and applying variables representative of different features of a state(s) of the environment 126 at a given time(s).

A trajectory modeled by the object modeler 108 may have a start time $T_S$, representative of a start time of the trajectory, and an end time $T_E$, representative of an end time of the trajectory. FIG. 2 shows a particular example of the start time $T_S$ having a starting velocity $V_S$ and a starting acceleration $A_S$. The object modeler 108 may set the starting velocity $V_S$ and the starting acceleration $A_S$ to the current, observed, and/or instantaneous velocity and acceleration parameters provided by the object analyzer 106, or the starting velocity $V_S$ and/or the starting acceleration $A_S$ may be derived from those values. In at least one embodiment, the starting acceleration $A_S$ may be set to the maximum acceleration $A_{MAX}$.

The example in FIG. 2 indicates that at the start time $T_S$ of the trajectory, the starting velocity $V_S$ and the starting acceleration $A_S$ of the object are positive relative to the vehicle 140, meaning the object is moving towards the vehicle 140 at an increasing rate. However, if the object were to be initially moving away from the vehicle 140 at the start time $T_S$, then the starting velocity $V_S$ and/or the starting acceleration $A_S$ of the object may be negative relative to the vehicle 140. In other examples, either the starting velocity $V_S$ or the starting acceleration $A_S$ may be zero. This may depend upon the stage of the motion profile that the object is in during the start time $T_S$.

FIG. 2 also shows a particular example of the end time $T_E$ having an ending velocity $V_E$ and an ending acceleration $A_E$. The ending velocity $V_E$ and the ending acceleration $A_E$ may be zero, as shown, indicating that the object has come to a complete stop at the end of the trajectory. However, in other examples, the ending velocity $V_E$ and/or the ending acceleration $A_E$ may be positive or negative at the end of the trajectory. For example, the start time $T_S$ may correspond to any position along the plot 210 depending on what stage the object is at in the motion profile at the start of the trajectory, and similarly, the end time $T_E$ may correspond to any position along the plot 210 after the start time $T_S$ depending on the stage the object is at in the motion profile at the end of the trajectory (e.g., the object may not yet have come to a complete stop).

Further, where the object modeler 108 models trajectories for multiple objects using the same motion profile, different objects may be in different stages of the motion profile at the same times. For example, one object may be decelerating to a stop at the start time $T_S$ in its modeled trajectory, and may have remained stopped for a period of time until the end time $T_E$, while a second object may be accelerating toward the vehicle 140 at the start time $T_S$ in its modeled trajectory, and may be traveling at the maximum velocity $V_{MAX}$ at the end time $T_E$. Also, in at least one embodiment, the motion profile may not include a stage where the object begins to decelerate. For example, the motion profile may be used to model a time the object could reach a point in space without decelerating (e.g., to model an earliest possible arrival time of the object to the point), and therefore the region 220 in which the object is modeled to reach the maximum velocity $V_{MAX}$ may continue until the end time $T_E$ where the point is reached (unless the end time $T_E$ comes before the maximum velocity $V_{MAX}$ is reached).

FIG. 2 illustrates that in some examples, a motion profile may be applied by the object modeler 108 using one or more of the maximum velocity $V_{MAX}$ of an object, the maximum acceleration $A_{MAX+}$ of the object, or the maximum deceleration $A_{MAX-}$ of the object. These values may represent limits on the motion capabilities of the object, and any of these values may correspond to parameters determined for the object using the object analyzer 106, as described herein. By way of example, the plot 210 includes the region 220 in which the object is modeled to reach the maximum velocity $V_{MAX}$ during the modeled trajectory. However, in other trajectories, the object may not reach one or more of the maximum velocity $V_{MAX}$, the maximum acceleration $A_{MAX+}$, or the maximum deceleration $A_{MAX-}$ during the trajectory, or the object modeler 108 may not use one or more of these factors in applying a motion profile.

FIG. 2 also illustrates the velocity cap $V_{CAP}$, which may be accounted for in a modeled trajectory. The velocity cap $V_{CAP}$ may be greater than the maximum velocity $V_{MAX}$ and may correspond to an observed velocity of the object that is greater than the maximum velocity $V_{MAX}$. For example, the velocity cap $V_{CAP}$ may correspond to a parameter that the object analyzer 106 determines, from the sensor data 102, indicating that the object is traveling faster than the maximum velocity $V_{MAX}$ or is capable of traveling faster than the maximum velocity $V_{MAX}$. For example, the object modeler 108 may initially use the maximum velocity $V_{MAX}$ in applying a motion profile for an object to model a trajectory of the object. After determining the object is traveling or has traveled faster than the maximum velocity $V_{MAX}$, the object modeler 108 may instead use the velocity cap $V_{CAP}$ to update the modeled trajectory or to model a different trajectory for the object. A similar approach may be used for maximum acceleration or deceleration.

Figure 3A:
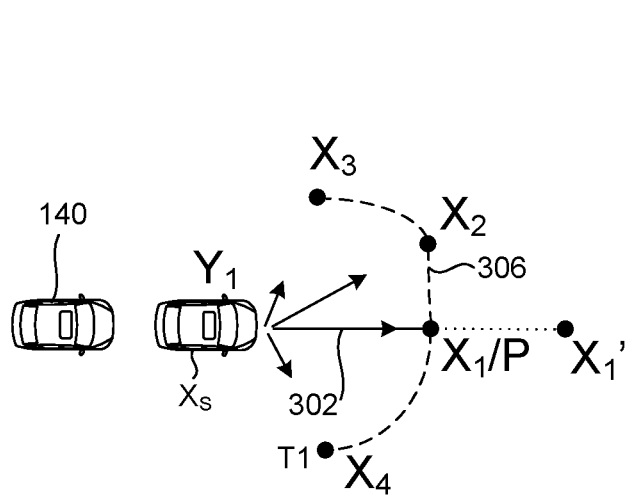
FIG. 3A is an illustration including an example object trajectory, in accordance with some embodiments of the present disclosure.

Referring now to FIG. 3A, FIG. 3A is an illustration including an example trajectory 302, in accordance with some embodiments of the present disclosure. The trajectory 302 may correspond to the modeled trajectory described with respect to FIG. 2. The object modeler 108 may model the trajectory 302 of an object $Y_1$ (e.g., the object 128A or 128B) using a start position $X_S$ of the object, corresponding to a location or position of the object $Y_1$ in the environment 126 at the start time $T_S$. The object modeler 108 may also model the trajectory 302 using an end position $X_1$ of the object $Y_1$, corresponding to a location or position of the object $Y_1$ in the environment 126 at the end time $T_E$.

The start position $X_S$ of the object $Y_1$ may correspond to a location parameter determined using the object analyzer 106. The location parameter may be determined, for example, in real-time or near real-time by the object analyzer 106, such that the start position represents a substantially current position of the object $Y_1$ in the environment 126. However, the start position $X_S$ may in some examples be a predicted current or future location of an object in the environment, such as where the object $Y_1$ is obscured from being perceived by the sensor(s) 138, where the object $Y_1$ does not necessarily exist in the environment, but is modeled to account for blind corners or spots in perception by the trajectory evaluation system 100, or other scenarios.

In FIG. 3A, the object modeler 108 may have modeled the trajectory 302 to head directly toward the end position $X_1$ of the object $Y_1$ (e.g., a position in the environment 126 for which an arrival time is being determined), as shown. This approach may be used by the object modeler 108 in conjunction with the motion profile described above to model a worst case scenario in which the operator of the object $Y_1$ attempts to reach the end position $X_1$ as quickly and directly as possible. The object modeler 108 may use a similar approach in determining arrival times for each position in the environment 126 and each modeled object in the environment, or one or more trajectories may follow other paths and/or use different motion profiles. In some examples, the object modeler 108 may make a determination to use a default path and/or motion profile to model a trajectory (e.g., the motion path corresponding to the plot 210 and a direct path), and in others, the object modeler 108 may make a determination to use a different path and/or motion profile to model a trajectory (e.g., where a planned trajectory for an object is known, for example after being provided by the object).

As described herein, the arrival time determiner 112 may be configured to analyze the trajectories modeled by the object modeler 108 to compute one or more arrival times for one or more objects to one or more locations in the environment 126. For example, the arrival time determiner 112 may use modeled trajectories to determine when an object will occupy one or more locations in the environment 126, and the velocity and acceleration of the object at those locations. Such combinations of locations and times may form one or more points in space-time and may be determined using a variety of possible criteria. For example, a point may represent the earliest possible arrival time of an object to the point (as estimated or predicted by the system). In one or more embodiments, an arrival time to a point may represent a safe arrival time (e.g., a latest safe arrival time) for the vehicle 140 to that point, where the vehicle 140 arriving to that point at least prior to the safe arrival time would not result in a collision with the object. However, an arrival time may be evaluated under other criteria, such as that a collision that results would have less than a threshold impact, which may be computed based at least on the modeled mass and velocity of the object, that the collision has less than a threshold probability of occurring, or that the vehicle 140 is capable of coming to a complete stop prior to the arrival time(s) of the object to the point(s).

In some examples, to determine at least one safe arrival time for the end position $X_1$, the object modeler 108 models the trajectory 302 to the end position $X_1$. Based at least on computing that the object $Y_1$ will come to a complete stop at (or in other examples prior to) the end time $T_E$ of the trajectory 302, the arrival time determiner 112 may determine that the end time $T_E$, and/or any time prior to the end time $T_E$ in the trajectory 302 is a safe arrival time of the vehicle to the end position $X_1$. For example, given a position P in the environment, because it may be determined that the end position $X_1$ has an end time $T_E$ where the object $Y_1$ may stop at the position P under a worst case scenario for the trajectory of the object, the end time $T_E$ may be deemed a safe arrival time for the position P. Thus, it may be assumed that any time earlier is also a safe arrival time to the position P. As such, the start time $T_S$ and the end time $T_E$ of the trajectory 302 may constitute a safe time interval for the vehicle with respect to the object $Y_1$ and the position P. In other examples, the object $Y_1$ may not come to a complete stop prior to the end time $T_E$ of the trajectory 302, and may instead have an end position $X_1'$. In this case, it may be determined the safe arrival time is zero for the position P and the object $Y_1$ because it is possible for the object $Y_1$ to put itself in a state that it is already committed to passing the position P.

Another case where the safe arrival time may be set to zero may be where the object $Y_1$ is committed to the position P from the beginning, and the parabola of acceleration in the opposite direction passes through the position P. As an example, this may occur if the position P were at the start position $X_S$ of the trajectory 302. This may happen, for example, when the vehicle 140 is following the object $Y_1$, which is a lead vehicle that is moving at a rapid pace away from the vehicle 140 (an example of which is shown in FIG. 3A). In that case, the vehicle 140 may inevitably pass some positions in front of it (and typically passes through them). Here, it may be clear the parabola is past the position P for a time interval (e.g., an unsafe time interval).

A non-limiting example of computing a safe arrival time with respect to the object $Y_1$ at an obstacle point Y (e.g., the start position $X_S$ in a plane) and a target point X (e.g., the position P in the plane) follows. Given the object $Y_1$ at the obstacle point Y having a velocity vector V (e.g., the starting velocity $V_S$ the in the plane), a scalar maximum velocity $v_{max}$ (e.g., the maximum velocity $V_{MAX}$), a scalar maximum acceleration (e.g., the maximum acceleration $A_{MAX}$) and a reaction time $\tau_{react}$ (e.g., the reaction time $T_{REACT}$), a scalar distance d may be computed as $$d = |X - Y|$$

and scalar (signed) velocity v may be computed as $$v = dot\left(V, \frac{X-Y}{d}\right).$$

In some examples, this may be generalized to any function that distributes a maximum starting velocity to each direction, the dot product making a concrete suggestion for such a function. A safe arrival time $t_{lsa}$ (e.g., a latest safe arrival time) for the object $Y_1$ at the obstacle point Y may be computed by the following of formulas:

$$v_{cap} = \max(v, v_{max})$$

$$A = d + \frac{v^2}{2a_{max}}$$

$$t_{pre} = \begin{cases} \sqrt{\frac{A}{a_{max}}}, & Aa_{max} < v_{cap}^2 \\ \frac{A}{v_{cap}}, & \text{otherwise} \end{cases}$$

$$t_{lsa} = \max\left(0, t_{pre} - \frac{v}{a_{max}} - \tau_{react}\right).$$

For each position in the plane that is evaluated, the minimum of all of the safe arrival times $t_{lsa}$ from all the objects (e.g., points) may be computed in parallel. If the input is a radial distance function, the time may be set to zero for all points on the rays further away than the radial distance function. This approach may be used by the arrival time determiner 112 to produce a visualization (e.g., image). Further, in some examples, any of the safe arrival times $t_{lsa}$ for any of the objects may be computed at any suitable time, such as to test and/or generate paths and/or trajectories (e.g., as needed, which may not involve generating a visualization).

In any example, the object modeler 108 and the arrival time determiner 112 may account for additional factors to determine arrival times of objects. For example, a slope to position P may be estimated using the sensor data 102 received and processed by the object analyzer 106. An uphill slope to the target point may be used as a factor to reduce the accelerations (or increase the deceleration) to the target point. Similarly, a road surface coefficient μ may be estimated using information received and processed by, for example, a perception block of the vehicle 140 (e.g., similar to object perception which may be performed by the object analyzer 106). For example, a trained neural network(s) may detect the presence of ice, snow, or oily roads and return a road surface coefficient μ, which may be used as a factor that reduces the maximum deceleration to the position P.

FIG. 3A also shows end positions $X_2$, $X_3$, and $X_4$ of other trajectories that the object modeler 108 may model, such as using the motion profile corresponding to the plot 210 or a different motion profile(s) and/or a direct path to each of the end positions $X_2$, $X_3$, and $X_4$ (or a different type of path). The end positions $X_2$, $X_3$, and $X_4$ are provided as examples of positions in trajectories that have at least one arrival time in common. This may be represented in FIG. 3A with the end positions $X_1$, $X_2$, $X_3$, and $X_4$ plotted in a space-time domain forming points of a contour 306 that represents the arrival time shared between positions or locations in the environment 126. The contour 306 may additionally or alternatively be representative of a shared time interval of the positions (e.g., with the contour 306 representing an end time of the interval). In at least one embodiment, one or more points of the contour 306 may be used by the trajectory analyzer 114 to determine whether one or more points in space-time of the trajectory 144 would be safe for the vehicle 140 to occupy. For example, the trajectory analyzer 114 may use point(s) of the contour 306 to detect or determine a potential intersection with one or more points in space-time that the vehicle 140 would occupy were the vehicle 140 to implement one or more safety procedures at the one or more points in space-time of the trajectory 144. Using this approach, the trajectory analyzer 114 may determine the given time(s) and position(s) of the trajectory 144 would be unsafe as a collision may occur under the modeled conditions.

While FIG. 3A is described with respect to the arrival time determiner 112 analyzing positions and times with respect to a single object $Y_1$, in computing one or more arrival times and/or time intervals, the arrival time determiner 112 may account for any number of objects, such as any of the various objects modeled using the sensor data 102. For example, FIGS. 3B and 3C illustrate contours representative of arrival times that account for multiple objects in the environment.

Figure 3B:
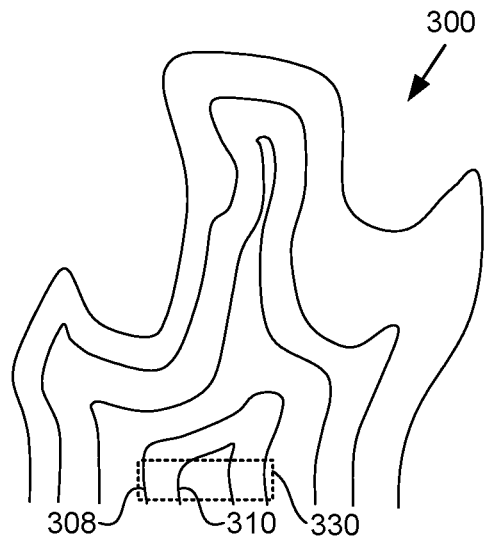
FIG. 3B is an illustration of a portion of a contour map representative of arrival times, in accordance with some embodiments of the present disclosure.
Figure 3C:
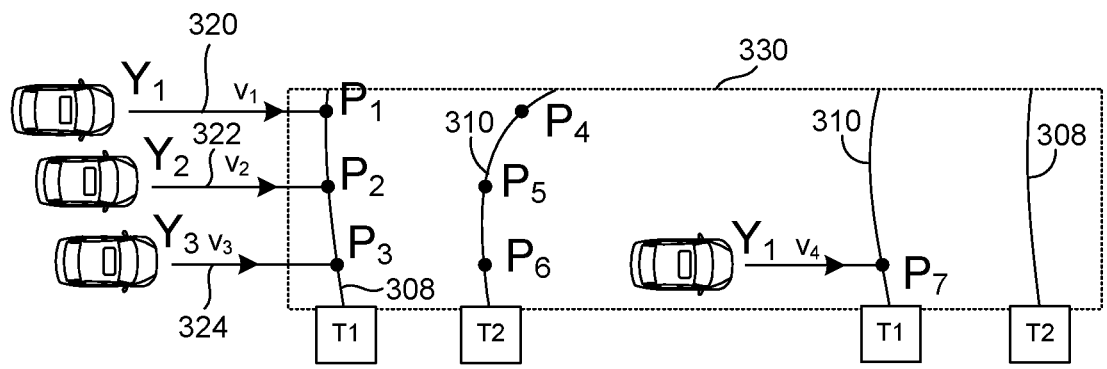
FIG. 3C is an illustration of a contour map representative of arrival times, in accordance with some embodiments of the present disclosure.
Figure 3C:
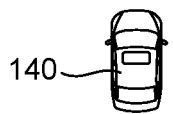

In FIG. 3C, the object $Y_1$ may correspond to the object 128A of FIG. 1, the object $Y_2$ may correspond to the object 128B of FIG. 1, and the object $Y_3$ may correspond to an object that is not represented in the sensor data 102, but is modeled using the object modeler 108. For any of the positions $P_1$, $P_2$, $P_3$, $P_4$, $P_5$, $P_6$, and $P_7$ the arrival time determiner 112 may use the arrival time and/or time interval of the object that occurs earliest amongst the modeled objects and trajectories for a particular position. For example, for the position $P_1$, the arrival time determiner 112 may use the arrival time for the object $Y_1$, as it occurs prior to arrival times of the objects $Y_2$ and $Y_3$ for the position $P_1$.

The arrival times and/or time intervals used by the object modeler 108 for the positions $P_1$, $P_2$, and $P_3$ may be represented in FIG. 3C as plotted in a space-time domain forming points of a contour 308 that represents the arrival time T1 (and/or time interval) along corresponding positions in the environment 126 (e.g., similar to the contour 306) but accounting for multiple objects. Similarly, the arrival times and/or time intervals used by the object modeler 108 for the positions $P_4$, $P_5$, $P_6$, and $P_7$ may be represented in FIG. 3C plotted in the space-time domain forming points of a contour 310 that represents the arrival time T2 (and/or time interval) along positions in the environment 126.

FIG. 3B shows a contour map 300 comprising additional portions of the contours 308 and 310 of FIG. 3C, as well as other contours for different arrival times and/or time intervals and positions in the environment 126. A region 330 in FIG. 3B may correspond to the region 330 in FIG. 3C. Although the contours of FIG. 3B correspond to multiple objects, in other examples any of those contours may correspond to a single object. Further, an infinite number of contours may exist with each corresponding to a different arrival time and/or time interval (if any). In any example, the arrival time determiner 112 may compute data representative of one or more of the contours, portions of the contours, and/or corresponding positions and arrival times (e.g., points in space-time).

Further, in some examples, the data may comprise image data representative of an image(s) that captures any of the forgoing information. For example, the arrival time determiner 112 may generate the image as a visualization based at least on the arrival times. Data values of an image (e.g., pixel values, vector graphics values, analog values, digital values, etc.) used as a visualization may be computed in parallel, such as by using parallel processing, which may occur on one or more graphics processing units (GPUs), such as the one or more graphics processing units (GPUs) 1508 of FIG. 14, the GPU(s) 1308 of FIG. 13C, and/or the GPU(s) 1320 of FIG. 13C. In at least one embodiment, data values (e.g., pixel values, vector graphics values, analog values, digital values, etc.) of the image may be representative of at least portions of safe time intervals. For example, the arrival time determiner 112 may use one or more pixels or points of a visualization to represent arrival times, such as by setting brightness values, color values, and/or other values associated with the pixels or points or used to generate the pixels or points. Each point or pixel of a visualization generated by the arrival time determiner 112 may be representative of an arrival time and a position in the environment 126. The location of the point or pixel in the visualization may correspond to the position in the environment 126, and the coloration or other properties of the point or pixel in the visualization may correspond to the arrival time for the position (e.g., a safe arrival time).

The one or more trajectories that are analyzed by the trajectory analyzer 114 may have been generated by another system or component (e.g., a behavioral planner of the vehicle 140), which may not have accounted for the arrival times and/or the time intervals, by way of example. In at least one embodiment, one or more of the trajectories may have been generated using the behavior planning architecture 800 of FIG. 8. The trajectories may be represented using any suitable approach including using trajectory point(s) in space-time, and/or a spline or other function. For example, the vehicle trajectory information 124 may include, a trajectory point(s) 142 (e.g., as represented by 2D or 3D coordinates in world space, and/or 2D coordinates in image space) along the trajectory 144. In some examples, only a single trajectory point 142 (e.g., the next trajectory point for the vehicle 140 in a sequence of discretized trajectory steps) may be available (e.g., output by a machine learning model(s)). In other examples, more than one trajectory point 142 may be available. In at least one embodiment, one or more trajectory points 142 may be computed and/or extrapolated from one or more other trajectory points 142. In some examples, a radius or inverse radius of the trajectory 144 may be used to compute one or more trajectory points 142 (e.g., where a turn, a lane change, a lane split, a lane marge, and/or a curve is included in the trajectory 144).

As described herein, the trajectory analyzer 114 may be configured to evaluate one or more trajectories 144 based at least on the arrival times determined by the arrival time determiner 112. For example, the trajectory analyzer 114 may compute one or more points in space-time that correspond to one or more objects (e.g., the object 128A and/or the object 128B) in the environment 126. The trajectory analyzer 114 may use the one or more points in space-time that correspond to the one or more objects to evaluate the trajectory 144 with respect to one more points in space-time within the trajectory 144. For example, the trajectory analyzer 114 may compute, from the one or more points within the trajectory 144, one or more points in space-time that correspond to the vehicle 140 implementing one or more safety procedures (e.g., points that the vehicle 140 would occupy were the vehicle 140 to implement the one or more safety procedures). The trajectory analyzer 114 may then compare these one or more points to the one or more points that correspond to the one or more objects to evaluate the trajectory 144. Based on a result of the comparison, the trajectory 144 may be scored, eliminated from consideration, or otherwise considered for control of the vehicle 140.

FIG. 1 indicates examples of the one or more points in space-time that correspond to at least the object 128A (e.g., a pedestrian). In particular, FIG. 1 shows contours for arrival times $T_A$ of $C_0$, $C_1$, $C_2$, and $C_3$ for the object 128A. The one or more points computed by the arrival time determiner 112 and/or used by the trajectory analyzer 114 to evaluate the trajectory 144 may include one or more points on any of those contours. By way of example and not limitation, the contours in FIG. 1 form concentric circles around the object 128A with arrival times that increase with distance from the starting position of the object 128A. As described herein, when multiple objects are accounted for, the contours/points may be computed as the minimum arrival time of the objects.

FIG. 1 also indicates examples of the one or more points within the trajectory 144 that the trajectory analyzer 114 may evaluate with respect to the points associated with the arrival times. In particular, FIG. 1 indicates locations of the vehicle 140 for trajectory times $T_T$ of $T_1$, $T_2$, and $T_3$, where, by way of example and not limitation, $T_0=0$, $T_1=0.5$, and $T_2=1.0$. The locations and trajectory times may include one or more of the points that may be evaluated against one or more points associated with the arrival times. For example, the trajectory analyzer 114 may sample the trajectory 144 at one or more of the trajectory times for comparison against the points associated with the arrival times. In various embodiments, the trajectory analyzer 114 may use any number of samples of the trajectory 144 at any number of trajectory times $T_T$. In one or more embodiments, the trajectory analyzer 114 may evaluate the samples for different time steps, which may, by way of example, and not limitation, be spaced at 0.5 second intervals. Generally, any number of time steps may be used for samples with any time interval or amount of time between the time steps. Further, the time intervals may be the same or different from one trajectory time $T_T$ that is sampled to the next.

FIG. 1 further indicates examples of the one or more points in space-time that correspond to the vehicle 140 implementing one or more safety procedures, which may be computed from the one or more points within the trajectory 144. In particular, FIG. 1 indicates points of the vehicle 140 in space-time that would be occupied by the vehicle 140 implementing safety procedures 140A, 140B, and 140C respectively at the trajectory times $T_T$ of $T_0$, $T_1$, and $T_2$ within the trajectory 144. In order to evaluate a sample of the trajectory 144, the trajectory analyzer 114 may compare one or more of the points that correspond to the safety procedure of the sample to one or more points of the arrival times.

As described herein, the trajectory analyzer 114 may employ the safety procedure determiner 110 to determine the safety procedure(s) for the vehicle 140 for a given sample. The safety procedure determiner 110 may determine the safety procedure(s) for a sample at a trajectory time $T_T$ based at least on a state of the vehicle 140 at the trajectory time $T_T$. The state of the vehicle 140 may be determined using the object analyzer 106, may include at least some information that is the same as or similar to the information determined for other objects described herein, and may be derived using similar or different approaches. In one or more embodiments, the object analyzer 106 may determine the state of the vehicle 140 using any combination of sensors, such as the GNSS sensors 1358, the IMU sensor(s) 1366, the speed sensor(s) 1344, the steering sensor(s) 1340, etc. of the vehicle 140. For example, state information may correspond to one or more sensor readings.

Examples of state information includes a location, a speed, a direction (e.g., direction of travel), a velocity, an acceleration(s) (e.g., scalar, rotational, etc.), a pose (e.g., orientation) and/or other information. The state may encode or represent the position of the vehicle 140 in two-dimensional space (e.g., (x, y) coordinates), a unit direction of the vehicle 140, and/or a scalar velocity of the vehicle 140 at a point in time. In some examples, the state may encode or represent additional or alternative information, such as rotational velocity (e.g., yaw) and/or scalar acceleration in any direction. For example, a state, $x_A$, for the vehicle 140, may be parameterized as an m-dimensional state vector, represented as follows, in equation (1):

$$x_A(t) \in \mathbb{R}^m \qquad (1)$$

As an example, such as where the state, $x_A$, is a five-dimensional vector (e.g., m=5), the state vector may be represented as follows, in equation (2):

$$x_A = [y^T d^T v]^T \qquad (2)$$

where y is the position of the vehicle 140 in two-dimensional space, d is a unit direction vector, and v is a scalar velocity.

When the state of the vehicle 140 is viewed as a function of time, a vector may represent a state trajectory, $X_A$, of the vehicle 140 (e.g., the state trajectory, $X_A$, may represent or encode each state, $X_A$, of the vehicle 140 at each time within a period of time).

The safety procedure determiner 110 may use the state of the vehicle 140 (and/or other objects in the environment 126) to determine a control model for the vehicle 140. For example, a control model may be represented as follows, in equation (3):

$$\frac{dx_A}{dt} = f(x_A, t, c) \qquad (3)$$

As such, the control model for the vehicle 140 may represent a derivative of the state of the vehicle 140, $x_A$, with respect to time, t. The explicit differential equation may include control parameter(s), c, that may model user input, such as steering, braking, and acceleration. For example, in some examples, the control model for the vehicle 140 may be expressed according to equation (4), below:

$$\frac{dx_A}{dt} = [vd^T vbd_\perp^T a]^T \qquad (4)$$

where v is a scalar velocity, d is unit direction vector, a is a scalar acceleration amount, b is a scalar steering parameter, and di is the perpendicular to d, generated by flipping the coordinates of d and negating the first coordinate. In the example of equation (4), the control parameters may be a, the scalar acceleration amount, and b, the scalar steering parameter.

Once the control model is determined, a control policy may be determined (e.g., by the safety procedure determiner 110). For example, the control parameters may be a function of the world state, $x_w$ (or a perception of the world state based on the sensor data generated by the sensors of the vehicle 140), and time, t. As such, a control policy may be a function of the joint state space of the world and time into $\mathbb{R}^m$ (where m is the dimension of the state space of the vehicle 140) that is smooth and bounded. For example, a control policy may be represented as follows, in equation (5):

$$\frac{dx_A}{dt} = f(x_w, t) \qquad (5)$$

Once the control policy is determined, a safety procedure(s) may be determined for the vehicle 140 (e.g., by the safety procedure determiner 110). For example, the vehicle 140 may be assumed to have a safety procedure, $S_A$. The safety procedure may have an associated trajectory(ies) derived from any starting state, $x_A$, of the vehicle 140. In embodiments, the starting state $x_A$ for a sample of the trajectory 144 may be or correspond to the state at the trajectory time $T_T$ of the sample. The safety procedure may represent the trajectory(ies) of the vehicle 140 as the actor transitions form the state, $x_A$, to an actor state objective (e.g., a final location, where the actor may come to a stop). An actor state objective may refer to one or more ending conditions for a safety procedure that involves a state of the actor implementing the safety procedure (e.g., the vehicle).

In the example of FIG. 1, the safety procedure for each sample includes an actor state objective where the vehicle 140 comes to a stop. For example, for the trajectory time $T_T$ of $T_0$, the actor state objective may be met at $T_0 + T_{stop,\,0}$, where $T_{stop,\,0}$ may represent then amount of time it takes the vehicle 140 to reach the actor state objective from the corresponding state at $T_0$. Similarly, for the trajectory time $T_T$ of $T_1$, the actor state objective may be met at $T_1 + T_{stop,\,1}$, where $T_{stop,\,1}$ may represent the amount of time it takes the vehicle 140 to reach the actor state objective from the corresponding state at $T_1$, and for the trajectory time $T_T$ of $T_2$, the actor state objective may be met at $T_2 + T_{stop,\,2}$, where $T_{stop,\,2}$ may represent the amount of time it takes the vehicle 140 to reach the actor state objective from the corresponding state at $T_2$. While the actor state objective includes coming to a complete stop, other actor state objectives may be used and different actor state objectives may be used for different samples. Further, more than one actor state objective may be used for the same sample or trajectory time $T_T$, in some embodiments.

The actor state objective may be determined, in some examples, by analyzing sensor data received from one or more sensors (e.g., of the vehicle 140) to determine locations, orientations, and velocities of objects (or other actors) in the environment 126. Control parameters (e.g., for steering, braking, accelerating, etc.), as described herein, may then be determined for the vehicle 140, and a set of functions to guide the vehicle 140 to the actor state objective may be determined.

The safety procedure may result in a trajectory(ies) that changes smoothly with its starting state (e.g., because the safety procedure may be a continuous deceleration to a stop). In some examples, a safety procedure, $S_A$, may be represented as follows, in equation (6):

$$S_A = \left\{ \frac{dx_A}{dt} = f(W, t) \right\} \quad (6)$$

where W represents properties of the world (or environment). The safety procedure for the vehicle 140 may or may not depend on fixed properties of the world, depending on the embodiment. For example, the safety procedure may not depend on the fixed properties of the world, such as road shape or a map. In such examples, the safety procedure may include freezing a direction vector (e.g., by setting a scalar steering parameter, b, to zero), and coming to a complete stop by slowing down by a range of acceleration values $[a_{min}, a']$ (where $a_{min}$ is minimum acceleration amount or the negative of a maximum braking amount, and a' is a negative value larger than $a_{min}$), to a complete stop. This type of safety procedure, $S_A$, may be represented by equation (7), below:

$$S_A = \left\{ \frac{dx_A}{dt} = [vd^\top \quad 0 \quad a]^\top : a_{min} \leq a \leq a' \right\} \quad (7)$$

In any example, the safety procedure may include braking until reaching a complete stop and/or until the actor is traveling below a threshold velocity. At high speeds, without limitation, the safety procedure may include lining up with a current lane (or with the direction of the road, such as when the vehicle 140 is in the middle of a lane change), and then coming to a complete stop (and thus may depend on fixed properties of the world, such as lane markings). For example and without limitation, at low speeds, the safety procedure may include the vehicle 140 steering itself to a side of the road as it decelerates to a stop (and thus may depend on the fixed properties of the world). For example, one or more neural networks (e.g., convolutional neural networks) may be used to identify the side of the road and/or to aid in maneuvering the vehicle 140 to the side of the road. As another example, an HD map 1322 and/or another map type may be used. In such an example, the HD map 1322 may be received over a network(s) 1390 and/or may be embedded in the vehicle 140.

In yet another example, the safety procedure may be modified to provide for a certain level of comfort (e.g., maximum comfort) for the passenger(s) of the vehicle 140 (e.g., minimum deceleration or directional change) while still guaranteeing avoidance of a collision or that the force and/or actor velocity would be below a threshold were a collision possible. In such an example, a course, trajectory, and/or control sequence may be determined for the vehicle 140, as the safety procedure that maximizes comfort and/or minimizes force exerted on passengers while still ensuring that a collision with other objects (e.g., vehicles, entities, structures, etc.) is avoided and/or other criteria are satisfied. In some examples, such as where a collision is unavoidable or a likelihood of collision is above a threshold risk level, the safety procedure may be modified or configured to minimize the risk of harm to the passenger(s) in the vehicle 140 and other entities should a collision occur.

Figure 4C:
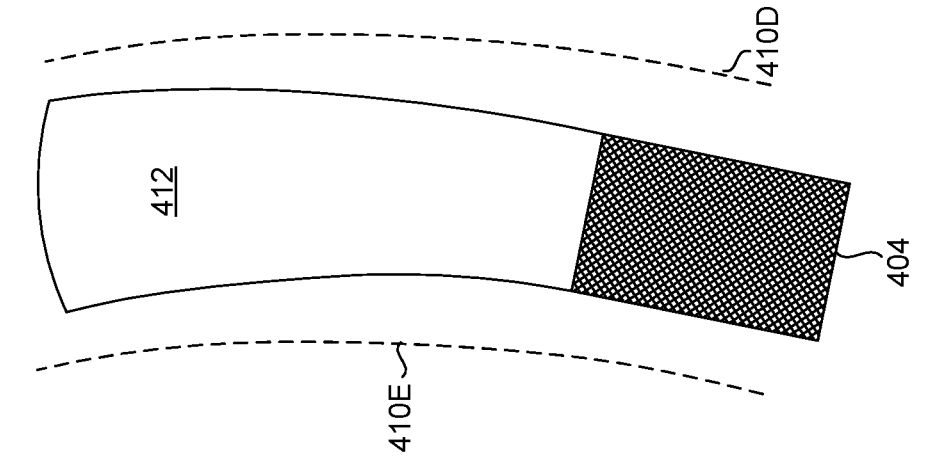
FIGS. 4A-4C depict examples of two-dimensional projections of safety procedures for a vehicle, in accordance with some embodiments of the present disclosure.
Figure 4B:
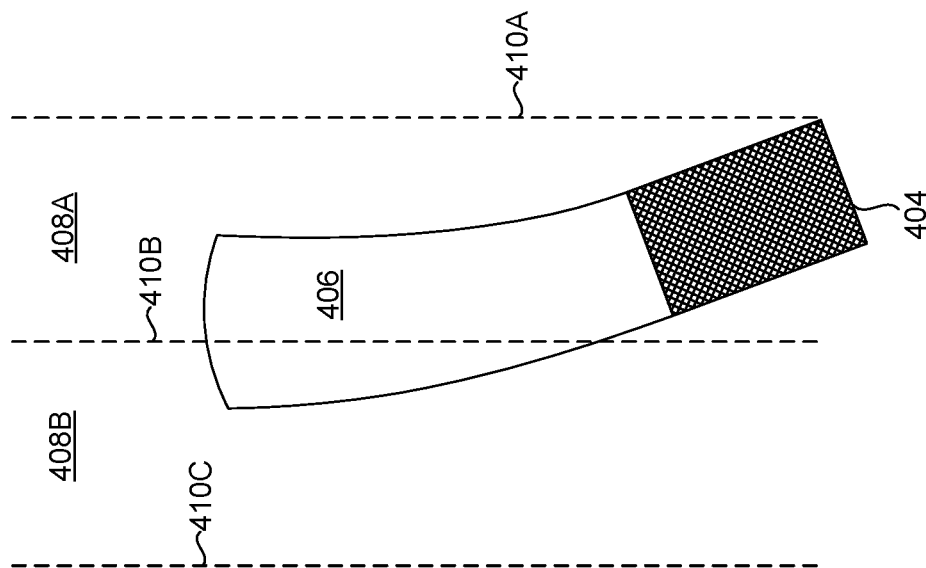
Figure 4A:
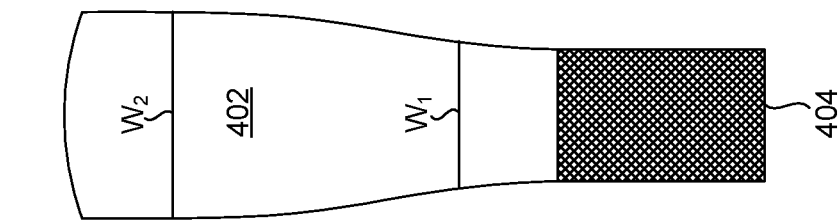

Examples of safety procedures are illustrated with respect to FIGS. 4A-4C. For example, with respect to FIG. 4A, a safety procedure 402 may include an actor 404 (or a shape representing the actor 404, such as a subscribed rectangle or polygon) coming to a complete stop while maintaining a low or zero lateral rate of change. For example, in an unstructured environment, or when ignoring fixed properties of the world, the safety procedure 402 may include driving straight ahead and/or continuing along the current steering circle (which may or may not include a lateral rate of change) until the actor 404 (e.g., the vehicle 140) comes to a complete stop. For example, if the actor is currently steering at a steering angle to the right, the safety procedure 402 may include continuing at the steering angle until a complete stop is reached. If the actor is currently steering straight, the safety procedure 402 may include continuing straight until a complete stop is reached (e.g., as illustrated in FIG. 4A).

In any example, the safety procedures for the vehicle 140 may include a safety margin (e.g., in addition to, or alternatively from, the safety margin described herein with respect to a size of the vehicle 140). For example, with respect to the safety procedure 402, as time increases in space-time from the time associated with a current state of the actor, the safety margin for the safety procedure may increase. For example, with respect to the safety procedure 402, a width, $W_1$, of the claimed set of the safety procedure 402 may be less than a width, $W_2$, of the claimed set of the safety procedure 402. In such an example, because the width, $W_1$, may correspond to an earlier time, there may be less margin for error as compared to the time associated with the width, $W_2$. As a result, the safety margin may increase over space-time to account for this error.

As another example, a safety procedure 406 may include the actor 404 (or the shape representing the actor 404), during a lane change from a first lane 408A to a second lane 408B, aligning itself with the road (e.g., aborting the lane change and lining up with the direction of the road, such as parallel with lane markings 410A, 410B, and/or 410C), and coming to a complete stop. In such an example, the safety procedure may account for the fixed properties of the world (e.g., the lane markings, the direction of the road, etc.). The safety procedure 406 may be determined in order to minimize the lateral rate of change (e.g., with respect to the road shape) while still aborting the lane change and realigning the actor 404 with the road.

As a further example, and with respect to FIG. 4C, a safety procedure 412 may include the actor 404 (or the shape representing the actor 404), following the road shape to accommodate for curves in the road and coming to a complete stop. For example, if the actor 404 is already following the road shape, and thus accounting for the fixed properties of the world, the safety procedure 412 may include continuing to follow the road shape (e.g., as defined by the lane markings 410D and 410E). Similar to the safety procedure 406, the safety procedure 412 may be determined in order to minimize the lateral rate of change while continuing to follow the road shape.

Once the safety procedure is determined for the vehicle 140, the claimed set determiner 116 may determine a claimed set of the vehicle 140 in the environment 126. The claimed set for an actor may include an occupied trajectory (e.g., each of the points in space-time that the actor occupied when following a trajectory) of an actor when the actor applies its safety procedure, $S_A$, starting from state, $x_A$.

In order to determine the claimed set, the claimed set determiner 116 may determine an area and/or volume in space occupied by the actor given its state. For example, it may be assumed that actors move around in and occupy n-dimensional real space, $\mathfrak{R}^n$. In some examples, for simplicity, a two-dimensional (2D) space modeling a top-down view of the real world may be used. In other examples, a three-dimensional (3D) space may be used. In any example, in order to determine the claimed set, the vehicle 140 may first determine occupied sets of the actor, the occupied sets representing a set of points in space that the actor occupies as a function of its state. The occupied set, $o_A$, for an actor may be determined as follows, in equation (8), below:

$$o_A(x_A) \subseteq \mathbb{R}^n \qquad (8)$$

If a point in space is in the occupied set of the actor, the actor may be determined to occupy the point.

In order to determine each of the points in the occupied set, a size (e.g., an actual size of the actor) or representative size (e.g., a shape around and/or including the actor) of the actor may be determined. In some examples, the size or representative size may include an optional safety margin. With respect to the vehicle 140, the size of the vehicle 140 may be known (e.g., based on calibration information, vehicle information, vehicle make and model, and/or other parameters). In some examples, for determining the size of the actor, a shape (e.g., a predefined or subscribed shape, such as a square, polygon, bounding box, cube, circle, oval, ellipse, etc.) may be fit around the actor (e.g., to at least include the actor) and the size of the actor may be determined to be the size of the predefined shape (e.g., including a safety margin, in some examples, as described herein). For example, the shape may be a 2D shape (e.g., a rectangle or circle), that serves as a bounding box that encircles the actor at least partially. In other examples, the shape may be a 3D shape (e.g., a cube) that serves as a bounding cube that encircles the actor at least partially. In any example, the size of the vehicle may be used by the claimed set determiner 116 to determine the points (e.g., (x, y) coordinates) in space that the actor occupies as part of the occupied set, $o_A$.

In the example of FIG. 1, a shape 132 is shown which may be used to determine one or more points in space-time of a claimed set of the vehicle 140. The shape 132 may comprise a minimum or bounding rectangle around at least a body of the vehicle 140. In other examples a hexagon or other shape may be used.

In some examples, the size of the actor, and thus the representative shape corresponding to the size of the actor, may be determined such that the size and/or shape fully include the actor, at least in two-dimensions (e.g., laterally and longitudinally). By fully including the actor (with an additional safety margin, in examples), it may be more likely that the occupied set, the occupied trajectory, and thus the claimed set more accurately represents the actual points in space that the actor would occupy when executing the safety procedure.

Once the occupied set is determined, the claimed set determiner 116 may determine the occupied trajectory(ies), $O_A$, of each actor. The occupied trajectory(ies) may include the set of points in space-time that the actor will occupy over time as a function of its trajectory(ies). For example, the occupied trajectory(ies), $O_A$, may be determined as follows, in equation (9), below:

$$O_A(X_A) = \{(y,t): y \in o_A(x_A(t)), t \in T\} \subseteq \mathbb{R}^n \times T \qquad (9)$$

The occupied trajectory(ies), when applying the safety procedure, $S_A$, of the actor may include the claimed set, $C_A$. Any points determined to be within the claimed set of an actor are points in space-time that the actor may require to maintain the integrity of its safety procedure. The claimed set, $C_A$, may be determined as follows, in equation (10), below:

$$C_A(x_A) \subseteq \mathbb{R}^n \times T \qquad (10)$$

where equation (10) may represent the occupied trajectory(ies) of the actor that results if the actor applies its safety procedure starting from state, $x_A$. In some examples, the claimed set may represent a combination or aggregation of each of the occupied trajectories that result from applying the actor's safety procedure with different parameters. For example, the safety procedure may be applied with a maximum braking profile, a minimum braking profile, a braking profile in between the maximum and minimum, a maximum steering profile, a minimum steering profile, a steering profile in between the maximum and minimum, and/or in other ways. In such examples, the claimed set may include the occupied trajectories for any number of different applications (e.g., for each different application) of the safety procedure, combined or aggregated.

As a first example, the claimed set may represent the safety procedure with a first braking profile for coming to a complete stop more quickly than a second braking profile, and may represent the safety procedure with the second braking profile for coming to a complete stop more slowly (e.g., than the first braking profile) while still avoiding a collision. In such an example, thresholds or bounds may be set and/or determined to define the first braking profile (e.g., a defined maximum or upper bounded braking profile) and the second braking profile (e.g., a defined minimum or lower bounded braking profile). In such an example, the claimed set may represent each of the points in space-time occupied by the actor by the safety procedure applied with the first braking profile, the second braking profile, and the points in space-time occupied by the actor that fall between first and second braking profiles (e.g., as illustrated in and described with respect to FIG. 5C). Depending on the specific embodiment, the thresholds or bounds for generating the claimed set may be different.

The thresholds or bounds may be defined, without limitation, based on percentages (e.g., braking intensity percentages) and/or time (e.g., time to come to a complete stop, such as based on a current speed or velocity). For example, the first braking profile may include a 95% braking intensity and the second braking profile may include an 85% braking intensity. As another example, if the vehicle 140 is traveling sixty miles per hour (mph), the first braking profile may include coming to a stop within three seconds (e.g., slowing down by an average of twenty mph per second), while the second braking profile may include coming to a stop within four seconds (e.g., slowing down by an average of fifteen mph per second). To determine the time, a factor of speed may be used in some examples. In such examples, the first braking profile may include one second for every ten mph the vehicle 140 is traveling based on a current state, $x_A$, of the vehicle 140, and the second braking profile may include one second for every fifteen mph the vehicle 140 is traveling based on a current state, $x_A$, of the vehicle 140. Continuing with the preceding example of the vehicle 140 traveling at sixty mph, the first braking profile may include coming to a stop within three seconds, and the second braking profile may include coming to a stop within four seconds.

As another example, the claimed set may represent the safety procedure with a first steering profile (e.g., a defined maximum steering profile) for reaching a lateral location (e.g., the side of the road, lining up with the road, etc.) more quickly than a second steering profile, and may represent the safety procedure with the second steering profile for reaching the lateral location more slowly than the first steering profile. In such an example, thresholds or bounds may be set and/or determined to define the first steering profile (e.g., a defined maximum or upper bounded steering profile) and the second braking profile (e.g., a defined minimum or lower bounded steering profile). In such an example, the claimed set may represent each of the points in space-time occupied by the actor by the safety procedure applied with the first steering profile, the second steering profile, and the points in space-time occupied by the actor that fall between the first and second steering profiles. Depending on the embodiment, the thresholds or bounds for generating the claimed set may be different.

Similar to the thresholds or bounds for the braking profiles, the steering profiles may also be based on percentages (e.g., percentages of steering angle intensity) and/or time (e.g., amount of time to reach the lateral position).

Figure 5A:
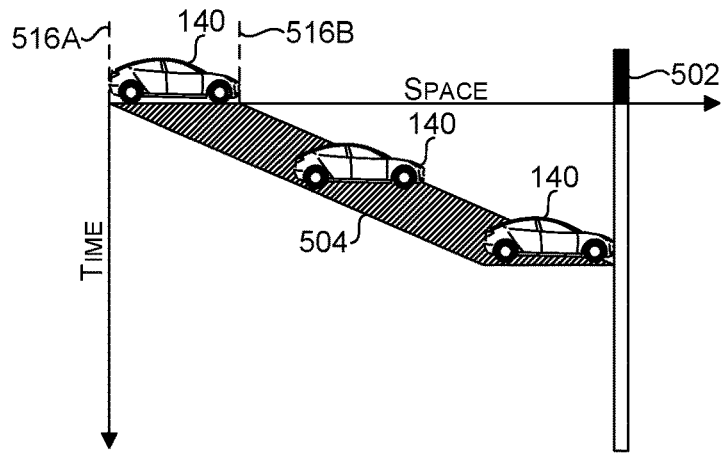
FIGS. 5A-5C depict examples of space-time plots of a vehicle executing safety procedures, in accordance with some embodiments of the present disclosure.

As a simplified example of claimed sets, and with reference to FIG. 5A, the vehicle 140 may be driving toward a static object 502 (where the driving direction is represented in one dimension in the space-time plot of FIG. 5A). The vehicle 140, when not executing a safety procedure, may have an occupied trajectory 504 that results in the vehicle 140 colliding with the static object 502 (e.g., the vehicle 140 does not implement a safety procedure, but rather continues driving along the same path at the same speed until colliding with the object). The static object 502 is fixed along the space dimension in the space-time plot because the static object 502 does not move. In this example, a bounding polygon may be used to represent the size of the vehicle 140 (e.g., a bounding polygon extending from the front to the back of the vehicle 140, between bounding lines 516A and 516B).

Figure 5B:
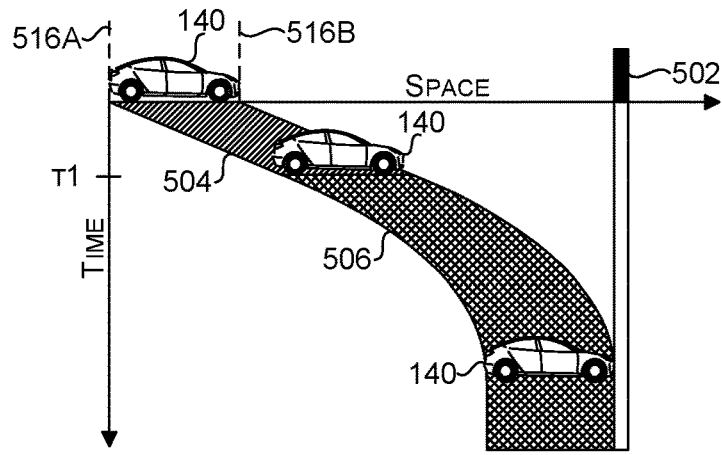

To account for the situation of FIG. 5A, a safety procedure may be implemented, such as to brake until the vehicle 140 comes to a complete stop prior to colliding with the static object 502. For example, and with respect to FIG. 5B, a trajectory generator may generate the trajectory 506, represented by a corresponding claimed set as determined by the claimed set determiner 116, corresponding to the safety procedure, and the vehicle 140 may implement the safety procedure at time, T1, such that the vehicle 140 stops just prior to colliding with the static object 502. The trajectory 506 (e.g., representing the claimed set of the trajectory of the safety procedure) may be persistently projected into space until the trajectory 506 is determined to almost intersect the static object 502 (e.g., at time, T1), and then the vehicle 140 may implement the safety procedure by actuating the brakes at an intensity that corresponds to the safety procedure (e.g., an intensity that will stop the vehicle 140 prior to colliding with the static object 502, with some margin for error, depending on the embodiment). In some examples, the trajectory 506 may correspond to a second braking profile (e.g., defined minimum or lower bounded braking profile).

Figure 5C:
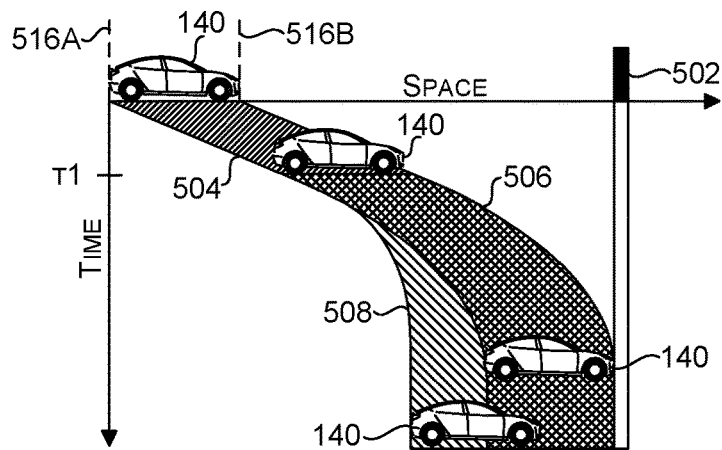

As another example, and with respect to FIG. 5C, the generated trajectories 506 and 508, represented by the corresponding claimed set as determined by the claimed set determiner 116, that correspond to a safety procedure implemented using two different braking profiles (e.g., the claimed set may include each of the points in space-time occupied by the vehicle 140 if the vehicle 140 were to navigate both the first trajectory 506, the second trajectory 508, and/or any trajectory in-between). For example, the trajectory 506 may include a first braking profile (e.g., a defined minimum or lower bounded braking profile) and the trajectory 508 may include a second braking profile (e.g., a defined maximum or upper bounded braking profile). In this example, the vehicle 140 may implement the safety procedure just prior to the trajectory 506 colliding with the static object 502 (e.g., at time, T1). Thus, the trajectory 506 and/or 508 (as represented by the corresponding claimed set) may be projected into space-time until the trajectory 506 (or 508, in some examples) is determined to almost intersect the static object 502, and then the vehicle 140 may implement the safety procedure by actuating the brakes at an intensity that corresponds to the chosen braking profile for the safety procedure.

A property of the claimed set may be that the claimed set does not grow over time when applying the safety procedure. As such, for a safety procedure, the minimum (or safety) braking profile and the maximum braking profile may be defined such that the claimed set is not increasing (although the claimed set may decrease). As such, at each time step or stage of implementing the safety procedure, the claimed set may not increase. As a result, when the safety procedure is first implemented, and at the conclusions of the safety procedure (e.g., when at a complete stop), the claimed set should be unchanged.

Figure 5D:
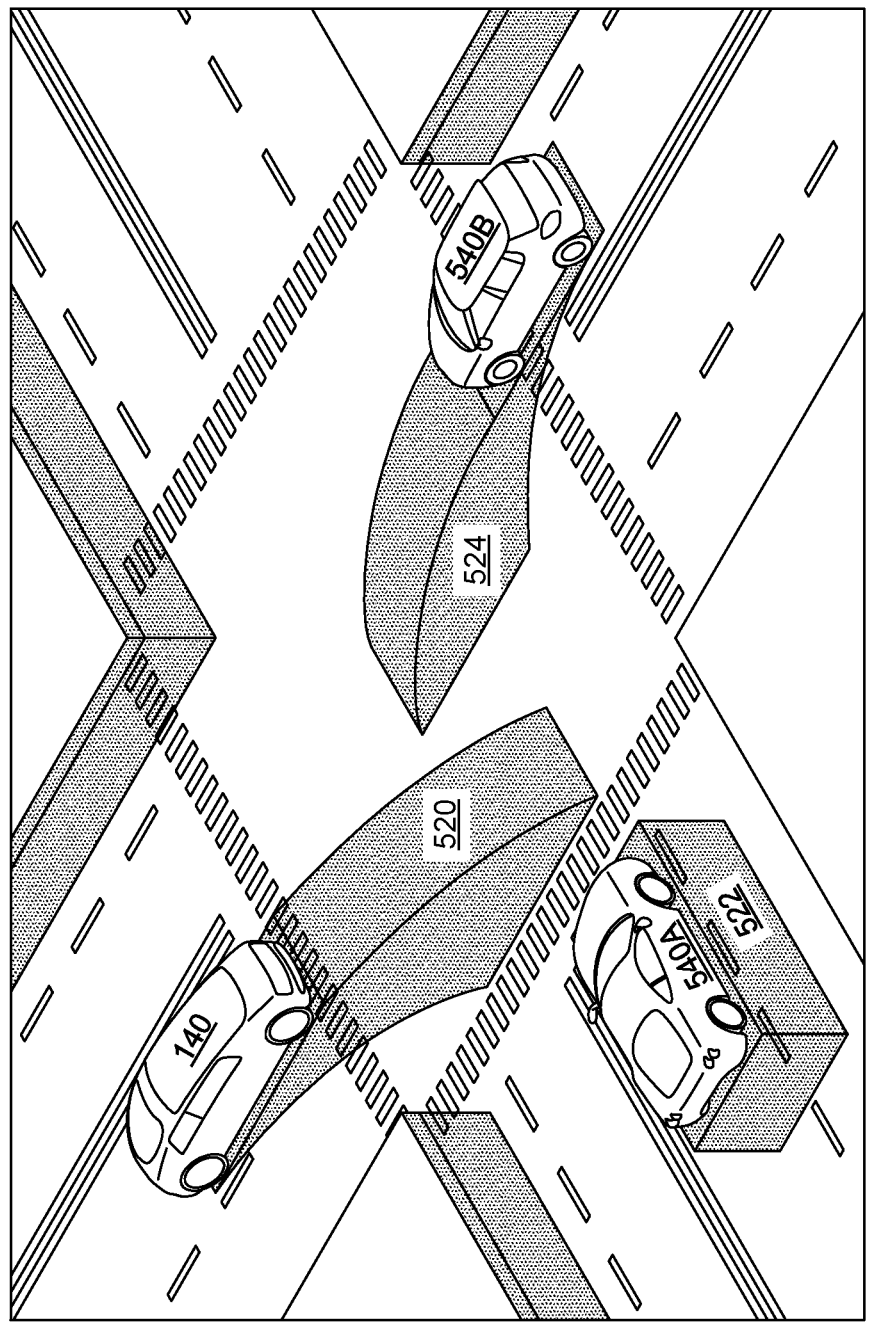
FIG. 5D depicts an example of three-dimensional projections of safety procedures for a plurality of vehicles in space-time, in accordance with some embodiments of the present disclosure.

As another example, and with respect to FIG. 5D, the vehicle 140, a first object 540A (e.g., a vehicle, in this example), and a second object 540B (e.g., a vehicle, in this example) in the environment 126. In this example, the trajectories may occupy a three-dimensional space (e.g., a volume) in space-time within the environment 126. As such, the trajectories may include a longitudinal distance (e.g., a braking or stopping distance), a lateral change (e.g., a steering change), and/or a vertical space (e.g., from the ground plane to a top of a bounding polygon or other shape representative of the occupied set of the actor) occupied by the actors (e.g., the vehicle 140, the first object 540A, and the second object 540B) if the actors were to implement their respective safety procedures. As such, the trajectories may be analyzed as solid volumes with lengths that increase with velocity (e.g., the faster the actor is moving, the longer the trajectory(ies) and the corresponding points in space-time included in the occupied sets), and the actors may be characterized as driving around with these volumes attached to them (e.g., protruding from them) while performing collision analysis for the volumes (e.g., the trajectories) instead of performing collision analysis on their actual shape. As a result, by guaranteeing no collision in space-time volumes, a guarantee of no collisions in actual space may be induced. This may provide a benefit because avoiding collisions between actual physical objects in actual space requires foresight since actors have inertia, and once a physical overlap takes place, it may already be too late. However, in space-time, the volumes or trajectories may be thought of as frozen once an intersection, overlap, or near intersection or overlap is determined between the volumes in space-time and, because there are both lateral and longitudinal dimensions, and shared geometries between the vehicle 140 and the object(s) may not be allowed, the vehicle 140 may be free from collisions (or at least may not contribute to a likelihood of a collision, because other actors actions are outside of the control of the vehicle 140).

In such an example, the vehicle 140 may generate the vehicle-occupied trajectory(ies) 520 representative of the safety procedure for the vehicle 140 (applied over a range of profiles, in some examples), the object-occupied trajectory(ies) 522 representative of the safety procedure for the first object 540A, and the object-occupied trajectory(ies) 524 representative of the safety procedure for the second object 540B. In the illustration of FIG. 5D, there is no overlap or intersection, or near overlap or intersection, between any of the trajectories 520, 522, and 524. As such, at the point in time illustrated in FIG. 5D, neither the vehicle 140, the first object 540A, nor the second object 540B may implement their safety procedures. However, if one of the trajectories 520, 522, or 524 were to overlap or nearly overlap with another of the trajectories 520, 522, or 524, the actors involved in the overlap or near overlap would be expected to implement their safety procedures (e.g., the vehicle 140 would implement the safety procedure if involved, and would expect the other actor to implement their respective safety procedure, in order to avoid a collision).

The points in space-time occupied by the projection of the trajectory(ies) 520 may include the claimed set of the vehicle 140 when implementing the safety procedure. Similar to described herein with respect to FIG. 4C, the vehicle-occupied trajectory(ies) 520 may include a first braking profile, a second braking profile, a braking profile of another threshold, and/or a combination thereof. Similarly, the points in space-time occupied by the projection of the object-occupied trajectory(ies) 522 may include the claimed set of the first object 540A, and the points in space-time occupied by the projection of the object-occupied trajectory 524 may include the claimed set of the second object 540B.

In some examples, latency, discretization, and/or reaction time may be at least a few of the practical limitations that may be modeled. For example, the vehicle 140 may deal with a limitation in perception, or more precisely perception and action, in the sense that when an actor takes action, it is inevitably based on perception that is not completely current (e.g., with a time delay). As a result, when the actor takes action, it may be based on perception of the world at some earlier point in time. For example, an actor (e.g., a human actor, a manually driven vehicle, or a pedestrian), may have some reaction time (e.g., based on lack of attentiveness due to looking at a phone, or reaching for something, etc.) before noticing that a potential collision may occur. In such an example, the vehicle 140 may account for this reaction time. In other examples, an actor, such as a vehicle, may include a latency or lag between when a command is received and when the actuation actually occurs. The latency or lag may be known (e.g., after identifying a vehicle type, for example), or may be perceived (e.g., using one or more neural networks). In such examples, the vehicle 140 may account for this latency or lag. In any example, the shape (e.g., length, width, height, etc.) of the trajectory(ies) of the claimed sets for the actors (e.g., the vehicle 140 and/or the objects) may be adjusted (e.g., lengthened, widened, etc.) to account for latency, lag, or reaction time.

In some examples, it may be assumed that the amount of latency is $\Delta t$. In order to account for $\Delta t$, in some examples, a form of worst-case forward prediction may be used, such that a forwarded set, $\Phi_A(x_A, \Delta t)$, of actor A by a time interval, $\Delta t$, is the set of all states that actor A could possibly get to at the time interval $\Delta t$ after being in state, $x_A$. The forwarded set of a collection, $\theta$, of actors by a time interval, $\Delta t$, may be the union of the forwarded sets of all actors in $\theta$, as represented by equation (11), below:

$$\Phi(\theta, \Delta t) = \cup_{A \in \theta} \Phi_A(x_A, \Delta t) \tag{11}$$

An actor may typically have a better ability to predict its own state than that of other actors. In particular, in the control system of the vehicle 140, the actual command sequence that was previously sent may be known, providing an ability to predict where the actor itself will be when the actuation command (e.g., delivered to actuation component(s) of the vehicle 140) that is deliberated now is actually issued. For practical purposes, this may allow the forwarded set to include only one point, effectively resulting in deterministic forwarding, and further resulting in a single actor state. In general, the forwarding mechanism may be non-deterministic forwarding, and may result in a set of states. While in some examples non-deterministic forwarding of the actor itself may be used, and may require that the control policy is safe for all the possible states the actor, in other examples, in order to reduce complexity, deterministic forwarding of the actor itself may be assumed.

A result may be a control policy for the forwarded actor, assuming implicitly that the state parameterization is updated with prediction based on all the actuation commands in the queue up to the actuation command currently deliberated. With these assumptions, the control command may apply to the actor state considered, and the only delay may be the information regarding other actors (e.g., the objects other than the vehicle 140).

A forwarded control policy may be safe at the current time with respect to wherever the perceived collection of actors moved, despite the latency limitations between perception and action. This again may be a direct consequence of the worst-case assumption and the definition of a safe control policy. Since all constraints (e.g., from wherever in the environment other actors may reach at the time the control of the vehicle 140 is executed) that may be present are assumed to be present, the vehicle 140 may thus be obeying all relevant constraints.

In addition, the vehicle 140 may combine latency awareness with visibility awareness, and may use this information to avoid entering unreasonable states. For example, consider the set, $\Phi(V, \Delta t) \cup (\Phi(\Lambda, \Delta t) \cap \Psi)$ where V, $\Lambda$, $\Psi$ are the sets of visible, invisible, reasonable actors respectively. First, visibility may be taken into account to provide a complete collection representing all the actors (visible and invisible, as described herein) in the world that may be desirable to consider at one point in time. Then, latency may be taken into account on this complete world representation by forwarding the set of actors. Finally, unreasonable actors may be excluded from the forwarded set of invisible actors. In some examples, unreasonable actors may be excluded prior to the forwarding; however, this would not allow accounting for unreasonable actors who make it into reasonable states during forwarding. In addition, although unreasonable invisible actors may be excluded, unreasonable visible actors may not be excluded in some examples, because removing actually perceived actors may not result in an accurate world state.

As described herein, in order to evaluate a sample of the trajectory 144, the trajectory analyzer 114 may compare one or more of the points that correspond to the safety procedure of the sample to one or more points of the arrival times. For example, to evaluate a sample corresponding to the trajectory time $T_T$ of $T_0$, the trajectory analyzer 114 may compare one or more points from the claimed set determined for the safety procedures 140A to one or more of the arrival times determined for the object 128A (and/or other objects). In one or more embodiments, the arrival time(s) that is compared to a point(s) from the claimed set may be the arrival time for the location(s) of the point(s) from the claimed set.

Where the arrival time(s) is less than (or equal to) the time(s) of the point(s) from the claimed set, the trajectory analyzer 114 may determine a conflict between the trajectory 144 and the arrival time(s) for the sample. For example, the trajectory analyzer 114 may determine that the state of the vehicle for the sample of the trajectory would be unsafe based at least on determining the arrival time(s) is less than the time(s) of the point(s) from the claimed set. This may indicate, for example, that the vehicle 140 would be unable to avoid a collision with the object 128A (and/or other objects captured by the arrival times) were the object 128A to arrive at a location(s) at the arrival time and were the vehicle 140 to be in the state of the sample of the trajectory 144.

Where the arrival time(s) is greater than the time(s) of the point(s) from the claimed set, the trajectory analyzer 114 may determine there is no conflict between the trajectory 144 and the arrival time(s) for the sample. For example, the trajectory analyzer 114 may determine that the state of the vehicle for the sample of the trajectory would be safe based at least on determining the arrival time(s) is greater than the time(s) of the point(s) from the claimed set. This may indicate, for example, that the vehicle 140 would be able to avoid a collision with the object 128A (and/or other objects captured by the arrival times) were the object 128A to arrive at a location(s) at the arrival time and were the vehicle 140 to be in the state of the sample of the trajectory 144.

For a given sample of a trajectory, the trajectory analyzer 114 may compare any number of points of a claimed set of the sample to any number of arrival times for locations in the environment 126. As the vehicle 140 occupies many points in space at a given time, the trajectory analyzer 114 may compare multiple points of the claimed set to arrival times to determine whether there is a conflict at the given time. By way of example, and not limitation, the points may lie on the shape used by the claimed set determiner 116 to determine the claimed set. For example, points $P_{1a}$, $P_{1b}$, and $P_{1c}$ of the shape 132 of FIG. 1 may be used to evaluate a sample of the trajectory 144 at a given time of the claimed set. In one or more embodiments, only points on the boundaries of the shape may be used, as it may be assumed that if the boundaries are conflict free, then the interior would also be conflict free.

Also in or more embodiments, only points on one side of the shape may be used for evaluation of a given time. For example, the side of the vehicle 140 that corresponds to a direction of travel of the vehicle 140. Thus, the trajectory analyzer 114 may determine that the vehicle 140 is driving in reverse and use points from a rear of the vehicle 140 rather than the front. Additionally, in some examples, one or more of the points may correspond to a plane that is perpendicular to the direction of travel. For example, if the vehicle 140 were turning right, one or more of the points may correspond to the front and the right side of the vehicle 140 (near the front to ensure at least the leading edge of the vehicle is tested). Further, although the points are on a line segment in FIG. 1, the points may fall on sides of a hexagon, half-circle, or other shape.

Generally, the trajectory analyzer 114 any evaluate a sample at number of different times within the claimed set. In one or more embodiments, the trajectory analyzer 114 may be configured to avoid or eliminate gaps between adjacent claim sets of samples that are evaluated for conflicts with arrival times. For example, in FIG. 1, the regions occupied by the vehicle 140 which are evaluated are touching (e.g., in temporal order of corresponding samples) such that there are no gaps. In one or more examples, gaps may be reduced or avoided by setting the time between time steps such that the actor state objective of each safety procedure is met at a time that is greater than or equal to the next time step that is sampled. For example, time steps may be computed from the current speed of the vehicle 140, from the speed at the point in the trajectory 144 that is being sampled, and/or statically or dynamically configured such that this condition is likely to or will be met. In embodiments, if gaps are identified, interpolation (e.g., linear) between sampled points may be used to account for any gaps which may be between the regions (e.g., claimed sets). For example, the points in space-time of a claimed set used for evaluation may be interpolated from one or more other points (e.g., to the end or border of the gap) and evaluated to close a gap between adjacent claimed sets.

Figure 6:
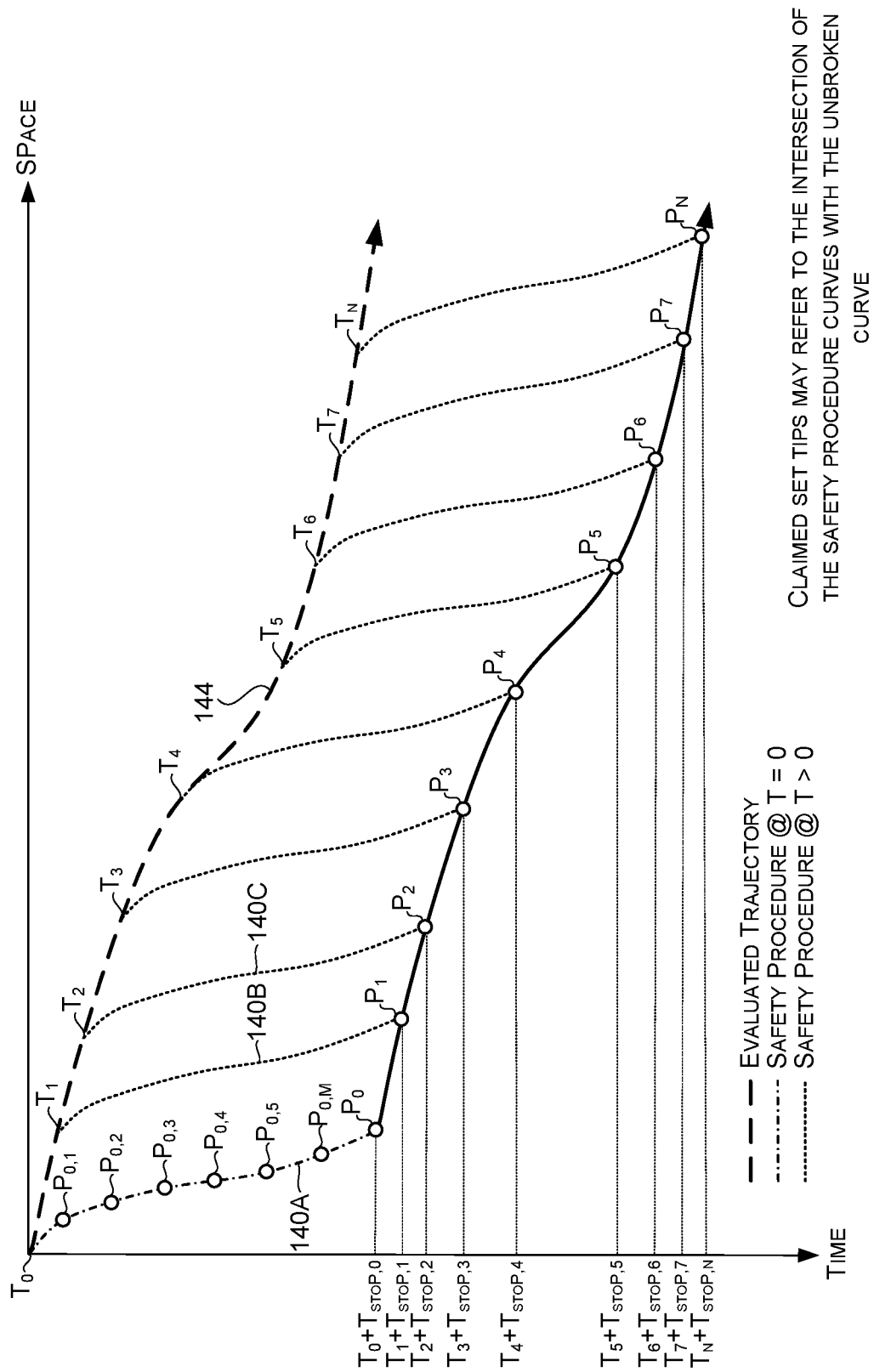
FIG. 6 is an illustration including examples of a trajectory, safety procedures which may be invoked during the trajectory, and points that may be used to evaluate the trajectory, in accordance with some embodiments of the present disclosure.

Referring now to FIG. 6, FIG. 6 is an illustration including examples of a trajectory, safety procedures which may be invoked during the trajectory, and points that may be used to evaluate the trajectory, in accordance with some embodiments of the present disclosure. In particular, FIG. 6 shows the trajectory 144 along with safety procedures which may be invoked at times $T_0$ through $T_N$ (where N in an integer) of which the safety procedures 140A, 140B, and 140C are individually labeled. For the sample at trajectory time $T_T=T_0$, for example, at the start of the trajectory 144 and/or the current position of the vehicle 140, the trajectory 144 may evaluate one or more points in space-time for multiple times throughout the safety procedure 140A. For simplicity, the one or more points for each time may be discussed in reference to a single point. However, the evaluation may include multiple points (e.g., according to the shape 132 described herein). As shown, points $P_0$ and $P_{0,1}$ through $P_{0,M}$ (where M in an integer) and may be evaluated with for the sample corresponding to $T_0$. In one or more embodiments, the trajectory analyzer 114 may determine a conflict for the sample based at least on determining a conflict for at least one of the points that are evaluated for the sample. For example, a conflict may be determined when any of the points conflict with a corresponding arrival time.

In the example of FIG. 1, multiple points may be evaluated for the sample corresponding to $T_0$ to avoid gaps in coverage. However, for subsequent time steps, only points at the tips of the safety procedures (e.g., where the actor state objective is met) may be evaluated. In FIG. 6, points at the tips of the safety procedures are denoted by points $P_0$ through $P_N$. Sampling only the tips may be sufficient as the tips may correspond to the most restrictive points of the safety procedures (e.g., for latest safe arrival times). For example, if a collision could be avoided at the end of the safety procedure for a sample, it may be assumed that it could be avoided any earlier time within the safety procedure. Thus, checking for conflicts with respect to safety procedures may be computationally efficient, as the number of comparisons may be linear with the number of safety procedures that are evaluated. Further, each of these comparisons may be computed efficiently in parallel on a GPU. While multiple points are evaluated for the sample corresponding to $T_0$, in other examples, a single point (e.g., the point $P_0$) may also be sampled and/or the evaluated points may leave gaps in coverage that are acceptable. For example, a gap in coverage may be acceptable because the vehicle 140 may have evaluated points for one or more trajectories for a prior frame that covers the gap.

Figure 7:
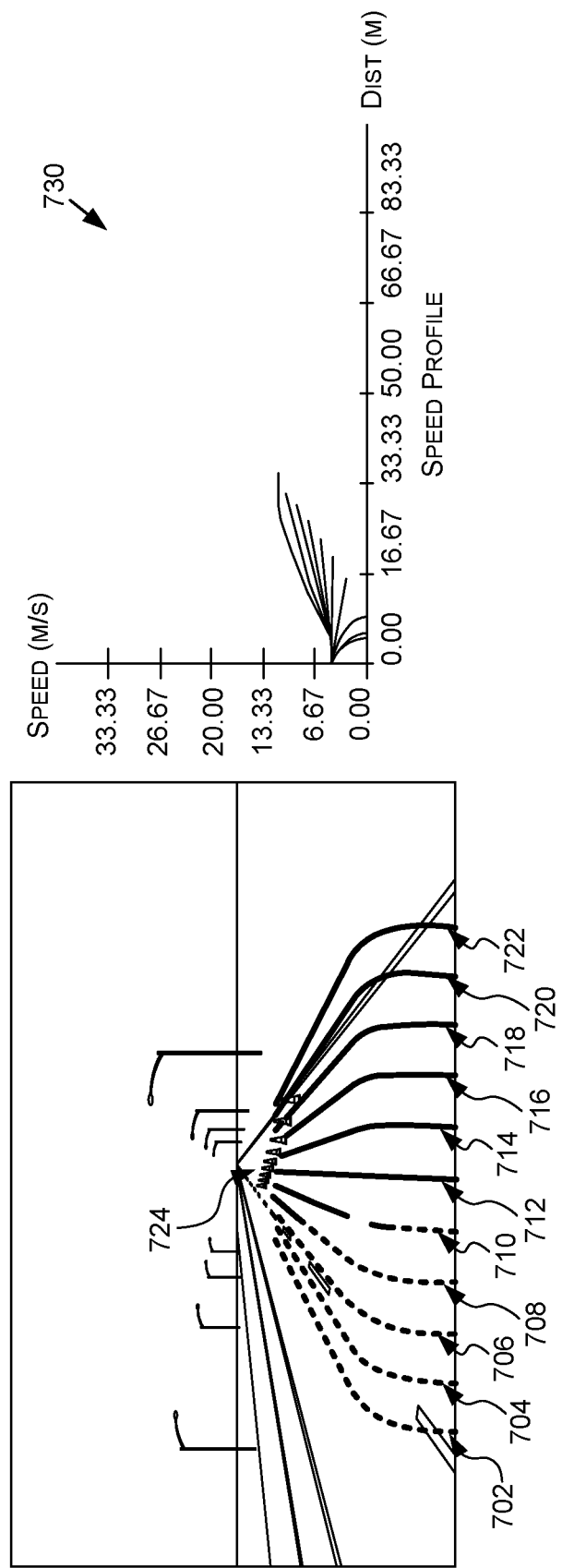
FIG. 7 is an illustration used to describe examples of lateral paths and speed profiles, in accordance with some embodiments of the present disclosure.

As described herein, the trajectory analyzer 114 may analyze a plurality of trajectories, including the trajectory 144, so as to select a trajectory therefrom for use in controlling the vehicle 140. By way of example and not limitation, one or more of the trajectories may be represented using one or more lateral paths and one or more speed profiles. In particular, a trajectory may comprise a lateral path in combination of a speed profile of the vehicle over the lateral path. FIG. 7 is an illustration used to describe examples of lateral paths and speed profiles, in accordance with some embodiments of the present disclosure. A set of trajectories may be determined based at least on a nominal rail or lane and/lane edges from the world model of the vehicle 140 and based at least on one or more selection actions for the vehicle 140, as further described herein with respect to FIG. 8. In FIG. 7, the nominal rail can correspond to the right lane in which the vehicle 140 may be located. As can be seen, a series of cones 724 presents an obstacle to be avoided. The vehicle 140 may generate 11 different laterally varying choices, or lateral paths, associated with the nominal rail. The choices include path 702, path 704, path 706, path 708, path 710, path 712, path 714, path 716, path 718, path 720, and path 722. Any combination of a path and a speed profile may be used to form a trajectory.

The plurality of trajectories that are evaluated by the trajectory analyzer 114 for selecting a trajectory may correspond to different combinations of the paths and speed profiles. In one or more embodiments, the comparisons between samples and arrival times may be linear with the lateral paths Np, speed profiles $N_s$, and time steps $N_t$ of the plurality of trajectories, which may each be computed in parallel on a GPU. As the initial sample of each trajectory may be identical for each speed profile that shares the same lateral path (e.g., at trajectory time $T_T = T_0$ of each trajectory), the trajectory analyzer 114 may evaluate that sample once per lateral path and apply the results to each corresponding trajectory. As such, the complexity of the evaluations may be $O(N_p * N_s * N_t)$.

In some embodiments, the trajectory analyzer 114 may cease analyzing a trajectory once a conflict is detected and/or based on where that conflict was detected. In other embodiments, the trajectory analyzer 114 may always analyze each sample of the trajectory.

As described herein, based on result of comparisons for samples of a trajectory, the trajectory may be scored (e.g., for ranking against other potential trajectories), eliminated from consideration, or otherwise considered for control of the vehicle 140. The trajectory analyzer 114 may use various possible factors or criteria to determine a score for a trajectory and/or whether to eliminate the trajectory from consideration. Where the trajectory is eliminated from consideration based on one or more criteria being satisfied, the one or more criteria may be considered a hard constraint on the trajectory. Where the score for a trajectory is reduced or lower based on one or more criteria being satisfied (assuming a lower score means a trajectory is less likely to be selected), the one or more criteria may be considered a soft constraint on the trajectory.

In one or more embodiments, a constraint for a trajectory may be based at least on a distance and/or elapsed time to a detected conflict (e.g., to the start of the sample or to a point compared with an arrival time) along the trajectory (e.g., the conflict that is at the greatest distance and/or elapsed time from the start of the trajectory). For example, assuming there is a conflict detected for a trajectory, the score (or a weight used to compute the score) may be higher the farther the conflict is along the trajectory and/or the more elapsed time to the conflict. Thus, if the trajectory analyzer 114 determined a conflict for the trajectory time $T_T = T_2$ of the trajectory 144, the score for the trajectory 144 may be higher than if the trajectory analyzer 114 has determined a conflict for the trajectory time $T_T = T_1$ of the trajectory 144. Where multiple conflicts are detected, the score may be based at least on the conflict with the shortest distance, the least elapsed time, and/or the quantity of detected conflicts.

In at least one embodiment, one or more criteria may be used as a hard constraint or a soft constraint depending on whether one or more conditions are met. For example, a conflict for a sample may result in the trajectory being eliminated from consideration for control of the vehicle 140 based at least on the distance and/or elapsed time to the conflict (e.g., the closest detected conflict to the start of the trajectory) being below a threshold. Based at least on the distance and/or elapsed time to the conflict (e.g., the closest detected conflict to the start of the trajectory) being greater than the threshold, the conflict may be used as a soft constraint for selection of the trajectory (e.g., by penalizing a score for the trajectory). For example, when the trajectory analyzer 114 detects a conflict, the trajectory analyzer 114 may compare the distance and/or elapsed time to the conflict to one or more thresholds to determine whether use the conflict as a soft or hard constraint and/or to determine how much or whether the conflict should diminish the score for the trajectory. Using this approach, conflicts may be permissible, or more permissible the later the conflict would occur in the trajectory. Thus, the trajectory may still be selected for control of the vehicle 140, and re-planning of the trajectory or selection of a different trajectory prior to reaching the conflicting sample or time step may ensure control objectives are met (e.g., a collision is avoided).

As described herein, the arrival times evaluated by the trajectory analyzer 114 for a state of the world, which may be evaluated against a plurality of trajectories may be pre-computed and stored in an image or texture for the entire scene perceived by the vehicle 140 or a subset of the scene where the vehicle 140 could possibly be during the duration of the planning horizon. The values that correspond to arrival times for the image or texture may be computed using a distance transform or in parallel on a GPU. The points that correspond to the trajectories may then be evaluated for conflicts against the image or texture, for example, using a texture read and inequality check. In other examples, the arrival times may be computed on-the-fly or as needed during evaluation of trajectories and/or may not be stored in an image or texture.

Figure 8:
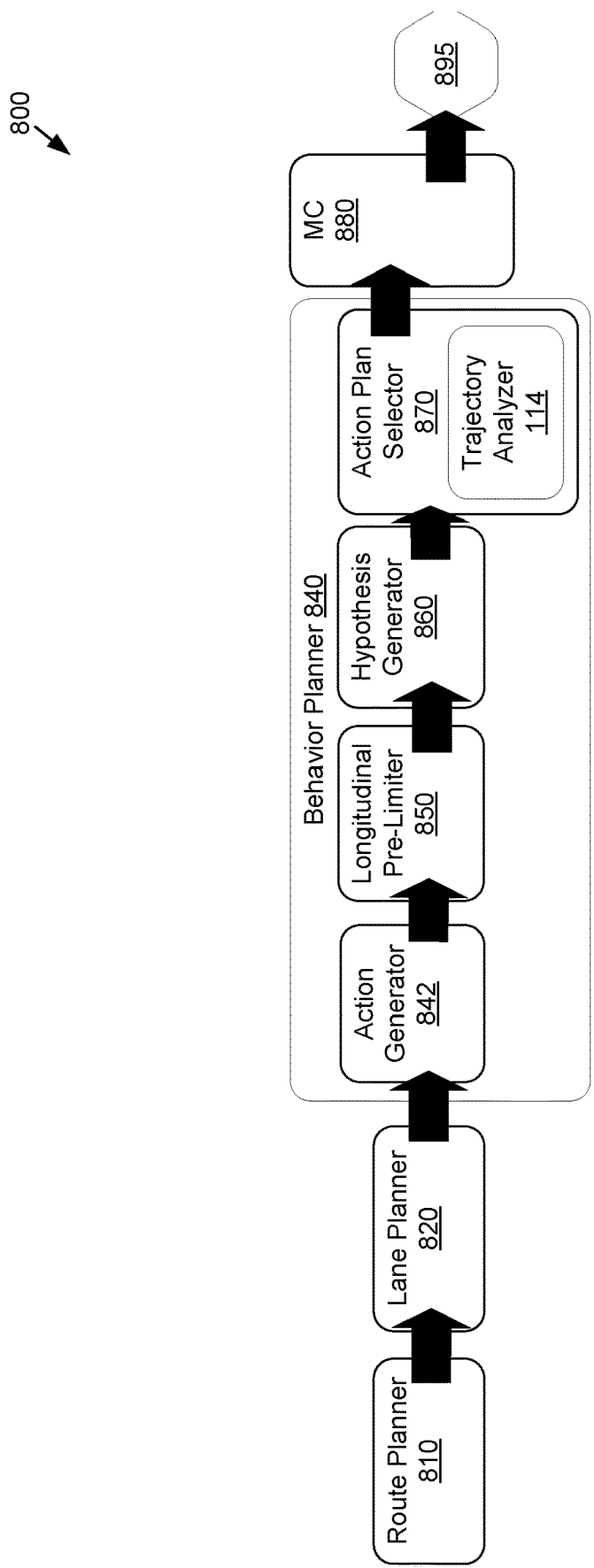
FIG. 8 is an illustration of an example behavior planning architecture for autonomous vehicles, in accordance with some embodiments of the present disclosure.

Referring now to FIG. 8, FIG. 8 is an illustration of an example behavior planning architecture for autonomous vehicles, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The behavior planning architecture 800 may use different planning components, each with a different planning horizon. In one embodiment, the different planning components include a route planner 810, a lane planner 820, and a behavior planner 840. Each component may produce a result and/or result set and communicate it to the next component in the planning pipeline. The route planner 810 may communicate a route set to the lane planner 820 and the lane planner 820 may communicate a lane plan to the behavior planner 840. The behavior planner 840 may develop and evaluate multiple trajectories, and a selected or preferred trajectory may be sent from the behavior planner to a motion controller 880 that is responsible for implementing the planned trajectory.

The route planner 810 may use geographic information covering a geographic area (e.g., a town, a metro area, a state, a country, a region, etc.), but with a relatively low amount of detail, in embodiments. The planning horizon for the route planner may be the entire area between a starting point (e.g., current location) and a destination point (e.g., a final location).

The route planner 810 may be architected as modularly separable from the other planning modules. The architectural design may support long distance routes efficiently. The route planner 810 may hand off the resulting route plan as well as some basic state information to the lane planner 820. The route plan may include one or more GPS traces that have been determined to be potential approximate routes to use to get from the current position to waypoints or parking areas. The GPS points in the route plan may also have expected time rewards on them (or if preferred, time rewards may be represented as expected time left to destination). The GPS trace of the route plan may give the lane planner 820 an approximate guide, rather than an exact insistence on a particular lane or road. The route planner 810 can provide multiple routes or route variations that fall within a threshold travel time of each other and, in embodiments, each route can be associated with an estimated travel time. In one embodiment, the route segments each are assigned a travel time which gives the lane planner 820 and other components information that can be used to calculate the cost of missing an exit and being forced onto an alternative route. In some embodiments, the travel time can also be calculated by other components, such as the lane planner 820, and the travel time can be calculated using distances and speed limits, but can also be refined with real-time traffic data, construction data, weather data, and/or the like.

The lane planner 820 can generate a lane plan based on the one or more routes received from the route planner 810. The lane planner 820 may use a second geographic map that includes more detail than found in a map used by the route planner. The second geographic map may cover a smaller geographic area than the map used by the route planner. For example, the smaller geographic area may be less than 50 square miles. The lane plan can take the form of an annotated lane graph, and the annotated lane graph can have a planning horizon of several miles. A lane graph may represent lanes that are available to the autonomous vehicle on a route (e.g., a road). The annotations on the lane graph can indicate a temporal score for various positions on the lane graph. For example, a temporal score may be provided every 10 meters, 20 meters, or some other interval on the lane graph. The temporal scores may be described as sequential time rewards for potential future locations. The larger or better reward may be associated with the faster path toward the route destination or, in other embodiments, a lower score may indicate a better or faster path. The scale of the reward can be a unit of time, such as seconds.

The temporal scores communicate the overall value of getting the autonomous vehicle to a particular point on the lane graph. The behavior planner 840 can then take these scores into consideration when evaluating various trajectories. The output of the lane planner 820 may be represented as expected time rewards encoded on a large lane graph associated with a local lane graph of lanes. This encoding may provide more flexibility than just a straight order or recommendation for which lane to be in, because it allows the behavior planner 840 to weigh the value of being in a particular lane against the difficulty of the maneuver to get there. The large lane graph may correspond to a lightweight representation of lane positions and the expected times to transition between them. The large lane graph may derived from map data, which is also linked to the local lane graph of lanes.

The behavior planner 840 may consider one or more actions, and proceed through one or more iterations of hypothesis generation and evaluation of a more detailed implementation of those actions. The more detailed implementation may be expressed as a precise motion plan (a pose trajectory over time for a few seconds into the future) and may be evaluated by the trajectory analyzer 114. The behavior planner 840 may include an action generator 842, a longitudinal pre-limiter 850, a hypothesis generator 860, and an action plan selector 870.

The behavior planner 840 may have a smaller planning horizon than the route planner 810 or the lane planner 820. In general, the behavior planner 840 may plan a vehicle's movement for the next few seconds. The distance covered may vary depending on the vehicle's speed of travel. For example, the behavior planner 840 may have a planning horizon of 50 m, 100 m, 200 m, 300 m, or the like. The behavior planner 840 may use a map showing a high level of detail over a small area. For example, the small area may be less than the area in a map used by the lane planner 820 or route planner 810. The higher amount of detail can include objects (e.g., other vehicles, pedestrians) detected by sensors associated with the autonomous vehicle. In an aspect, at least some of these objects may not be in information available to the lane planner 820. The actual trajectory selected may govern the motion of the autonomous vehicle for only a short period of time, such as a second. New trajectories may be constantly evaluated and implemented to adjust for changing conditions (e.g., moving vehicles, moving pedestrians) in the autonomous vehicle's environment.

The computational flow for each action evaluated by the behavior planner 840 may be initiated by the action generator 842. The action generator 842 may initially select one or more desirable actions for the autonomous vehicle to take. The actions may be based on the annotated lane graph provided by the lane planner 820. The action or actions selected may be based on achieving the best result indicated by the temporal scores included in the annotated lane graph. Possible actions include, but are not limited to, lane follow, lane change speed adapt, overtake, lane change push, stop shoulder, park prowl, park endgame, summon, and limp. As with the previously discussed components, the action generator 842 may select or score multiple actions. In some embodiments, the actions may be expressed as a nominal rail and/or each action may be associated with multiple nominal rails. At the end of the process followed by the action generator 842, each action may be associated with a nominal rail and/or lane edges and lanes from the map.

The longitudinal pre-limiter 850 may receive nominal rails corresponding to actions generated by the action generator 842. Each of these nominal rails may be evaluated by the longitudinal pre-limiter 850. The longitudinal pre-limiter 850 may consider basic longitudinal constraints on a per-lane (or per-nominal rail) basis. Different constraints may be considered by different components, such as those related to curve speed adaptation, speed regulation, distance keeping, safety braking, and/or a yielding. The output of the longitudinal pre-limiter 850 may include an acceleration constraint that limits the speed associated with each of the nominal rails/lanes that came as input. As such, the longitudinal pre-limiter 850 may augment a lane/rail with an acceleration limit, speed constraint, or a distance constraint.

The combined output from various components of the longitudinal pre-limiter 850 may be a plurality of longitudinally limited nominal rails. The rails generated by the action generator 842 may be combined with multiple different acceleration plans to generate a large number of trajectories along the rail. The plurality of longitudinally limited nominal rails include rails that satisfy the various constraints calculated by the longitudinal pre-limiter 850. The plurality of longitudinally limited nominal rails may be passed to the hypothesis generator 860 for further refinement.

The motion planning may proceeds through hypothesis generator 860 and evaluation by the action plan selector 870. The action plan selector 870 may use the trajectory analyzer 114 to evaluate one or more given trajectories (e.g., full planned poses into the future for the autonomous vehicle) for quality, and the hypothesis generator 860 may provide promising or plausible trajectories since the space of all trajectories is too large to search.

According to embodiments, a high degree of variability can be used for hypothesis generation. In some embodiments, the hypothesis generator 860 includes a path fan generator that starts from the longitudinally limited nominal rail and generates laterally varying choices around it, while keeping its curvature. This is tailored to the intent of following a lane while nudging around to go past static and dynamic obstacles. Longitudinal variations within the longitudinal limits may be added to each lateral choice, producing a 2D grid of trajectories. This approach may be used for a standard lane follow case, as well as actions such as (for example and without limitation) park prowl, park end game, summon and limp that may build upon it.

The hypothesis generator 860 may also use other less structured approaches such as dynamic programming to search for a free-form path or linear-quadratic regulator (LQR)/obstacle aware MPC control that takes an initial path (the nominal rail for example) and iteratively adjusts it to stay away from obstacles. This can either be done on a static scene ignoring motion, trusting that the motion planner will then see and avoid dangerous motion-induced situations, or by using claimed sets directly in the search.

Each hypothetical trajectory can be evaluated by the trajectory analyzer 114 to identify the highest quality or optimal trajectory. Quality may include many considerations, but can be quantified by a score, as described herein. Different qualities can be weighed differently when calculating the score. Ideal driving may be traced back to various objectives. Objectives may include, without limitation, maximizing comfort and making progress (e.g., getting to a destination with minimum expenditure of resources such as time, money, fuel and wear). Other objectives may be to maximize collision safety (e.g., obstacles/object avoidance), to follow lanes all else being equal (e.g., paths), and to operate while following applicable rules and conventions (e.g., wait conditions for yielding).

The score may be normalized to time. The sequential time rewards for potential future locations can be used directly in the score and as a starting point, while the other components contributing to the score can add time as a penalty. For example, a predicted collision or conflict for a trajectory may add 100 hours, which could represent a substantial adjustment or offset (e.g., penalty) and cause a trajectory not to be selected. Lesser, but still undesirable conditions, could result in smaller adjustments. The adjustments can be scaled or normalized according to the route distance or estimated time of travel. In this way, the adjustment resulting from an undesirable feature of a route may add more time on a longer route and less on a shorter route. The normalization could occur by calculating the adjustment as a percentage of the time to destination. For example, some conditions on a route could result in an adjustment of 2% of the estimated time left to reach the destination.

The trajectory analyzer 114 may also be configured to favor staying close to the nominal rail or between the edges of a lane under consideration. These preferences can be used to calculate the score. When lane following, it may be strongly preferred to not extend over the edges of the lane lines even if the lane edge is not a physical obstacle. However, that may be preferable if extending over the edges of the lane lines is the only plausible way to avoid a collision. This is different from making a planned controlled lane change, however. In particular, because in a planned controlled lane change there is time to start the indicator signal and give others time to notice the signal. For that reason, the trajectory analyzer 114 may consider trajectories within the context of lane follow and lane change differently, even if they could otherwise be the same trajectory. The score for a trajectory can increase the more closely the lane center is followed. The score can decrease when a trajectory crosses a lane boundary. The amount of score decrease can depend on the context of the lane crossing. For example, crossing a dashed line may carry a smaller penalty than crossing a solid line or double solid line. Crossing into oncoming traffic could be a very large penalty.

The trajectory analyzer 114 may analyze a trajectory against obstacle or object contenders. The analysis may include watching out for intersections involving claimed sets. Instead of considering whether there is a collision between physical bodies, now or in the future, motion planning according to disclosed embodiments may consider if there is an intersection involving one or more claimed sets. This may provide a way to handle how to upgrade static motion planning to an environment with moving contenders at speeds that do not allow near instantaneous stopping. As described herein, in one or more embodiments, a claimed set may refer to a shape in space-time that an actor will trace through while trying to stop safely and laterally line up with the road. An actor may virtually 'claim' this set to maintain collision safety. Even if bodies do not intersect, intersections involving one or more claimed sets would be hard to allow while maintaining some form of controlled safety. Conversely, if claimed sets are respected, actors can stay within them. If they do, the claimed sets play out in space-time and may not expand. This allows upgrading the static motion planning problem to one with motion. A claimed set can stop instantly although a moving actor cannot. Another benefit of this approach is that it does not need to rely on training data or prediction in near or actual collision situations which is rare or hard to come by. It also ensures collision safety beyond simply getting away without a physical collision.

The trajectory analyzer 114 may select a trajectory based at least on the ratings or scoring of the trajectories. In at least one embodiment, the trajectory with the highest score is selected. Longitudinal conditioning and/or lateral conditioning may be used for minor smoothing of a selected trajectory. Various approaches may be used to evaluate each trajectory and aggregated to form the score used for selection. For example, different approaches (e.g., such as an approach described with respect to FIG. 1) may have different weights used to form an aggregated score. Any of the various approaches may be used to evaluate and enforce a hard constraint on the trajectory, even where scoring is used. In one or more embodiments, a trajectory may be selected (e.g., based on scoring or another approach) from a plurality of trajectories, then evaluated for implementation using one or more approaches (e.g., such as an approach described with respect to FIG. 1).

An iterative approach may be used to identify an optimal trajectory. In a first iteration, a plurality of hypothetical trajectories may be evaluated with the trajectory having the highest score acting as a seed to generate additional hypothetical trajectories for evaluation. In a subsequent iteration, the additional plurality of hypothetical trajectories may be generated by marginally changing various parameters of the seed trajectory. For example, the seed trajectory may be used by the path fan generator as input instead of a nominal rail. The path fan generator may then generate the additional plurality of trajectories that are small lateral variations (smaller lateral bumps than the ones used in the first iteration on the nominal rail) and small longitudinal variations. The additional plurality of hypothetical trajectories may then be evaluated to determine if one of these trajectories has a higher score than the seed trajectory. The hypothetical trajectory with the best score may be selected for implementation.

The motion controller (MC) 180 may take the chosen trajectory and use a more refined vehicle model to select instantaneous lateral and longitudinal acceleration control 895. This may involve calculating the trajectory into the future based on a control sequence and the vehicle model, and iteratively adjusting the control sequence with a non-linear optimizer to optimize a cost function. The cost function may be designed to find a trade-off between smoothness and following the trajectory requested (although since this stage may not be obstacle aware, it may be set to follow the trajectory faithfully and smoothness of the trajectory may be ensured by the motion planning stage).

Figure 9:
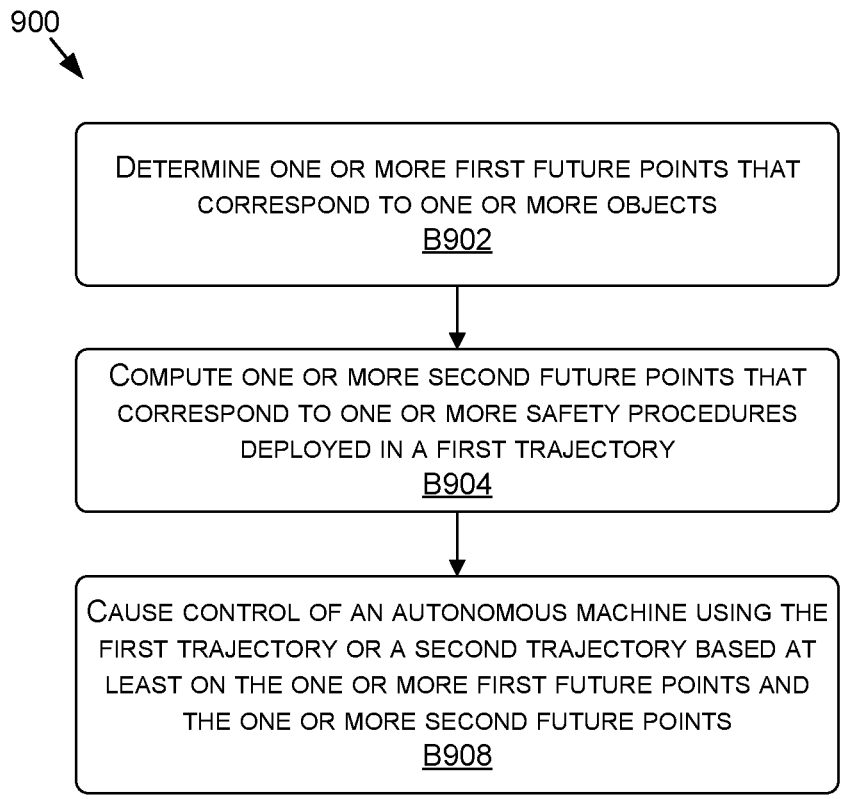
FIG. 9 is a flow diagram showing a method for controlling vehicles based on evaluating points that correspond to safety procedures that may be deployed in trajectories, in accordance with some embodiments of the present disclosure.

Now referring to FIG. 9, FIG. 9 is a flow diagram showing a method 900 for controlling vehicles based on evaluating points that correspond to safety procedures that may be deployed in trajectories, in accordance with some embodiments of the present disclosure. Each block of the method 900, and other methods described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. Methods described herein may additionally or alternatively be executed by any one system, or any combination of systems, including, but not limited to, those described herein and are not limited to particular examples.

The method 900, at block B902, includes determining one or more first future points that correspond to one or more objects. For example, the arrival time determiner 112 may determine one or more future points in space-time (e.g., of arrival times) that correspond to one or more objects (e.g., the object 128A) in the environment 126.

The method 900, at block B904, includes computing one or more second future points that correspond to one or more safety procedures deployed in a first trajectory. For example, the trajectory analyzer 114 may compute one or more future points in space-time that correspond to the vehicle 140 in the environment 126, were the vehicle 140 to implement one or more safety procedures (e.g., the safety procedure 140A, 140B, or 140C) from one or more points in space-time in the trajectory 144 (e.g., that correspond to a time step or sample).

The method 900, at block B906, includes causing control of the autonomous machine using the first trajectory or a second trajectory based at least on the one or more first future points and the one or more second future points. For example, the trajectory analyzer 114 may cause control of the vehicle 140 using the trajectory 144 or a different trajectory based at least on a comparison between the one or more second future points in space-time and the one or more first future points in space-time. This may include determining whether the points conflict and scoring or otherwise evaluating the trajectory 144. This may also include selecting the trajectory 144 or the other trajectory for use in controlling the vehicle 140 based on the comparing.

Figure 10:
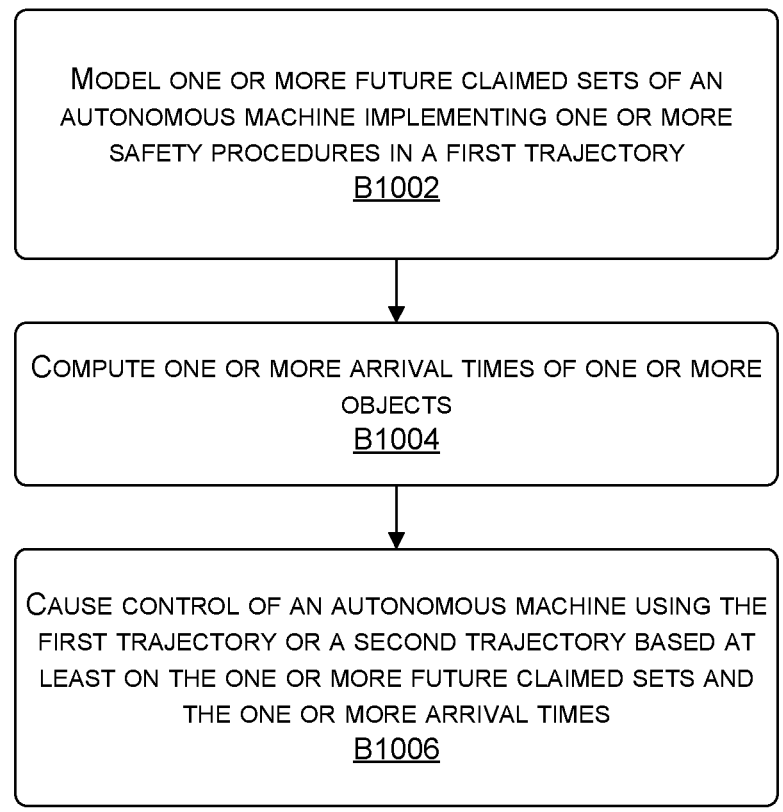
FIG. 10 is a flow diagram showing a method for controlling vehicles based on modeling future claimed sets of the vehicles that correspond to safety procedures that may be implemented in trajectories, in accordance with some embodiments of the present disclosure.

Now referring to FIG. 10, FIG. 10 is a flow diagram showing a method 1000 for controlling vehicles based on modeling future claimed sets of the vehicles that correspond to safety procedures that may be implemented in trajectories, in accordance with some embodiments of the present disclosure.

The method 1000, at block B1002, includes modeling one or more one or more future claimed sets of an autonomous machine implementing one or more safety procedures in a first trajectory. For example, the trajectory analyzer 114 may use the claimed set determiner 116 to model one or more future claimed sets of the vehicle 140 in the environment 126, were the vehicle 140 to implement the safety procedure 140A, 140B, and/or 140C in the trajectory 144.

The method 1000, at block B1004, includes computing one or more arrival times of one or more objects. For example, the arrival time determiner 112 may determine one or more arrival times of one or more objects (e.g., the object 128A) to one or more locations (e.g., of tips of the future claimed set(s)) in the environment 126.

The method 1000, at block B1006, includes causing control of the autonomous machine using the first trajectory or a second trajectory based at least on the one or more future claimed sets and the one or more arrival times. For example, the trajectory analyzer 114 may cause control of the vehicle 140 using the trajectory 144 or a different trajectory based at least on a comparison between one or more times of the one or more future claimed sets and the one or more arrival times. This may include determining whether there is a conflict and scoring or otherwise evaluating the trajectory 144. This may also include selecting the trajectory 144 or the other trajectory for use in controlling the vehicle 140 based on the comparing.

Figure 11:
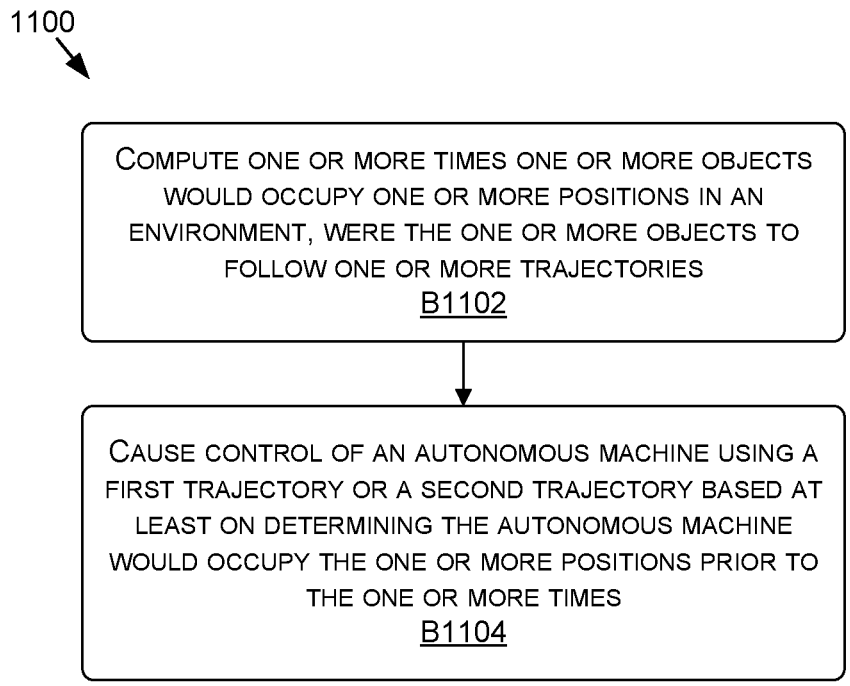
FIG. 11 is a flow diagram showing a method for controlling vehicles based on determining the vehicles would occupy positions prior to times the positions would be occupied by objects when implementing safety procedures during trajectories, in accordance with some embodiments of the present disclosure.

Now referring to FIG. 11, FIG. 11 is a flow diagram showing a method 1100 for controlling vehicles based on determining the vehicles would occupy positions prior to times the positions would be occupied by objects when implementing safety procedures during trajectories, in accordance with some embodiments of the present disclosure.

The method 1100, at block B1102, includes computing one or more times one or more objects would occupy one or more positions in an environment, were the one or more objects to follow one or more trajectories. For example, the arrival time determiner 112 may computing one or more times that one or more objects (e.g., the object 128A) would occupy one or more positions in the environment 126 (e.g., of tips of a claimed set), were the one or more objects to follow one or more trajectories.

The method 1100, at block B1104, includes causing control of the autonomous machine using the first trajectory or a second trajectory based at least on determining the autonomous machine would occupy the one or more positions prior to the one or more times. For example, the trajectory analyzer 114 may cause control of the vehicle 140 using the trajectory 144 or a different trajectory based at least on determining the vehicle 140 would occupy the one or more positions prior to the one or more times based at least on modeling the vehicle 140 implementing one or more safety procedures during the trajectory 144. This may include scoring or otherwise evaluating the trajectory 144 based on the determination. This may also include selecting the trajectory 144 or the other trajectory for use in controlling the vehicle 140 based on the determination.

Example Operating Environment

The trajectory evaluation system 100 may be implemented in an example operating environment 1230 of FIG. 12, in accordance with some embodiments of the present disclosure. Among other components not illustrated, the operating environment 1230 includes a client device(s) 1232, a network(s) 1234, a server device(s) 1236, a sensor(s) 1238, and/or a data store(s) 1246. It should be understood that operating environment 1230 shown in FIG. 12 is an example of one suitable operating environment. Each of the components shown in FIG. 12 may be implemented via any type of computing device, such as one or more of computing device 1400 described in connection with FIG. 14, for example. These components may communicate with each other via the network 1234, which may be wired, wireless, or both. The network 1234 may include multiple networks, or a network of networks, but is shown in simple form so as not to obscure aspects of the present disclosure. By way of example, the network 1234 may include one or more wide area networks (WANs), one or more local area networks (LANs), one or more public networks such as the Internet, and/or one or more private networks. Where the network 1234 includes a wireless telecommunications network, components such as a base station, a communications tower, or even access points (as well as other components) may provide wireless connectivity. In any example, at least one network 1234 may correspond to the network(s) 1390 of FIG. 13D, described further below.

It should be understood that any number of the client devices 1232, the server devices 1236, the sensors 1238, and the data stores 1246 may be employed within the operating environment 1230 within the scope of the present disclosure. Each may be configured as a single device or multiple devices cooperating in a distributed environment.

Figure 14:
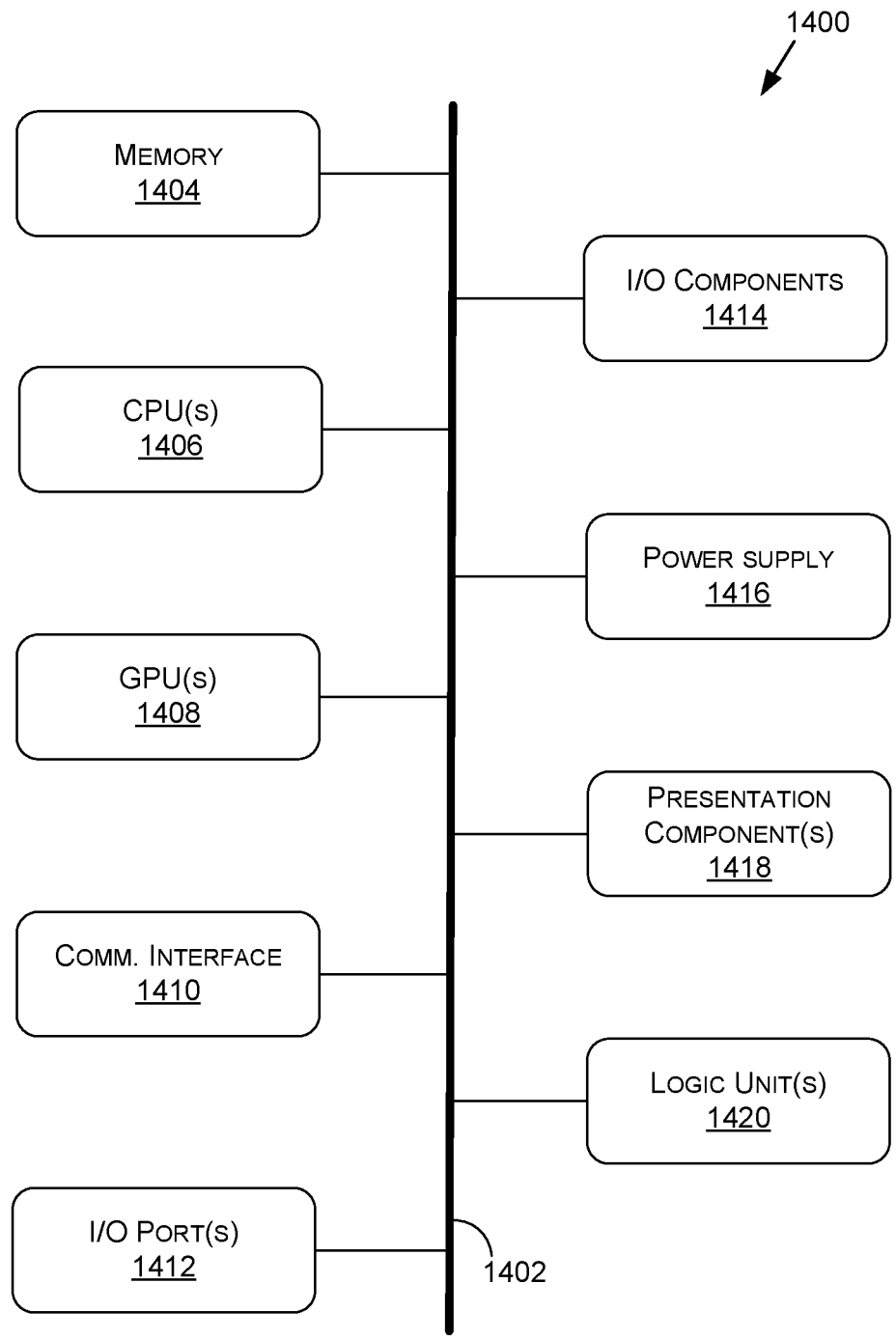
FIG. 14 is a block diagram of an example computing device suitable for use in implementing some embodiments of the present disclosure.

The client device(s) 1232 may include at least some of the components, features, and functionality of the example computing device 1400 described herein with respect to FIG. 14. By way of example and not limitation, a client device 1232 may be embodied as a personal computer (PC), a laptop computer, a mobile device, a smartphone, a tablet computer, a smart watch, a wearable computer, a personal digital assistant (PDA), an MP3 player, a robot, a drone, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. In any example, at least one client device 1232 may be part of a vehicle, such as the vehicle 140 of FIGS. 14A-14D, described in further detail herein.

The client device(s) 1232 may include one or more processors, and one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the trajectory evaluation system 100 of FIG. 1.

The server device(s) 1236 may also include one or more processors, and one or more computer-readable media. The computer-readable media includes computer-readable instructions executable by the one or more processors. The instructions may, when executed by the one or more processors, cause the one or more processors to perform any combination and/or portion of the methods described herein and/or implement any portion of the functionality of the trajectory evaluation system 100 of FIG. 1. In any example, at least one server device 1236 may correspond to the server(s) 1478 of FIG. 14D, described in further detail herein.

The data store(s) 1246 may comprise one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the trajectory evaluation system 100 of FIG. 1. The data store(s) 1246 (or computer data storage) is depicted as a single component, but may be embodied as one or more data stores (e.g., databases) and may be at least partially in the cloud. One or more of the data store(s) 1246 may correspond to one or more of the data stores of FIG. 14C.

Although depicted external to the server device(s) 1236 and the client device(s) 1232, the data store(s) 1246 may be at least partially embodied on any combination of the server device(s) 1236 and/or the client device(s) 1232 (e.g., as memory 1404 (FIG. 14)). For example, some information may be stored on a client device(s) 1232, and other and/or duplicate information may be stored externally (e.g., on a server device(s) 1236). Thus, it should be appreciated that information in the data store(s) 1246 may be distributed in any suitable manner across one or more data stores for storage (which may be hosted externally). For example, the data store(s) 1246 may comprise at least some of the one or more computer-readable media of the server device(s) 1236 and/or at least some of the one or more computer-readable media of the client device(s) 1232.

The sensor(s) 1238 comprise at least one sensor capable of generating sensor data representative of at least some aspect of an environment. For example, the sensor(s) 1238 may generate the sensor data 102 of FIG. 1. The sensor(s) 1238 may comprise any combination of a global navigation satellite systems (GNSS) sensor(s) (e.g., Global Positioning System (GPS) sensor(s)), RADAR sensor(s), ultrasonic sensor(s), LIDAR sensor(s), inertial measurement unit (IMU) sensor(s) (e.g., accelerometer(s), gyroscope(s), magnetic compass(es), magnetometer(s), etc.), microphone(s), stereo camera(s), wide-view camera(s) (e.g., fisheye cameras), infrared camera(s), surround camera(s) (e.g., 360 degree cameras), long-range and/or mid-range camera(s), speed sensor(s) (e.g., for measuring the speed of the vehicle 140), vibration sensor(s), steering sensor(s), brake sensor(s) (e.g., as part of the brake sensor system), and/or other sensor types.

With reference to FIGS. 14A-14C, the sensor data 102 may be generated by, for example and without limitation, global navigation satellite systems (GNSS) sensor(s) 1468 (e.g., Global Positioning System sensor(s)), RADAR sensor(s) 1260, ultrasonic sensor(s) 1462, LIDAR sensor(s) 1464, inertial measurement unit (IMU) sensor(s) 1466 (e.g., accelerometer(s), gyroscope(s), magnetic compass(es), magnetometer(s), etc.), microphone(s) 1496, stereo camera(s) 1468, wide-view camera(s) 1470 (e.g., fisheye cameras), infrared camera(s) 1472, surround camera(s) 1474 (e.g., 360 degree cameras), long-range and/or mid-range camera(s) 1498, speed sensor(s) 1444 (e.g., for measuring the speed of the vehicle 140), vibration sensor(s) 1442, steering sensor(s) 1440, brake sensor(s) (e.g., as part of the brake sensor system 1446), and/or other sensor types.

In some examples, the sensor data 102 may be generated by forward-facing and/or side-facing cameras, such as a wide-view camera(s) 1470, a surround camera(s) 1474, a stereo camera(s) 1468, and/or a long-range or mid-range camera(s) 1498. In some examples, more than one camera or other sensor may be used to incorporate multiple fields of view (e.g., the field of view of the long-range cameras 1498, the forward-facing stereo camera 1468, and/or the forward facing wide-view camera 1470 of FIG. 14B).

The components of FIG. 1 may generally be implemented using any combination of the client device(s) 1232 and the server device(s) 1236. Thus, it should be appreciated that the trajectory evaluation system 100 may be provided via multiple devices arranged in a distributed environment that collectively provide the functionality described herein, or may be embodied on a single device (e.g., the vehicle 140). Thus, while some examples used to describe the trajectory evaluation system 100 may refer to particular devices and/or configurations, it is contemplated that those examples may be more generally applicable to the potential combinations of devices and configurations described above. For example, in some embodiments, at least some of the sensors 1238, used to generate one or more portions of the sensor data 102, may be distributed amongst multiple vehicles and/or objects in the environment and/or at least one of the sensors 1238 may be included in the vehicle 140.

Example Autonomous Vehicle

Figure 13A:
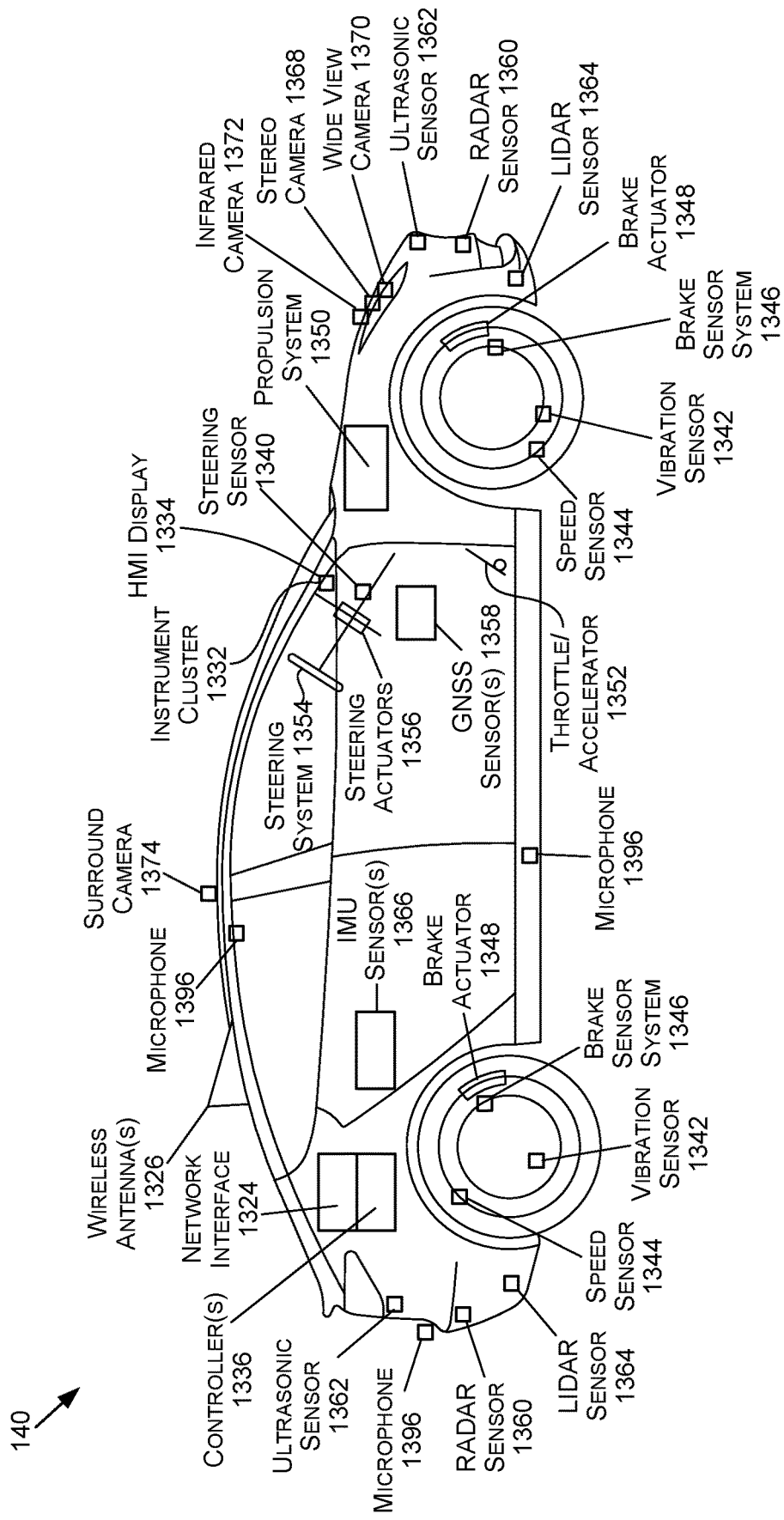
FIG. 13A is an illustration of an example autonomous vehicle, in accordance with some embodiments of the present disclosure.

FIG. 13A is an illustration of an example autonomous vehicle 1300, in accordance with some embodiments of the present disclosure. The autonomous vehicle 1300 (alternatively referred to herein as the "vehicle 1300") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1300 may be capable of functionality in accordance with one or more of Level 3-Level 5 of the autonomous driving levels. For example, the vehicle 1300 may be capable of conditional automation (Level 3), high automation (Level 4), and/or full automation (Level 5), depending on the embodiment.

The vehicle 1300 may include components such as a chassis, a vehicle body, wheels (e.g., 2, 4, 6, 8, 18, etc.), tires, axles, and other components of a vehicle. The vehicle 1300 may include a propulsion system 1350, such as an internal combustion engine, hybrid electric power plant, an all-electric engine, and/or another propulsion system type. The propulsion system 1350 may be connected to a drive train of the vehicle 1300, which may include a transmission, to enable the propulsion of the vehicle 1300. The propulsion system 1350 may be controlled in response to receiving signals from the throttle/accelerator 1352.

A steering system 1354, which may include a steering wheel, may be used to steer the vehicle 1300 (e.g., along a desired path or route) when the propulsion system 1350 is operating (e.g., when the vehicle is in motion). The steering system 1354 may receive signals from a steering actuator 1356. The steering wheel may be optional for full automation (Level 5) functionality.

The brake sensor system 1346 may be used to operate the vehicle brakes in response to receiving signals from the brake actuators 1348 and/or brake sensors.

Controller(s) 1336, which may include one or more system on chips (SoCs) 1304 (FIG. 13C) and/or GPU(s), may provide signals (e.g., representative of commands) to one or more components and/or systems of the vehicle 1300. For example, the controller(s) may send signals to operate the vehicle brakes via one or more brake actuators 1348, to operate the steering system 1354 via one or more steering actuators 1356, to operate the propulsion system 1350 via one or more throttle/accelerators 1352. The controller(s) 1336 may include one or more onboard (e.g., integrated) computing devices (e.g., supercomputers) that process sensor signals, and output operation commands (e.g., signals representing commands) to enable autonomous driving and/or to assist a human driver in driving the vehicle 1300. The controller(s) 1336 may include a first controller 1336 for autonomous driving functions, a second controller 1336 for functional safety functions, a third controller 1336 for artificial intelligence functionality (e.g., computer vision), a fourth controller 1336 for infotainment functionality, a fifth controller 1336 for redundancy in emergency conditions, and/or other controllers. In some examples, a single controller 1336 may handle two or more of the above functionalities, two or more controllers 1336 may handle a single functionality, and/or any combination thereof.

The controller(s) 1336 may provide the signals for controlling one or more components and/or systems of the vehicle 1300 in response to sensor data received from one or more sensors (e.g., sensor inputs). The sensor data may be received from, for example and without limitation, global navigation satellite systems sensor(s) 1358 (e.g., Global Positioning System sensor(s)), RADAR sensor(s) 1360, ultrasonic sensor(s) 1362, LIDAR sensor(s) 1364, inertial measurement unit (IMU) sensor(s) 1366 (e.g., accelerometer(s), gyroscope(s), magnetic compass(es), magnetometer(s), etc.), microphone(s) 1396, stereo camera(s) 1368, wide-view camera(s) 1370 (e.g., fisheye cameras), infrared camera(s) 1372, surround camera(s) 1374 (e.g., 360 degree cameras), long-range and/or mid-range camera(s) 1398, speed sensor(s) 1344 (e.g., for measuring the speed of the vehicle 1300), vibration sensor(s) 1342, steering sensor(s) 1340, brake sensor(s) (e.g., as part of the brake sensor system 1346), and/or other sensor types.

One or more of the controller(s) 1336 may receive inputs (e.g., represented by input data) from an instrument cluster 1332 of the vehicle 1300 and provide outputs (e.g., represented by output data, display data, etc.) via a human-machine interface (HMI) display 1334, an audible annunciator, a loudspeaker, and/or via other components of the vehicle 1300. The outputs may include information such as vehicle velocity, speed, time, map data (e.g., the HD map 1322 of FIG. 13C), location data (e.g., the vehicle's 1300 location, such as on a map), direction, location of other vehicles (e.g., an occupancy grid), information about objects and status of objects as perceived by the controller(s) 1336, etc. For example, the HMI display 1334 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1300 further includes a network interface 1324 which may use one or more wireless antenna(s) 1326 and/or modem(s) to communicate over one or more networks. For example, the network interface 1324 may be capable of communication over LTE, WCDMA, UMTS, GSM, CDMA2000, etc. The wireless antenna(s) 1326 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LP-WANs), such as LoRaWAN, SigFox, etc.

Figure 13B:
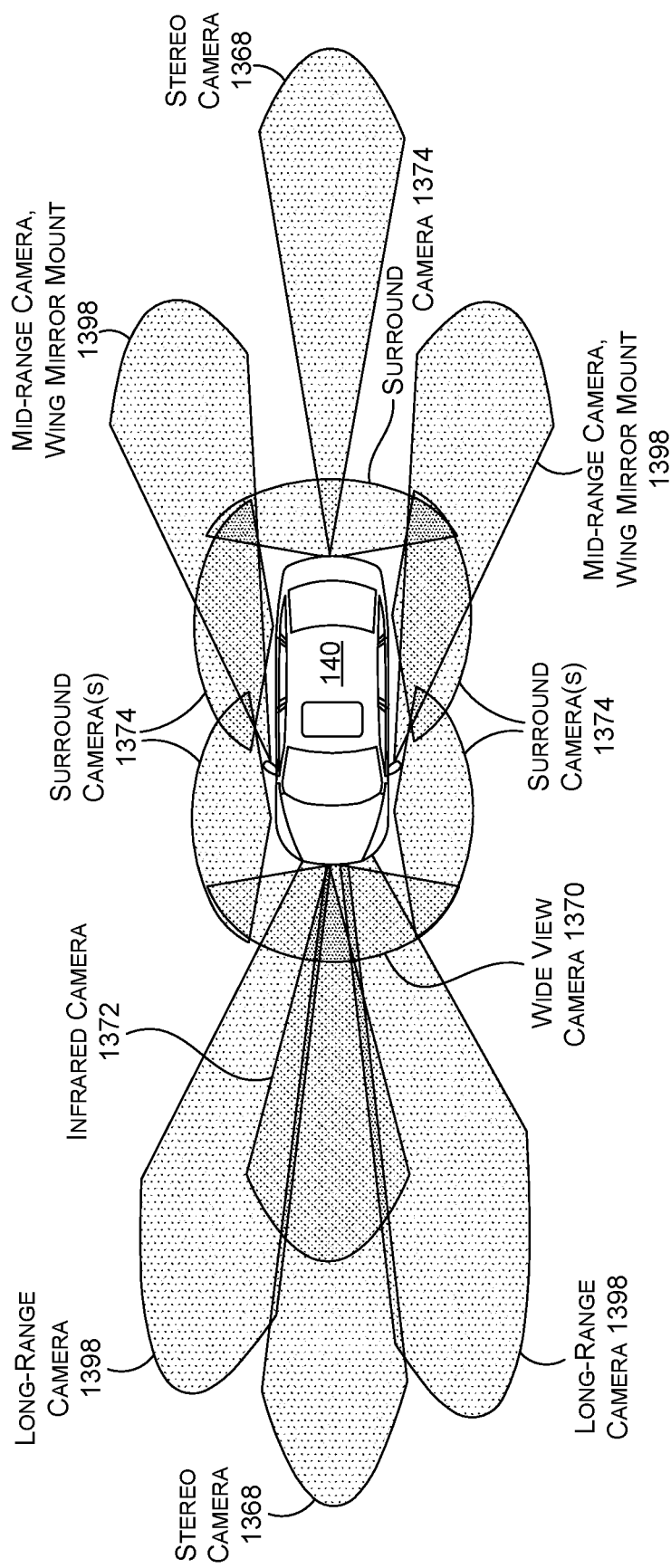
FIG. 13B is an example of camera locations and fields of view for the example autonomous vehicle of FIG. 13A, in accordance with some embodiments of the present disclosure.

FIG. 13B is an example of camera locations and fields of view for the example autonomous vehicle 1300 of FIG. 13A, in accordance with some embodiments of the present disclosure. The cameras and respective fields of view are one example embodiment and are not intended to be limiting. For example, additional and/or alternative cameras may be included and/or the cameras may be located at different locations on the vehicle 1300.

The camera types for the cameras may include, but are not limited to, digital cameras that may be adapted for use with the components and/or systems of the vehicle 1300. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1300 (e.g., front-facing cameras) may be used for surround view, to help identify forward facing paths and obstacles, as well aid in, with the help of one or more controllers 1336 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1370 that may be used to perceive objects coming into view from the periphery (e.g., pedestrians, crossing traffic or bicycles). Although only one wide-view camera is illustrated in FIG. 13B, there may any number of wide-view cameras 1370 on the vehicle 1300. In addition, long-range camera(s) 1398 (e.g., a long-view stereo camera pair) may be used for depth-based object detection, especially for objects for which a neural network has not yet been trained. The long-range camera(s) 1398 may also be used for object detection and classification, as well as basic object tracking.

One or more stereo cameras 1368 may also be included in a front-facing configuration. The stereo camera(s) 1368 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1368 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1368 may be used in addition to, or alternatively from, those described herein.

Cameras with a field of view that include portions of the environment to the side of the vehicle 1300 (e.g., side-view cameras) may be used for surround view, providing information used to create and update the occupancy grid, as well as to generate side impact collision warnings. For example, surround camera(s) 1374 (e.g., four surround cameras 1374 as illustrated in FIG. 13B) may be positioned to on the vehicle 1300. The surround camera(s) 1374 may include wide-view camera(s) 1370, fisheye camera(s), 360 degree camera(s), and/or the like. Four example, four fisheye cameras may be positioned on the vehicle's front, rear, and sides. In an alternative arrangement, the vehicle may use three surround camera(s) 1374 (e.g., left, right, and rear), and may leverage one or more other camera(s) (e.g., a forward-facing camera) as a fourth surround view camera.

Cameras with a field of view that include portions of the environment to the rear of the vehicle 1300 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1398, stereo camera(s) 1368), infrared camera(s) 1372, etc.), as described herein.

Figure 13C:
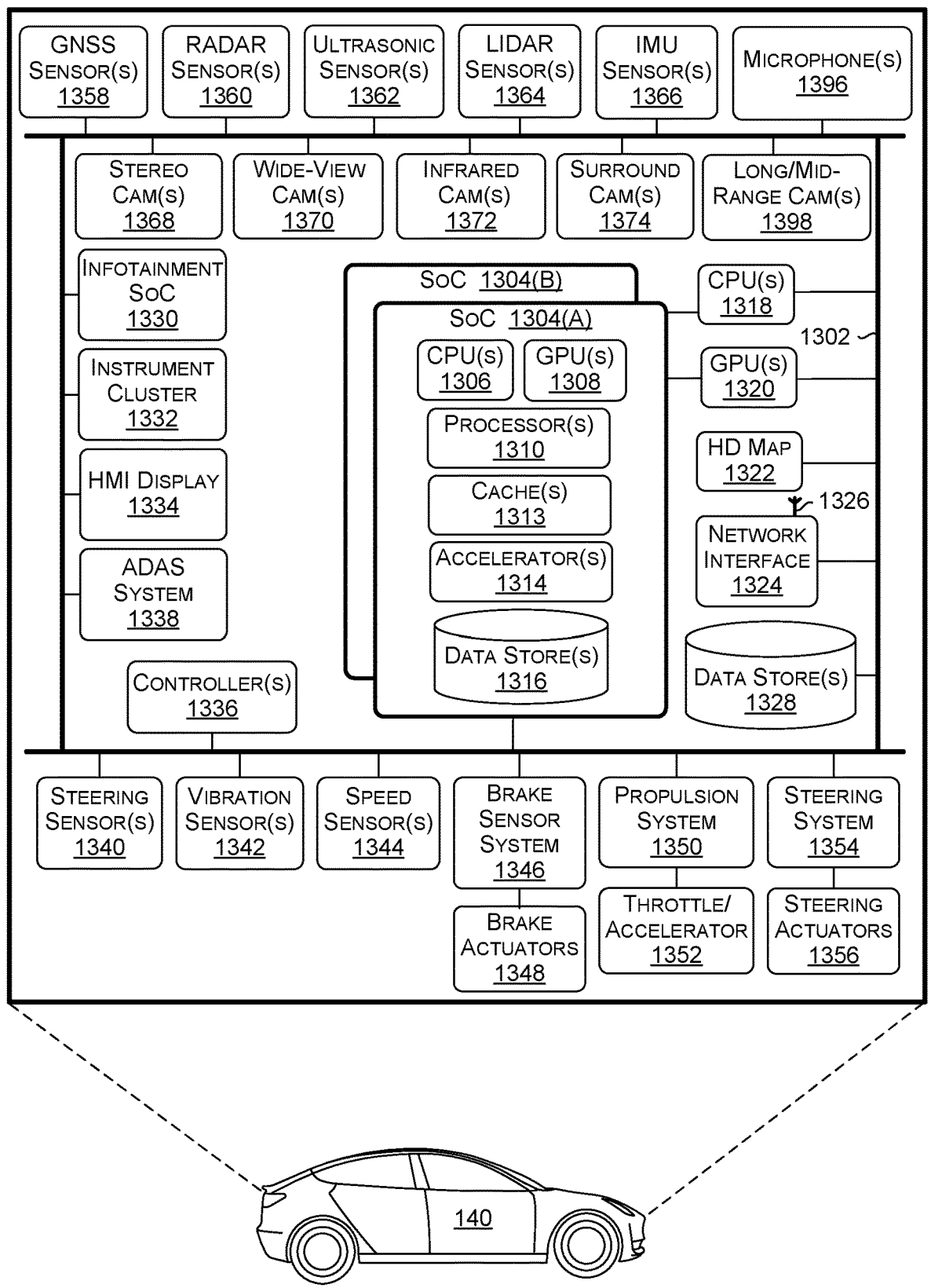
FIG. 13C is a block diagram of an example system architecture for the example autonomous vehicle of FIG. 13A, in accordance with some embodiments of the present disclosure.

FIG. 13C is a block diagram of an example system architecture for the example autonomous vehicle 1300 of FIG. 13A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1300 in FIG. 13C are illustrated as being connected via bus 1302. The bus 1302 may include a Controller Area Network (CAN) data interface (alternatively referred to herein as a "CAN bus"). A CAN may be a network inside the vehicle 1300 used to aid in control of various features and functionality of the vehicle 1300, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1302 is described herein as being a CAN bus, this is not intended to be limiting. For example, in addition to, or alternatively from, the CAN bus, FlexRay and/or Ethernet may be used. Additionally, although a single line is used to represent the bus 1302, this is not intended to be limiting. For example, there may be any number of busses 1302, which may include one or more CAN busses, one or more FlexRay busses, one or more Ethernet busses, and/or one or more other types of busses using a different protocol. In some examples, two or more busses 1302 may be used to perform different functions, and/or may be used for redundancy. For example, a first bus 1302 may be used for collision avoidance functionality and a second bus 1302 may be used for actuation control. In any example, each bus 1302 may communicate with any of the components of the vehicle 1300, and two or more busses 1302 may communicate with the same components. In some examples, each SoC 1304, each controller 1336, and/or each computer within the vehicle may have access to the same input data (e.g., inputs from sensors of the vehicle 1300), and may be connected to a common bus, such the CAN bus.

The vehicle 1300 may include one or more controller(s) 1336, such as those described herein with respect to FIG. 13A. The controller(s) 1336 may be used for a variety of functions. The controller(s) 1336 may be coupled to any of the various other components and systems of the vehicle 1300, and may be used for control of the vehicle 1300, artificial intelligence of the vehicle 1300, infotainment for the vehicle 1300, and/or the like.

The vehicle 1300 may include a system(s) on a chip (SoC) 1304. The SoC 1304 may include CPU(s) 1306, GPU(s) 1308, processor(s) 1310, cache(s) 1312, accelerator(s) 1314, data store(s) 1316, and/or other components and features not illustrated. The SoC(s) 1304 may be used to control the vehicle 1300 in a variety of platforms and systems. For example, the SoC(s) 1304 may be combined in a system (e.g., the system of the vehicle 1300) with an HD map 1322 which may obtain map refreshes and/or updates via a network interface 1324 from one or more servers (e.g., server(s) 1378 of FIG. 13D).

The CPU(s) 1306 may include a CPU cluster or CPU complex (alternatively referred to herein as a "CCPLEX"). The CPU(s) 1306 may include multiple cores and/or L2 caches. For example, in some embodiments, the CPU(s) 1306 may include eight cores in a coherent multi-processor configuration. In some embodiments, the CPU(s) 1306 may include four dual-core clusters where each cluster has a dedicated L2 cache (e.g., a 2 MB L2 cache). The CPU(s) 1306 (e.g., the CCPLEX) may be configured to support simultaneous cluster operation enabling any combination of the clusters of the CPU(s) 1306 to be active at any given time.

The CPU(s) 1306 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1306 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1308 may include an integrated GPU (alternatively referred to herein as an "iGPU"). The GPU(s) 1308 may be programmable and may be efficient for parallel workloads. The GPU(s) 1308, in some examples, may use an enhanced tensor instruction set. The GPU(s) 1308 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1308 may include at least eight streaming microprocessors. The GPU(s) 1308 may use compute application programming interface(s) (API(s)). In addition, the GPU(s) 1308 may use one or more parallel computing platforms and/or programming models (e.g., NVIDIA's CUDA).

The GPU(s) 1308 may be power-optimized for best performance in automotive and embedded use cases. For example, the GPU(s) 1308 may be fabricated on a Fin field-effect transistor (FinFET). However, this is not intended to be limiting and the GPU(s) 1308 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1308 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1308 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1308 to access the CPU(s) 1306 page tables directly. In such examples, when the GPU(s) 1308 memory management unit (MMU) experiences a miss, an address translation request may be transmitted to the CPU(s) 1306. In response, the CPU(s) 1306 may look in its page tables for the virtual-to-physical mapping for the address and transmits the translation back to the GPU(s) 1308. As such, unified memory technology may allow a single unified virtual address space for memory of both the CPU(s) 1306 and the GPU(s) 1308, thereby simplifying the GPU(s) 1308 programming and porting of applications to the GPU(s) 1308.

In addition, the GPU(s) 1308 may include an access counter that may keep track of the frequency of access of the GPU(s) 1308 to memory of other processors. The access counter may help ensure that memory pages are moved to the physical memory of the processor that is accessing the pages most frequently.

The SoC(s) 1304 may include any number of cache(s) 1312, including those described herein. For example, the cache(s) 1312 may include an L3 cache that is available to both the CPU(s) 1306 and the GPU(s) 1308 (e.g., that is connected both the CPU(s) 1306 and the GPU(s) 1308). The cache(s) 1312 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1304 may include an arithmetic logic unit(s) (ALU(s)) which may be leveraged in performing processing with respect to any of the variety of tasks or operations of the vehicle 1300—such as processing DNNs. In addition, the SoC(s) 1304 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1306 and/or GPU(s) 1308.

The SoC(s) 1304 may include one or more accelerators 1314 (e.g., hardware accelerators, software accelerators, or a combination thereof). For example, the SoC(s) 1304 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1308 and to off-load some of the tasks of the GPU(s) 1308 (e.g., to free up more cycles of the GPU(s) 1308 for performing other tasks). As an example, the accelerator(s) 1314 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1314 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1308, and by using an inference accelerator, for example, a designer may target either the DLA(s) or the GPU(s) 1308 for any function. For example, the designer may focus processing of CNNs and floating point operations on the DLA(s) and leave other functions to the GPU(s) 1308 and/or other accelerator(s) 1314.

The accelerator(s) 1314 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1306. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1314 (e.g., the hardware acceleration cluster) may include a computer vision network on-chip and SRAM, for providing a high-bandwidth, low latency SRAM for the accelerator(s) 1314. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1304 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1314 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1366 output that correlates with the vehicle 1300 orientation, distance, 3D location estimates of the object obtained from the neural network and/or other sensors (e.g., LIDAR sensor(s) 1364 or RADAR sensor(s) 1360), among others.

The SoC(s) 1304 may include data store(s) 1316 (e.g., memory). The data store(s) 1316 may be on-chip memory of the SoC(s) 1304, which may store neural networks to be executed on the GPU and/or the DLA. In some examples, the data store(s) 1316 may be large enough in capacity to store multiple instances of neural networks for redundancy and safety. The data store(s) 1312 may comprise L2 or L3 cache(s) 1312. Reference to the data store(s) 1316 may include reference to the memory associated with the PVA, DLA, and/or other accelerator(s) 1314, as described herein.

The SoC(s) 1304 may include one or more processor(s) 1310 (e.g., embedded processors). The processor(s) 1310 may include a boot and power management processor that may be a dedicated processor and subsystem to handle boot power and management functions and related security enforcement. The boot and power management processor may be a part of the SoC(s) 1304 boot sequence and may provide runtime power management services. The boot power and management processor may provide clock and voltage programming, assistance in system low power state transitions, management of SoC(s) 1304 thermals and temperature sensors, and/or management of the SoC(s) 1304 power states. Each temperature sensor may be implemented as a ring-oscillator whose output frequency is proportional to temperature, and the SoC(s) 1304 may use the ring-oscillators to detect temperatures of the CPU(s) 1306, GPU (s) 1308, and/or accelerator(s) 1314. If temperatures are determined to exceed a threshold, the boot and power management processor may enter a temperature fault routine and put the SoC(s) 1304 into a lower power state and/or put the vehicle 1300 into a chauffeur to safe stop mode (e.g., bring the vehicle 1300 to a safe stop).

The processor(s) 1310 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1310 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1310 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1310 may further include a real-time camera engine that may include a dedicated processor subsystem for handling real-time camera management.

The processor(s) 1310 may further include a high-dynamic range signal processor that may include an image signal processor that is a hardware engine that is part of the camera processing pipeline.

The processor(s) 1310 may include a video image compositor that may be a processing block (e.g., implemented on a microprocessor) that implements video post-processing functions needed by a video playback application to produce the final image for the player window. The video image compositor may perform lens distortion correction on wide-view camera(s) 1370, surround camera(s) 1374, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1308 is not required to continuously render new surfaces. Even when the GPU(s) 1308 is powered on and active doing 3D rendering, the video image compositor may be used to offload the GPU(s) 1308 to improve performance and responsiveness.

The SoC(s) 1304 may further include a mobile industry processor interface (MIPI) camera serial interface for receiving video and input from cameras, a high-speed interface, and/or a video input block that may be used for camera and related pixel input functions. The SoC(s) 1304 may further include an input/output controller(s) that may be controlled by software and may be used for receiving I/O signals that are uncommitted to a specific role.

The SoC(s) 1304 may further include a broad range of peripheral interfaces to enable communication with peripherals, audio codecs, power management, and/or other devices. The SoC(s) 1304 may be used to process data from cameras (e.g., connected over Gigabit Multimedia Serial Link and Ethernet), sensors (e.g., LIDAR sensor(s) 1364, RADAR sensor(s) 1360, etc. that may be connected over Ethernet), data from bus 1302 (e.g., speed of vehicle 1300, steering wheel position, etc.), data from GNSS sensor(s) 1358 (e.g., connected over Ethernet or CAN bus). The SoC(s) 1304 may further include dedicated high-performance mass storage controllers that may include their own DMA engines, and that may be used to free the CPU(s) 1306 from routine data management tasks.

The SoC(s) 1304 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1304 may be faster, more reliable, and even more energy-efficient and space-efficient than conventional systems. For example, the accelerator(s) 1314, when combined with the CPU(s) 1306, the GPU(s) 1308, and the data store(s) 1316, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1320) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1308.

In some examples, a CNN for facial recognition and vehicle owner identification may use data from camera sensors to identify the presence of an authorized driver and/or owner of the vehicle 1300. The always on sensor processing engine may be used to unlock the vehicle when the owner approaches the driver door and turn on the lights, and, in security mode, to disable the vehicle when the owner leaves the vehicle. In this way, the SoC(s) 1304 provide for security against theft and/or carjacking.

In another example, a CNN for emergency vehicle detection and identification may use data from microphones 1396 to detect and identify emergency vehicle sirens. In contrast to conventional systems, that use general classifiers to detect sirens and manually extract features, the SoC(s) 1304 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1358. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1362, until the emergency vehicle(s) passes.

The vehicle may include a CPU(s) 1318 (e.g., discrete CPU(s), or dCPU(s)), that may be coupled to the SoC(s) 1304 via a high-speed interconnect (e.g., PCIe). The CPU(s) 1318 may include an X86 processor, for example. The CPU(s) 1318 may be used to perform any of a variety of functions, including arbitrating potentially inconsistent results between ADAS sensors and the SoC(s) 1304, and/or monitoring the status and health of the controller(s) 1336 and/or infotainment SoC 1330, for example.

The vehicle 1300 may include a GPU(s) 1320 (e.g., discrete GPU(s), or dGPU(s)), that may be coupled to the SoC(s) 1304 via a high-speed interconnect (e.g., NVIDIA's NVLINK). The GPU(s) 1320 may provide additional artificial intelligence functionality, such as by executing redundant and/or different neural networks, and may be used to train and/or update neural networks based on input (e.g., sensor data) from sensors of the vehicle 1300.

The vehicle 1300 may further include the network interface 1324 which may include one or more wireless antennas 1326 (e.g., one or more wireless antennas for different communication protocols, such as a cellular antenna, a Bluetooth antenna, etc.). The network interface 1324 may be used to enable wireless connectivity over the Internet with the cloud (e.g., with the server(s) 1378 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link.

The vehicle-to-vehicle communication link may provide the vehicle 1300 information about vehicles in proximity to the vehicle 1300 (e.g., vehicles in front of, on the side of, and/or behind the vehicle 1300). This functionality may be part of a cooperative adaptive cruise control functionality of the vehicle 1300.

The network interface 1324 may include a SoC that provides modulation and demodulation functionality and enables the controller(s) 1336 to communicate over wireless networks. The network interface 1324 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1300 may further include data store(s) 1328 which may include off-chip (e.g., off the SoC(s) 1304) storage. The data store(s) 1328 may include one or more storage elements including RAM, SRAM, DRAM, VRAM, Flash, hard disks, and/or other components and/or devices that may store at least one bit of data.

The vehicle 1300 may further include GNSS sensor(s) 1358. The GNSS sensor(s) 1358 (e.g., GPS, assisted GPS sensors, differential GPS (DGPS) sensors, etc.), to assist in mapping, perception, occupancy grid generation, and/or path planning functions. Any number of GNSS sensor(s) 1358 may be used, including, for example and without limitation, a GPS using a USB connector with an Ethernet to Serial (RS-232) bridge.

The vehicle 1300 may further include RADAR sensor(s) 1360. The RADAR sensor(s) 1360 may be used by the vehicle 1300 for long-range vehicle detection, even in darkness and/or severe weather conditions. RADAR functional safety levels may be ASIL B. The RADAR sensor(s) 1360 may use the CAN and/or the bus 1302 (e.g., to transmit data generated by the RADAR sensor(s) 1360) for control and to access object tracking data, with access to Ethernet to access raw data in some examples. A wide variety of RADAR sensor types may be used. For example, and without limitation, the RADAR sensor(s) 1360 may be suitable for front, rear, and side RADAR use. In some example, Pulse Doppler RADAR sensor(s) are used.

The RADAR sensor(s) 1360 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250m range. The RADAR sensor(s) 1360 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1300 surroundings at higher speeds with minimal interference from traffic in adjacent lanes. The other two antennae may expand the field of view, making it possible to quickly detect vehicles entering or leaving the vehicle's 1300 lane.

Mid-range RADAR systems may include, as an example, a range of up to 1360m (front) or 80m (rear), and a field of view of up to 42 degrees (front) or 1350 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1300 may further include ultrasonic sensor(s) 1362. The ultrasonic sensor(s) 1362, which may be positioned at the front, back, and/or the sides of the vehicle 1300, may be used for park assist and/or to create and update an occupancy grid. A wide variety of ultrasonic sensor(s) 1362 may be used, and different ultrasonic sensor(s) 1362 may be used for different ranges of detection (e.g., 2.5m, 4m). The ultrasonic sensor(s) 1362 may operate at functional safety levels of ASIL B.

The vehicle 1300 may include LIDAR sensor(s) 1364. The LIDAR sensor(s) 1364 may be used for object and pedestrian detection, emergency braking, collision avoidance, and/or other functions. The LIDAR sensor(s) 1364 may be functional safety level ASIL B. In some examples, the vehicle 1300 may include multiple LIDAR sensors 1364 (e.g., two, four, six, etc.) that may use Ethernet (e.g., to provide data to a Gigabit Ethernet switch).

In some examples, the LIDAR sensor(s) 1364 may be capable of providing a list of objects and their distances for a 360-degree field of view. Commercially available LIDAR sensor(s) 1364 may have an advertised range of approximately 1300m, with an accuracy of 2 cm-3 cm, and with support for a 1300 Mbps Ethernet connection, for example. In some examples, one or more non-protruding LIDAR sensors 1364 may be used. In such examples, the LIDAR sensor(s) 1364 may be implemented as a small device that may be embedded into the front, rear, sides, and/or corners of the vehicle 1300. The LIDAR sensor(s) 1364, in such examples, may provide up to a 120-degree horizontal and 35-degree vertical field-of-view, with a 200m range even for low-reflectivity objects. Front-mounted LIDAR sensor(s) 1364 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1300. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1364 may be less susceptible to motion blur, vibration, and/or shock.

The vehicle may further include IMU sensor(s) 1366. The IMU sensor(s) 1366 may be located at a center of the rear axle of the vehicle 1300, in some examples. The IMU sensor(s) 1366 may include, for example and without limitation, an accelerometer(s), a magnetometer(s), a gyroscope(s), a magnetic compass(es), and/or other sensor types. In some examples, such as in six-axis applications, the IMU sensor(s) 1366 may include accelerometers and gyroscopes, while in nine-axis applications, the IMU sensor(s) 1366 may include accelerometers, gyroscopes, and magnetometers.

In some embodiments, the IMU sensor(s) 1366 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1366 may enable the vehicle 1300 to estimate heading without requiring input from a magnetic sensor by directly observing and correlating the changes in velocity from GPS to the IMU sensor(s) 1366. In some examples, the IMU sensor(s) 1366 and the GNSS sensor(s) 1358 may be combined in a single integrated unit.

The vehicle may include microphone(s) 1396 placed in and/or around the vehicle 1300. The microphone(s) 1396 may be used for emergency vehicle detection and identification, among other things.

The vehicle may further include any number of camera types, including stereo camera(s) 1368, wide-view camera(s) 1370, infrared camera(s) 1372, surround camera(s) 1374, long-range and/or mid-range camera(s) 1398, and/or other camera types. The cameras may be used to capture image data around an entire periphery of the vehicle 1300. The types of cameras used depends on the embodiments and requirements for the vehicle 1300, and any combination of camera types may be used to provide the necessary coverage around the vehicle 1300. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 13A and FIG. 13B.

The vehicle 1300 may further include vibration sensor(s) 1342. The vibration sensor(s) 1342 may measure vibrations of components of the vehicle, such as the axle(s). For example, changes in vibrations may indicate a change in road surfaces. In another example, when two or more vibration sensors 1342 are used, the differences between the vibrations may be used to determine friction or slippage of the road surface (e.g., when the difference in vibration is between a power-driven axle and a freely rotating axle).

The vehicle 1300 may include an ADAS system 1338. The ADAS system 1338 may include a SoC, in some examples. The ADAS system 1338 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1360, LIDAR sensor(s) 1364, and/or a camera(s). The ACC systems may include longitudinal ACC and/or lateral ACC. Longitudinal ACC monitors and controls the distance to the vehicle immediately ahead of the vehicle 1300 and automatically adjust the vehicle speed to maintain a safe distance from vehicles ahead. Lateral ACC performs distance keeping, and advises the vehicle 1300 to change lanes when necessary. Lateral ACC is related to other ADAS applications such as LCA and CWS.

CACC uses information from other vehicles that may be received via the network interface 1324 and/or the wireless antenna(s) 1326 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1300), while the I2V communication concept provides information about traffic further ahead. CACC systems may include either or both I2V and V2V information sources. Given the information of the vehicles ahead of the vehicle 1300, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1360, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1360, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1300 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1300 if the vehicle 1300 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1360, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1300 is backing up. Some RCTW systems include AEB to ensure that the vehicle brakes are applied to avoid a crash. RCTW systems may use one or more rear-facing RADAR sensor(s) 1360, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1300, the vehicle 1300 itself must, in the case of conflicting results, decide whether to heed the result from a primary computer or a secondary computer (e.g., a first controller 1336 or a second controller 1336). For example, in some embodiments, the ADAS system 1338 may be a backup and/or secondary computer for providing perception information to a backup computer rationality module. The backup computer rationality monitor may run a redundant diverse software on hardware components to detect faults in perception and dynamic driving tasks. Outputs from the ADAS system 1338 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1304.

In other examples, ADAS system 1338 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1338 may be fed into the primary computer's perception block and/or the primary computer's dynamic driving task block. For example, if the ADAS system 1338 indicates a forward crash warning due to an object immediately ahead, the perception block may use this information when identifying objects. In other examples, the secondary computer may have its own neural network which is trained and thus reduces the risk of false positives, as described herein.

The vehicle 1300 may further include the infotainment SoC 1330 (e.g., an in-vehicle infotainment system (IVI)). Although illustrated and described as a SoC, the infotainment system may not be a SoC, and may include two or more discrete components. The infotainment SoC 1330 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1300. For example, the infotainment SoC 1330 may radios, disk players, navigation systems, video players, USB and Bluetooth connectivity, carputers, in-car entertainment, Wi-Fi, steering wheel audio controls, hands free voice control, a heads-up display (HUD), an HMI display 1334, a telematics device, a control panel (e.g., for controlling and/or interacting with various components, features, and/or systems), and/or other components. The infotainment SoC 1330 may further be used to provide information (e.g., visual and/or audible) to a user(s) of the vehicle, such as information from the ADAS system 1338, autonomous driving information such as planned vehicle maneuvers, trajectories, surrounding environment information (e.g., intersection information, vehicle information, road information, etc.), and/or other information.

The infotainment SoC 1330 may include GPU functionality. The infotainment SoC 1330 may communicate over the bus 1302 (e.g., CAN bus, Ethernet, etc.) with other devices, systems, and/or components of the vehicle 1300. In some examples, the infotainment SoC 1330 may be coupled to a supervisory MCU such that the GPU of the infotainment system may perform some self-driving functions in the event that the primary controller(s) 1336 (e.g., the primary and/or backup computers of the vehicle 1300) fail. In such an example, the infotainment SoC 1330 may put the vehicle 1300 into a chauffeur to safe stop mode, as described herein.

The vehicle 1300 may further include an instrument cluster 1332 (e.g., a digital dash, an electronic instrument cluster, a digital instrument panel, etc.). The instrument cluster 1332 may include a controller and/or supercomputer (e.g., a discrete controller or supercomputer). The instrument cluster 1332 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1330 and the instrument cluster 1332. In other words, the instrument cluster 1332 may be included as part of the infotainment SoC 1330, or vice versa.

Figure 13D:
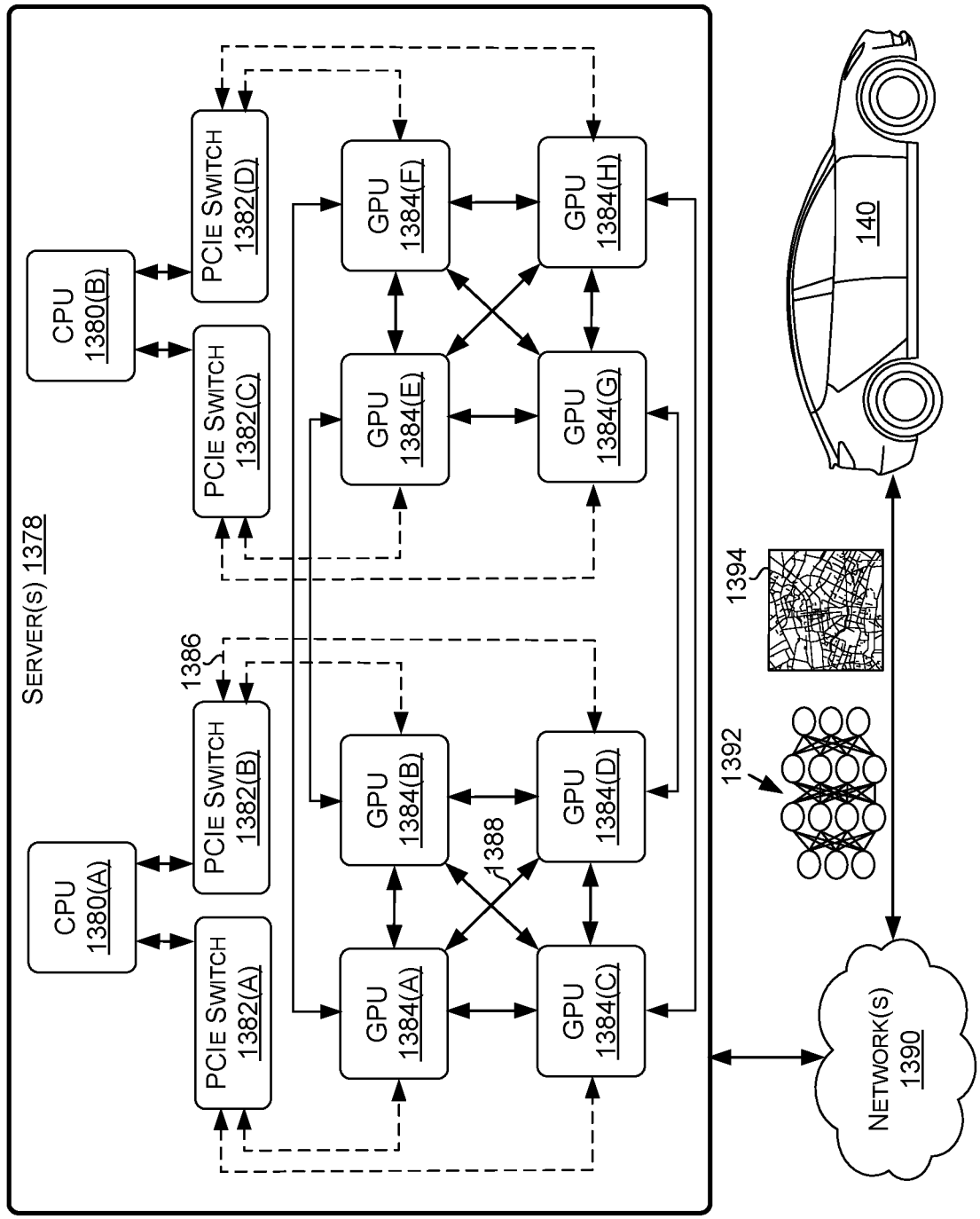
FIG. 13D is a system diagram for communication between cloud-based server(s) and the example autonomous vehicle of FIG. 13A, in accordance with some embodiments of the present disclosure.

FIG. 13D is a system diagram for communication between cloud-based server(s) and the example autonomous vehicle 1300 of FIG. 13A, in accordance with some embodiments of the present disclosure. The system 1376 may include server(s) 1378, network(s) 1390, and vehicles, including the vehicle 1300. The server(s) 1378 may include a plurality of GPUs 1384(A)-1384(H) (collectively referred to herein as GPUs 1384), PCIe switches 1382(A)-1382(H) (collectively referred to herein as PCIe switches 1382), and/or CPUs 1380(A)-1380(B) (collectively referred to herein as CPUs 1380). The GPUs 1384, the CPUs 1380, and the PCIe switches may be interconnected with high-speed interconnects such as, for example and without limitation, NVLink interfaces 1388 developed by NVIDIA and/or PCIe connections 1386. In some examples, the GPUs 1384 are connected via NVLink and/or NVSwitch SoC and the GPUs 1384 and the PCIe switches 1382 are connected via PCIe interconnects. Although eight GPUs 1384, two CPUs 1380, and two PCIe switches are illustrated, this is not intended to be limiting. Depending on the embodiment, each of the server(s) 1378 may include any number of GPUs 1384, CPUs 1380, and/or PCIe switches. For example, the server(s) 1378 may each include eight, sixteen, thirty-two, and/or more GPUs 1384.

The server(s) 1378 may receive, over the network(s) 1390 and from the vehicles, image data representative of images showing unexpected or changed road conditions, such as recently commenced road-work. The server(s) 1378 may transmit, over the network(s) 1390 and to the vehicles, neural networks 1392, updated neural networks 1392, and/or map information 1394, including information regarding traffic and road conditions. The updates to the map information 1394 may include updates for the HD map 1322, such as information regarding construction sites, potholes, detours, flooding, and/or other obstructions. In some examples, the neural networks 1392, the updated neural networks 1392, and/or the map information 1394 may have resulted from new training and/or experiences represented in data received from any number of vehicles in the environment, and/or based on training performed at a datacenter (e.g., using the server(s) 1378 and/or other servers).

The server(s) 1378 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1390, and/or the machine learning models may be used by the server(s) 1378 to remotely monitor the vehicles.

In some examples, the server(s) 1378 may receive data from the vehicles and apply the data to up-to-date real-time neural networks for real-time intelligent inferencing. The server(s) 1378 may include deep-learning supercomputers and/or dedicated AI computers powered by GPU(s) 1384, such as a DGX and DGX Station machines developed by NVIDIA. However, in some examples, the server(s) 1378 may include deep learning infrastructure that use only CPU-powered datacenters.

The deep-learning infrastructure of the server(s) 1378 may be capable of fast, real-time inferencing, and may use that capability to evaluate and verify the health of the processors, software, and/or associated hardware in the vehicle 1300. For example, the deep-learning infrastructure may receive periodic updates from the vehicle 1300, such as a sequence of images and/or objects that the vehicle 1300 has located in that sequence of images (e.g., via computer vision and/or other machine learning object classification techniques). The deep-learning infrastructure may run its own neural network to identify the objects and compare them with the objects identified by the vehicle 1300 and, if the results do not match and the infrastructure concludes that the AI in the vehicle 1300 is malfunctioning, the server(s) 1378 may transmit a signal to the vehicle 1300 instructing a fail-safe computer of the vehicle 1300 to assume control, notify the passengers, and complete a safe parking maneuver.

For inferencing, the server(s) 1378 may include the GPU(s) 1384 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 14 is a block diagram of an example computing device(s) 1400 suitable for use in implementing some embodiments of the present disclosure. Computing device 1400 may include an interconnect system 1402 that directly or indirectly couples the following devices: memory 1404, one or more central processing units (CPUs) 1406, one or more graphics processing units (GPUs) 1408, a communication interface 1410, input/output (I/O) ports 1412, input/output components 1414, a power supply 1416, one or more presentation components 1418 (e.g., display(s)), and one or more logic units 1420. In at least one embodiment, the computing device(s) 1400 may comprise one or more virtual machines (VMs), and/or any of the components thereof may comprise virtual components (e.g., virtual hardware components). For non-limiting examples, one or more of the GPUs 1408 may comprise one or more vGPUs, one or more of the CPUs 1406 may comprise one or more vCPUs, and/or one or more of the logic units 1420 may comprise one or more virtual logic units. As such, a computing device(s) 1400 may include discrete components (e.g., a full GPU dedicated to the computing device 1400), virtual components (e.g., a portion of a GPU dedicated to the computing device 1400), or a combination thereof.

Although the various blocks of FIG. 14 are shown as connected via the interconnect system 1402 with lines, this is not intended to be limiting and is for clarity only. For example, in some embodiments, a presentation component 1418, such as a display device, may be considered an I/O component 1414 (e.g., if the display is a touch screen). As another example, the CPUs 1406 and/or GPUs 1408 may include memory (e.g., the memory 1404 may be representative of a storage device in addition to the memory of the GPUs 1408, the CPUs 1406, and/or other components). In other words, the computing device of FIG. 14 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 14.

The interconnect system 1402 may represent one or more links or busses, such as an address bus, a data bus, a control bus, or a combination thereof. The interconnect system 1402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1406 may be directly connected to the memory 1404. Further, the CPU 1406 may be directly connected to the GPU 1408. Where there is direct, or point-to-point connection between components, the interconnect system 1402 may include a PCIe link to carry out the connection. In these examples, a PCI bus need not be included in the computing device 1400.

The memory 1404 may include any of a variety of computer-readable media. The computer-readable media may be any available media that may be accessed by the computing device 1400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1406 may be configured to execute at least some of the computer-readable instructions to control one or more components of the computing device 1400 to perform one or more of the methods and/or processes described herein. The CPU(s) 1406 may each include one or more cores (e.g., one, two, four, eight, twenty-eight, seventy-two, etc.) that are capable of handling a multitude of software threads simultaneously. The CPU(s) 1406 may include any type of processor, and may include different types of processors depending on the type of computing device 1400 implemented (e.g., processors with fewer cores for mobile devices and processors with more cores for servers). For example, depending on the type of computing device 1400, the processor may be an Advanced RISC Machines (ARM) processor implemented using Reduced Instruction Set Computing (RISC) or an x86 processor implemented using Complex Instruction Set Computing (CISC). The computing device 1400 may include one or more CPUs 1406 in addition to one or more microprocessors or supplementary co-processors, such as math co-processors.

In addition to or alternatively from the CPU(s) 1406, the GPU(s) 1408 may be configured to execute at least some of the computer-readable instructions to control one or more components of the computing device 1400 to perform one or more of the methods and/or processes described herein. One or more of the GPU(s) 1408 may be an integrated GPU (e.g., with one or more of the CPU(s) 1406 and/or one or more of the GPU(s) 1408 may be a discrete GPU. In embodiments, one or more of the GPU(s) 1408 may be a coprocessor of one or more of the CPU(s) 1406. The GPU(s) 1408 may be used by the computing device 1400 to render graphics (e.g., 3D graphics) or perform general purpose computations. For example, the GPU(s) 1408 may be used for General-Purpose computing on GPUs (GPGPU). The GPU(s) 1408 may include hundreds or thousands of cores that are capable of handling hundreds or thousands of software threads simultaneously. The GPU(s) 1408 may generate pixel data for output images in response to rendering commands (e.g., rendering commands from the CPU(s) 1406 received via a host interface). The GPU(s) 1408 may include graphics memory, such as display memory, for storing pixel data or any other suitable data, such as GPGPU data. The display memory may be included as part of the memory 1404. The GPU(s) 1408 may include two or more GPUs operating in parallel (e.g., via a link). The link may directly connect the GPUs (e.g., using NVLINK) or may connect the GPUs through a switch (e.g., using NVSwitch). When combined together, each GPU 1408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1406 and/or the GPU(s) 1408, the logic unit(s) 1420 may be configured to execute at least some of the computer-readable instructions to control one or more components of the computing device 1400 to perform one or more of the methods and/or processes described herein. In embodiments, the CPU(s) 1406, the GPU(s) 1408, and/or the logic unit(s) 1420 may discretely or jointly perform any combination of the methods, processes and/or portions thereof. One or more of the logic units 1420 may be part of and/or integrated in one or more of the CPU(s) 1406 and/or the GPU(s) 1408 and/or one or more of the logic units 1420 may be discrete components or otherwise external to the CPU(s) 1406 and/or the GPU(s) 1408. In embodiments, one or more of the logic units 1420 may be a coprocessor of one or more of the CPU(s) 1406 and/or one or more of the GPU(s) 1408.

Examples of the logic unit(s) 1420 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1410 may include one or more receivers, transmitters, and/or transceivers that enable the computing device 1400 to communicate with other computing devices via an electronic communication network, included wired and/or wireless communications. The communication interface 1410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1412 may enable the computing device 1400 to be logically coupled to other devices including the I/O components 1414, the presentation component(s) 1418, and/or other components, some of which may be built in to (e.g., integrated in) the computing device 1400. Illustrative I/O components 1414 include a microphone, mouse, keyboard, joystick, game pad, game controller, satellite dish, scanner, printer, wireless device, etc. The I/O components 1414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1400. The computing device 1400 may be include depth cameras, such as stereoscopic camera systems, infrared camera systems, RGB camera systems, touchscreen technology, and combinations of these, for gesture detection and recognition. Additionally, the computing device 1400 may include accelerometers or gyroscopes (e.g., as part of an inertia measurement unit (IMU)) that enable detection of motion. In some examples, the output of the accelerometers or gyroscopes may be used by the computing device 1400 to render immersive augmented reality or virtual reality.

The power supply 1416 may include a hard-wired power supply, a battery power supply, or a combination thereof. The power supply 1416 may provide power to the computing device 1400 to enable the components of the computing device 1400 to operate.

The presentation component(s) 1418 may include a display (e.g., a monitor, a touch screen, a television screen, a heads-up-display (HUD), other display types, or a combination thereof), speakers, and/or other presentation components. The presentation component(s) 1418 may receive data from other components (e.g., the GPU(s) 1408, the CPU(s) 1406, etc.), and output the data (e.g., as an image, video, sound, etc.).

Example Data Center

Figure 15:
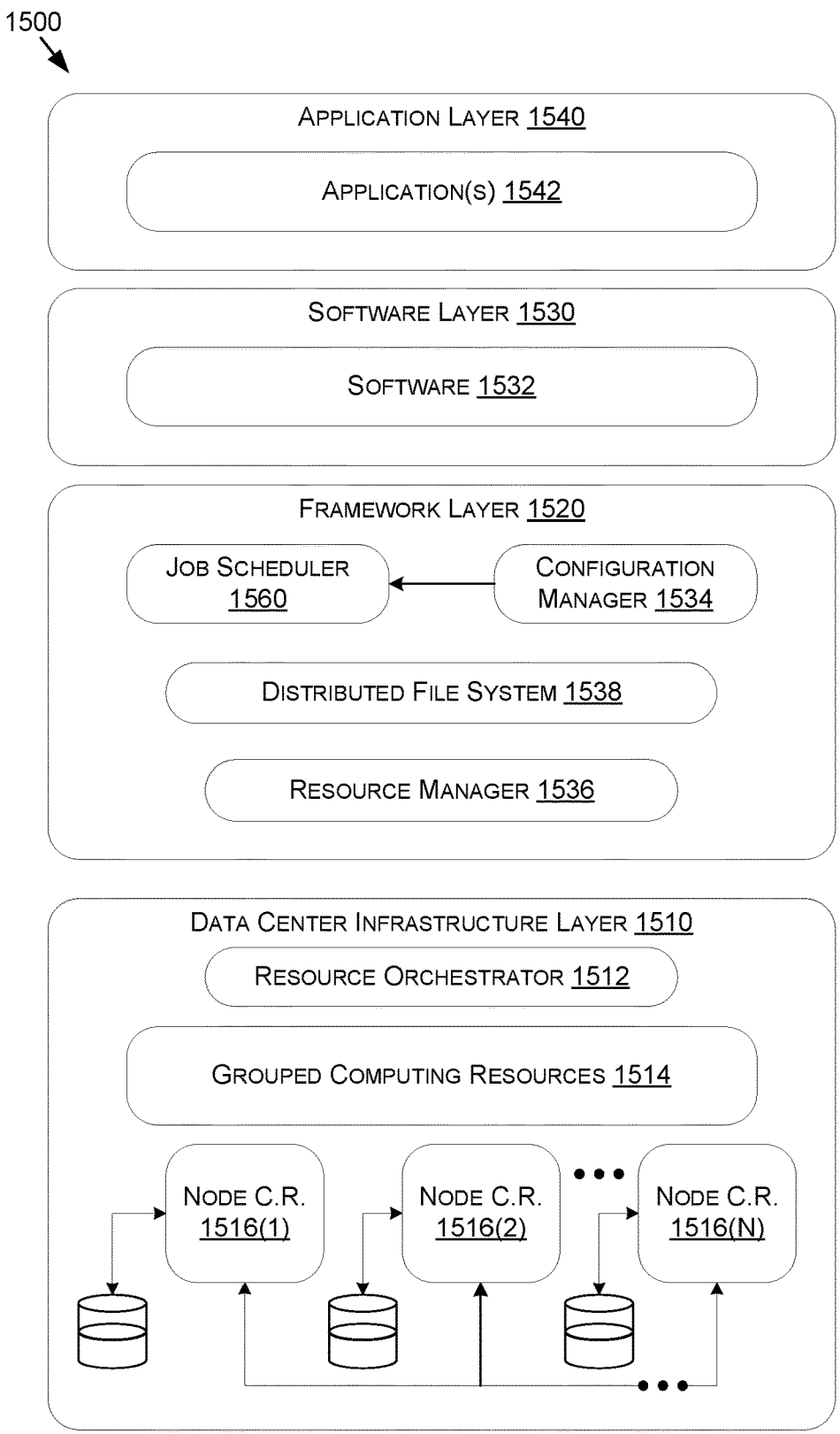
FIG. 15 is a block diagram of an example data center suitable for use in implementing some embodiments of the present disclosure.

FIG. 15 illustrates an example data center 1500 that may be used in at least one embodiments of the present disclosure. The data center 1500 may include a data center infrastructure layer 1510, a framework layer 1520, a software layer 1530, and/or an application layer 1540.

As shown in FIG. 15, the data center infrastructure layer 1510 may include a resource orchestrator 1512, grouped computing resources 1514, and node computing resources ("node C.R.s") 1516(1)-1516(N), where "N" represents any whole, positive integer. In at least one embodiment, node C.R.s 1516(1)-1516(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1516(1)-1516(N) may correspond to a server having one or more of the above-mentioned computing resources. In addition, in some embodiments, the node C.R.s 1516(1)-15161(N) may include one or more virtual components, such as vGPUs, vCPUs, and/or the like, and/or one or more of the node C.R.s 1516(1)-1516(N) may correspond to a virtual machine (VM).

In at least one embodiment, grouped computing resources 1514 may include separate groupings of node C.R.s 1516 housed within one or more racks (not shown), or many racks housed in data centers at various geographical locations (also not shown). Separate groupings of node C.R.s 1516 within grouped computing resources 1514 may include grouped compute, network, memory or storage resources that may be configured or allocated to support one or more workloads. In at least one embodiment, several node C.R.s 1516 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1522 may configure or otherwise control one or more node C.R.s 1516(1)-1516(N) and/or grouped computing resources 1514. In at least one embodiment, resource orchestrator 1522 may include a software design infrastructure ("SDI") management entity for the data center 1500. The resource orchestrator 1522 may include hardware, software, or some combination thereof.

In at least one embodiment, as shown in FIG. 15, framework layer 1520 may include a job scheduler 1560, a configuration manager 1534, a resource manager 1536, and/or a distributed file system 1538. The framework layer 1520 may include a framework to support software 1532 of software layer 1530 and/or one or more application(s) 1542 of application layer 1540. The software 1532 or application(s) 1542 may respectively include web-based service software or applications, such as those provided by Amazon Web Services, Google Cloud and Microsoft Azure. The framework layer 1520 may be, but is not limited to, a type of free and open-source software web application framework such as Apache Spark™ (hereinafter "Spark") that may utilize distributed file system 1538 for large-scale data processing (e.g., "big data"). In at least one embodiment, job scheduler 1560 may include a Spark driver to facilitate scheduling of workloads supported by various layers of data center 1500. The configuration manager 1534 may be capable of configuring different layers such as software layer 1530 and framework layer 1520 including Spark and distributed file system 1538 for supporting large-scale data processing. The resource manager 1536 may be capable of managing clustered or grouped computing resources mapped to or allocated for support of distributed file system 1538 and job scheduler 1560. In at least one embodiment, clustered or grouped computing resources may include grouped computing resource 1514 at data center infrastructure layer 1510. The resource manager 1036 may coordinate with resource orchestrator 1512 to manage these mapped or allocated computing resources.

In at least one embodiment, software 1532 included in software layer 1530 may include software used by at least portions of node C.R.s 1516(1)-1516(N), grouped computing resources 1514, and/or distributed file system 1538 of framework layer 1520. One or more types of software may include, but are not limited to, Internet web page search software, e-mail virus scan software, database software, and streaming video content software.

In at least one embodiment, application(s) 1542 included in application layer 1540 may include one or more types of applications used by at least portions of node C.R.s 1516(1)-1516(N), grouped computing resources 1514, and/or distributed file system 1538 of framework layer 1520. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1534, resource manager 1536, and resource orchestrator 1512 may implement any number and type of self-modifying actions based on any amount and type of data acquired in any technically feasible fashion. Self-modifying actions may relieve a data center operator of data center 1500 from making possibly bad configuration decisions and possibly avoiding underutilized and/or poor performing portions of a data center.

The data center 1500 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1500. In at least one embodiment, trained or deployed machine learning models corresponding to one or more neural networks may be used to infer or predict information using resources described above with respect to the data center 1500 by using weight parameters calculated through one or more training techniques, such as but not limited to those described herein.

In at least one embodiment, the data center 1500 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1400 of FIG. 14—e.g., each device may include similar components, features, and/or functionality of the computing device(s) 1400. In addition, where backend devices (e.g., servers, NAS, etc.) are implemented, the backend devices may be included as part of a data center 1500, an example of which is described in more detail herein with respect to FIG. 15.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1400 described herein with respect to FIG. 14. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   for each time step of at least two time steps along a trajectory for an autonomous machine:
      computing one or more first future points that correspond to a safety procedure trajectory of one or more safety procedures of an autonomous machine triggered and initiated from a future position corresponding to the time step on the trajectory and extending to the one or more first future points; and
      comparing the one or more first future points to one or more second future points that correspond to motion of one or more objects to perform an evaluation of whether the safety procedure trajectory indicates a future collision with the one or more objects were the safety procedure trajectory to be initiated from the trajectory at the future position on the trajectory;
   computing a ranking score of the trajectory based at least on aggregating the evaluation for each of the at least two time steps, wherein the aggregating is based at least on the evaluation for at least a first time step of the at least two time steps indicating a conflict between the safety procedure trajectory of the first time step and at least one objective of at least one safety procedure of the one or more safety procedures;
   based at least on the ranking score, initiating the trajectory or another trajectory for the autonomous machine; and
   performing, based at least on the initiating, one or more control operations corresponding to the autonomous machine.

2. The method of claim 1, wherein a first score is assigned to the first time step based at least on the evaluation indicating the conflict and the ranking score comprises an aggregated score corresponding to the first score assigned to the first time step and a second score assigned to a second time step of the at least two time steps.

3. The method of claim 1, wherein the conflict is used as a soft constraint on selecting the trajectory for the initiating based at least on the first time step being greater than a threshold distance from a start of the trajectory.

4. The method of claim 1, wherein the conflict is used as a soft constraint on selecting the trajectory for the initiating based at least on the first time step being greater than a threshold time from a start of the trajectory.

5. The method of claim 1, wherein the at least one objective comprises the autonomous machine stopping prior to a collision.

6. The method of claim 1, wherein the aggregating includes using a weighting for the first time in computing the ranking score and the weighting corresponds to the conflict.

7. The method of claim 1, wherein the evaluation, for the first time step includes:
   determining the conflict between when the autonomous machine will occupy a first position on the safety procedure trajectory of the first time step and when the one or more objects will occupy the one or more second future points that correspond to the first time step; and
   assigning a score to the first time step that corresponds to a distance to the first position, the ranking score being computed from the score.

8. The method of claim 1, further comprising:
assigning a respective ranking score to each trajectory of a plurality of trajectories; and
selecting the trajectory for the initiating based at least on the ranking score for the trajectory being higher than the respective ranking score for each of the plurality of trajectories.

9. The method of claim 1, wherein the one or more objects comprise one or more of a pedestrian, an animal, or a stationary obstacle.

10. At least one processor comprising:
one or more processing units to:
for each time step of at least two time steps along a trajectory for a machine:
model one or more future claimed sets of positions corresponding to a safety procedure trajectory of the machine executing one or more safety procedures triggered and initiated from a future position corresponding to the time step on a trajectory for the machine and extending to the one or more future claimed sets of positions, and
compare the one or more future claimed sets with one or more future locations that correspond to motion of one or more objects to perform an evaluation of whether the safety procedure trajectory indicates a future collision with the one or more objects were the safety procedure trajectory to be initiated from the trajectory at the future position on the trajectory,
compute a ranking score of the trajectory based at least on aggregating the evaluation for each of the at least two time steps, wherein the aggregating is based at least on the evaluation for at least a first time step of the at least two time steps indicating a conflict between the safety procedure trajectory of the first time step and at least one objective of at least one safety procedure of the one or more safety procedures,
based at least on the ranking score, initiate the trajectory or another trajectory for the machine, and
perform, based at least on the trajectory or the another trajectory, one or more autonomous control operations corresponding to the machine.

11. The at least one processor of claim 10, wherein the one or more processing units are further to evaluate a second trajectory using the comparison based at least on the trajectory and the second trajectory comprising a same lateral path.

12. The at least one processor of claim 10, wherein the comparing is between the one or more future locations and at least leftmost and rightmost vertices of a shape that represents the machine in the one or more future claimed sets.

13. The at least one processor of claim 10, wherein the comparing is between one or more arrival times and one or more portions of the one or more future claimed sets that correspond to a side of the machine, the side being selected based on a direction of travel of the machine.

14. The at least one processor of claim 10, wherein the one or more future claimed sets are defined by one or more paths that branch off, at the future position, from a path of the trajectory.

15. The at least one processor of claim 10, wherein the one or more future claimed sets are modeled from one or more first velocities of the machine at a time within the trajectory and one or more arrival times are determined from one or more second velocities of the one or more objects at a start time of the first trajectory.

16. A system comprising:
one or more processors to perform a method comprising:
for each time step of one or more time steps along a trajectory for a machine:
modeling a future location of the machine corresponding to a safety procedure trajectory of the machine executing one or more safety procedures triggered and initiated from a future position corresponding to the time step on the trajectory for the machine and extending to the future location; and
performing, based on the modeling, an evaluation of whether the safety procedure trajectory indicates a future collision with one or more objects were the safety procedure trajectory to be initiated from the trajectory at the future position on the trajectory;
computing a ranking score of the trajectory based at least on aggregating the evaluation for each of the one or more time steps, wherein the evaluation for at least a first time step of the one or more time steps indicates a conflict between the safety procedure trajectory of the first time step and at least one objective of at least one safety procedure of the one or more safety procedures;
based at least on the ranking score, initiating the trajectory or another trajectory for the machine; and
performing one or more autonomous control operations based at least on the initiating.

17. The system of claim 16, wherein the evaluation comprises computing, using the modeling, a time and a place the machine will be at a stop were the machine to implement the one or more safety procedures during the trajectory.

18. The system of claim 16, wherein the evaluation is based at least on modeling one or more trajectories of the one or more objects to the future location.

19. The system of claim 18, wherein the one or more trajectories comprise a direct path of an object of the one or more objects from a first position at a start of the one or more trajectories to the future location.

20. The system of claim 16, wherein the system is comprised in at least one of:
a control system for a fully or semi-autonomous machine;
a perception system for a fully or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

* * * * *